(12) United States Patent
Takahashi et al.

(10) Patent No.: US 11,450,352 B2
(45) Date of Patent: Sep. 20, 2022

(54) IMAGE PROCESSING APPARATUS AND IMAGE PROCESSING METHOD

(71) Applicant: SONY CORPORATION, Tokyo (JP)

(72) Inventors: Masahiro Takahashi, Tokyo (JP); Takahiro Tsuge, Tokyo (JP); Satoshi Asai, Tokyo (JP); Yo Nonoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/057,374

(22) PCT Filed: Apr. 15, 2019

(86) PCT No.: PCT/JP2019/016198
§ 371 (c)(1),
(2) Date: Nov. 20, 2020

(87) PCT Pub. No.: WO2019/230225
PCT Pub. Date: Dec. 5, 2019

(65) Prior Publication Data
US 2021/0201953 A1 Jul. 1, 2021

(30) Foreign Application Priority Data

May 29, 2018 (JP) .............................. JP2018-102028

(51) Int. Cl.
*G11B 27/036* (2006.01)
*H04N 5/222* (2006.01)

(52) U.S. Cl.
CPC ......... *G11B 27/036* (2013.01); *H04N 5/2226* (2013.01)

(58) Field of Classification Search
None
See application file for complete search history.

(56) References Cited

U.S. PATENT DOCUMENTS

2010/0328432 A1* 12/2010 Tanaka ................. H04N 13/156
 348/46
2011/0206345 A1* 8/2011 Masuo ................... H04N 5/775
 386/239

(Continued)

FOREIGN PATENT DOCUMENTS

CN 103136746 A 6/2013
DE 112014006149 T5 9/2016

(Continued)

OTHER PUBLICATIONS

International Search Report and Written Opinion of PCT Application No. PCT/JP2019/016198, dated Jul. 9, 2019, 14 pages of ISRWO.

(Continued)

*Primary Examiner* — Eileen M Adams
(74) *Attorney, Agent, or Firm* — Chip Law Group

(57) ABSTRACT

To realize a natural image effect and the like in a moving image provided is an image processing unit which includes an additional image generation unit that generates an additional image to be added to moving image data, and an image editing processing unit that performs image editing processing of adding the additional image to the moving image data, using depth information of a pixel in the moving image data to which the additional image is to be added.

18 Claims, 32 Drawing Sheets

(56) References Cited

U.S. PATENT DOCUMENTS

| | | | |
|---|---|---|---|
| 2012/0154383 A1* | 6/2012 | Ikeda | G06T 19/006 |
| | | | 345/419 |
| 2013/0016954 A1* | 1/2013 | Watanabe | G11B 27/34 |
| | | | 386/230 |
| 2013/0142452 A1* | 6/2013 | Shionozaki | G06T 15/205 |
| | | | 382/284 |
| 2014/0321736 A1 | 10/2014 | Onai et al. | |
| 2014/0340477 A1 | 11/2014 | Onai et al. | |
| 2014/0347560 A1 | 11/2014 | Onai et al. | |
| 2015/0201132 A1 | 7/2015 | Onai et al. | |
| 2015/0347076 A1* | 12/2015 | Terada | H02J 3/00 |
| | | | 345/1.1 |
| 2016/0012851 A1 | 1/2016 | Iida | |
| 2016/0219212 A1 | 7/2016 | Shoji | |
| 2016/0307361 A1 | 10/2016 | Shionozaki et al. | |
| 2016/0350974 A1 | 12/2016 | Hashimoto et al. | |

FOREIGN PATENT DOCUMENTS

| | | |
|---|---|---|
| EP | 2775452 A1 | 9/2014 |
| EP | 2775454 A1 | 9/2014 |
| EP | 2775455 A1 | 9/2014 |
| EP | 2779107 A1 | 9/2014 |
| ES | 2673545 T3 | 6/2018 |
| ES | 2675513 T3 | 7/2018 |
| ES | 2675514 T3 | 7/2018 |
| ES | 2676719 T3 | 7/2018 |
| JP | 06-105231 A | 4/1994 |
| JP | 2002-374494 A | 12/2002 |
| JP | 2004-145448 A | 5/2004 |
| JP | 2005-123824 A | 5/2005 |
| JP | 2007-027990 A | 2/2007 |
| JP | 2010-079570 A | 4/2010 |
| JP | 4599244 B2 | 12/2010 |
| JP | 2011-010128 A | 1/2011 |
| JP | 2013-118468 A | 6/2013 |
| JP | 5254505 B1 | 8/2013 |
| JP | 2014-016670 A | 1/2014 |
| JP | 5451955 B1 | 3/2014 |
| JP | 5620651 B2 | 11/2014 |
| JP | 2015-156540 A | 8/2015 |
| JP | 6380410 B2 | 8/2018 |
| TW | 201441972 A | 11/2014 |
| WO | 2006/022071 A | 3/2006 |
| WO | 2006/022071 A1 | 3/2006 |
| WO | 2014/013627 A1 | 1/2014 |
| WO | 2014/013628 A1 | 1/2014 |
| WO | 2014/013629 A1 | 1/2014 |
| WO | 2014/013630 A1 | 1/2014 |
| WO | 2014/155877 A1 | 10/2014 |
| WO | 2015/104860 A1 | 7/2015 |
| WO | 2018/096775 A1 | 5/2018 |

OTHER PUBLICATIONS

Extended European Search Report of EP Application No. 19812511.4, dated Jan. 15, 2021, 10 pages.

Office Action for EP Application No. 19812511.4 dated Dec. 16, 2021, pp. 5.

* cited by examiner

*FIG. 2*

|   | 0 | 1 | 2 |   | m |
|---|---|---|---|---|---|
| 0 | <PX0-0><br>DP0-0 | <PX0-1><br>DP0-1 | <PX0-2><br>DP0-2 |   | <PX0-m><br>DP0-m |
| 1 | <PX1-0><br>DP1-0 | <PX1-1><br>DP1-1 | <PX1-2><br>DP1-2 |   |   |
| ⋮ |   |   |   |   |   |
| n | <PXn-0><br>DPn-0 |   |   |   | <PXn-m><br>DPn-m |

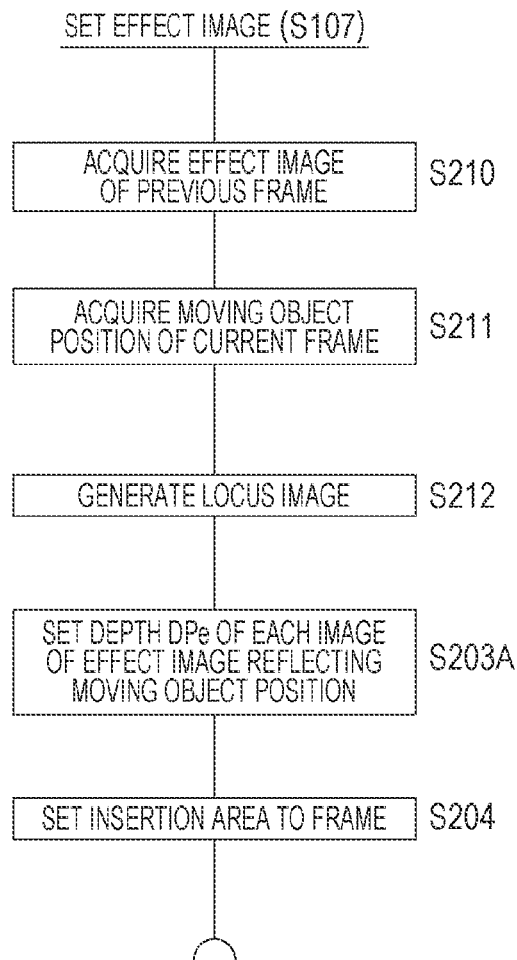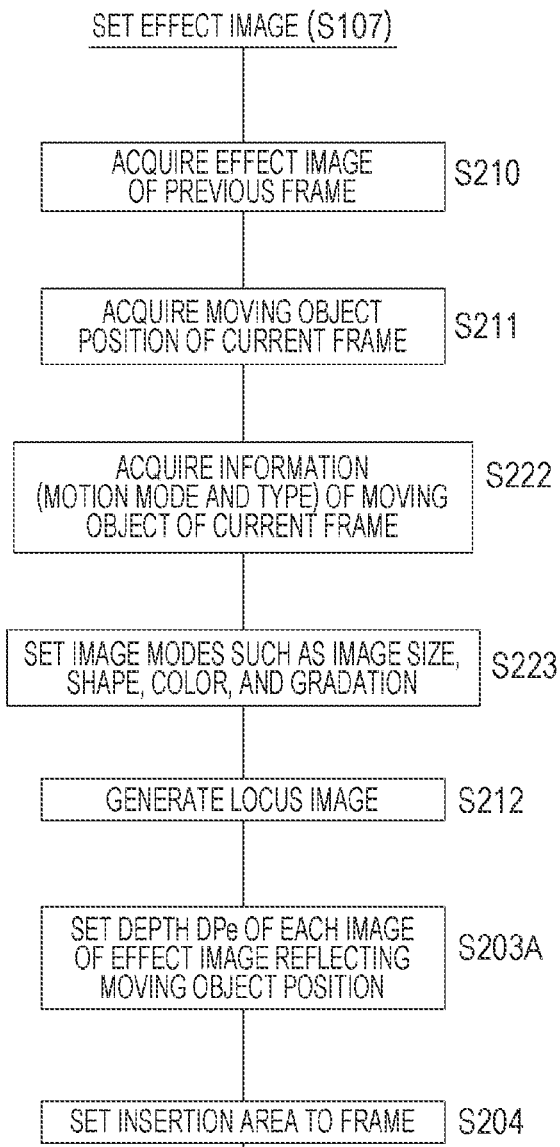

FIG. 10
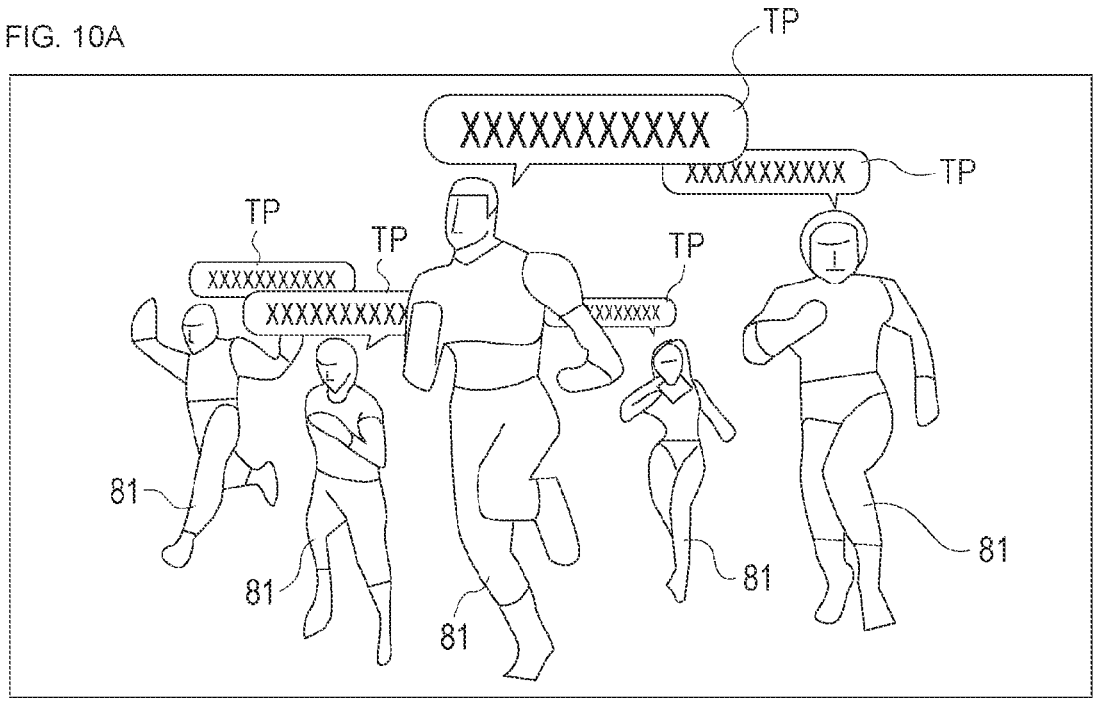
FIG. 10A
FIG. 10B
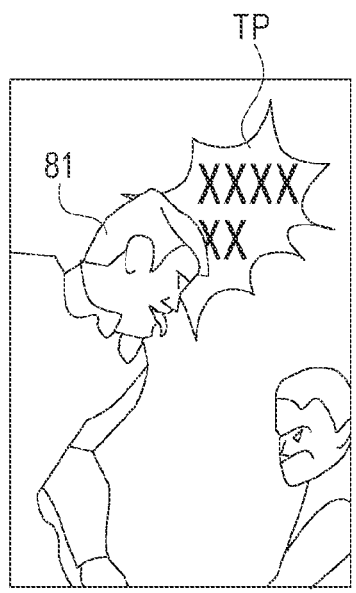
FIG. 10C
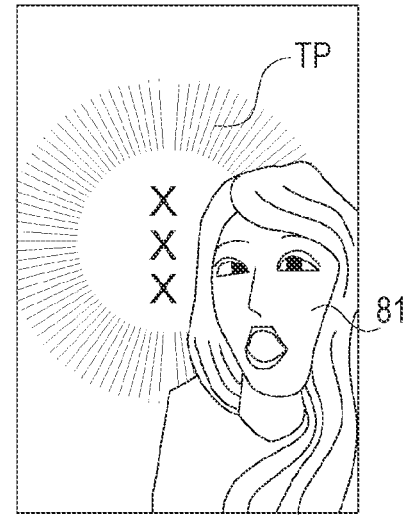
FIG. 10D

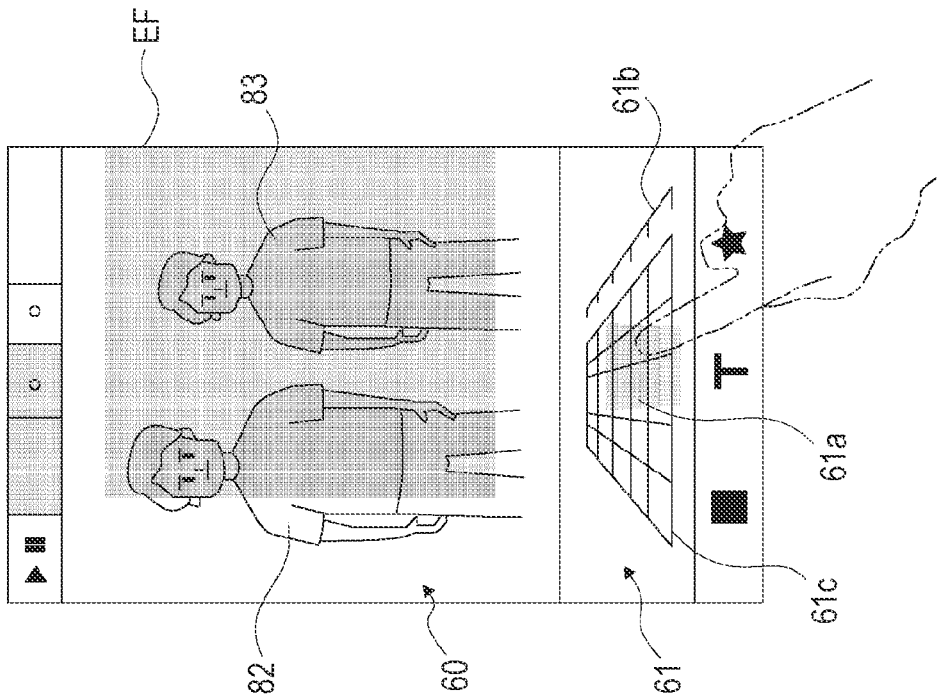
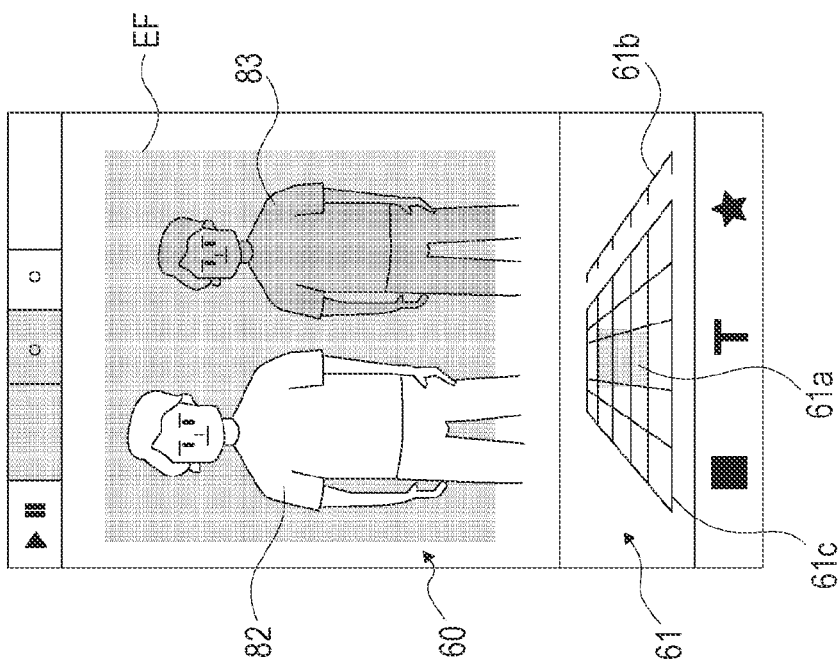

IMAGE PROCESSING APPARATUS AND IMAGE PROCESSING METHOD

CROSS REFERENCE TO RELATED APPLICATIONS

This application is a U.S. National Phase of International Patent Application No. PCT/JP2019/016198 filed on Apr. 15, 2019, which claims priority benefit of Japanese Patent Application No. JP 2018-102028 filed in the Japan Patent Office on May 29, 2018. Each of the above-referenced applications is hereby incorporated herein by reference in its entirety.

TECHNICAL FIELD

The present technology relates to an image processing apparatus, an image processing method, and a program for performing image editing for a moving image.

BACKGROUND ART

Image processing techniques for performing various types of image editing are known.

Patent Document 1 describes performing processing of determining a layout in consideration of a positional relationship when arranging and synthesizing a plurality of images.

CITATION LIST

Patent Document

Patent Document 1: Japanese Patent Application Laid-Open No. 2010-79570

SUMMARY OF THE INVENTION

Problems to be Solved by the Invention

In moving images as content of movies, dramas, and the like, changing the background and adding image effects are common, but these processes are usually realized by using a special imaging technique or editing software. Then such moving image editing work is not only complicated and time-consuming but also requires a high skill for workers.

Furthermore, the image effects are also effective for sports videos and the like. Then, application of motion capture is mainstream in realizing the image effects in real time, but it is not easy because advanced processes are required such as using markers.

Therefore, the present disclosure aims to realize simple and effective moving image editing by using depth information.

Solutions to Problems

An image processing apparatus according to the present technology includes an additional image generation unit configured to generate an additional image to be added to moving image data, and an image editing processing unit configured to perform image editing processing of adding the additional image to the moving image data, using depth information of a pixel in the moving image data to which the additional image is to be added.

In this case, as image data of a plurality of frames as a moving image, image data having depth information that is a value of a distance (depth) to an object with respect to a pixel is set as image data to be processed. Note that the depth information may be added to each pixel constituting the image data or may be added to each pixel block (for example, a unit of three pixels including an R pixel, a G pixel, and a B pixel) as color pixels. Alternatively, the depth information may be added to each pixel block, such as four pixels or nine pixels.

The image processing apparatus performs image editing of adding the additional image to the moving image for each such pixel (pixel block) using the depth information.

In the image processing apparatus according to the present technology, it is conceivable that the image editing processing unit performs image editing, reflecting a front-rear relationship between an object and the additional image, using the depth information of the object in the moving image data and depth information set for the additional image.

That is, the front-rear relationship between the additional image and the object is defined according to the depth information set for the additional image and the depth information of the object (pixels of each frame of the moving image data).

In the image processing apparatus according to the present technology, it is conceivable that the additional image is adjusted in size according to the depth information at an insertion position of the additional image in the moving image data and synthesized with the moving image data.

That is, the additional image generation unit or the image editing processing unit adjusts the size of the additional image on the basis of the depth information. Thereby, the additional image itself is expressed in a size according to perspective of the insertion position (in a state according to the law of perspective).

In the image processing apparatus according to the present technology, it is conceivable that the additional image is an effect image generated using a moving object detection result in the moving image data.

For example, an effect image expressing movement tracking, movement locus, or the like of a moving object in the moving image is generated as the additional image and is synthesized with the moving image.

In the image processing apparatus according to the present technology, it is conceivable that depth information according to a moving object is set for the effect image, and the image editing processing unit performs image editing, reflecting a front-rear relationship between an object and the additional image, using the depth information of the object in the moving image data and depth information set for the effect image.

The depth information according to the movement of the moving object is set for the effect image so that the effect image becomes an image corresponding to the depth of the moving object.

In the image processing apparatus according to the present technology, it is conceivable that depth information according to a moving object is set for the effect image, and the effect image is adjusted in size according to the depth information and synthesized with the moving image data.

That is, the additional image generation unit or the image editing processing unit adjusts the size of the effect image on the basis of the depth information. Thereby, the effect image itself is expressed in a size according to the perspective of the insertion position (that is, the position of the moving object in each frame) (in the state according to the law of perspective).

In the image processing apparatus according to the present technology, it is conceivable that the additional image is an effect image representing a locus of a moving object in the moving image data.

For example, an effect image expressing a movement locus of a moving object in the moving image is generated as the additional image and is synthesized with the moving image.

In the image processing apparatus according to the present technology, it is conceivable that the additional image is an effect image representing a motion mode or a motion type of a moving object in the moving image data.

There are various modes and types as the motion of the moving object in the moving image. An effect image expressing the various modes and types is generated as the additional image and synthesized with the moving image.

In the image processing apparatus according to the present technology, it is conceivable that the additional image is a telop image generated using a sound detection result in the moving image data.

A speech of a person in the moving image and the like are detected, the telop image thereof is generated as the additional image, and the telop image is synthesized with the moving image.

In the image processing apparatus according to the present technology, it is conceivable that the telop image is an image displaying text data on the basis of sound recognition from the moving image data.

A sound spoken in the moving image is recognized and text data is acquired. Then, the text data is displayed as a telop.

In the image processing apparatus according to the present technology, it is conceivable that the telop image is an image in a different mode according to a volume of a sound recognized from the moving image data.

For example, the telop image has different display modes, such as different sizes and fonts depending on sound volume and voice volume of the recognized sound.

In the image processing apparatus according to the present technology, it is conceivable that the telop image is an image in a different mode according to emotion information of a speaker in the moving image data.

For example, an emotion of the speaker is estimated from the recognized sound. Then, different display modes, such as different sizes and fonts, are set according to the emotion (anger, joy, or surprise) and the like.

In the image processing apparatus according to the present technology, it is conceivable that the additional image is an information presentation image generated using acquired information.

Information regarding the moving image is acquired from an information source, and an image presenting the information is generated as the additional image. Then, the additional image is synthesized with the moving image using the depth information.

In the image processing apparatus according to the present technology, it is conceivable to include an editing operation image generation unit configured to generate an edited image in which a time axis and a depth axis of a moving image are expressed as a user interface image for editing the additional image added to the moving image data.

In the case of editing a synthesized state of the additional image, an editing operation image to be used by a user for editing is generated and displayed. In this case, the edited image represents the time axis and the depth axis of the moving image.

In the image processing apparatus according to the present technology, it is conceivable that the editing operation image includes a display area having one axis as the time axis and the other axis as the depth axis.

For example, as one area, an area having the time axis in a horizontal direction and the depth axis in a vertical direction is provided to form an editing screen.

In the image processing apparatus according to the present technology, it is conceivable that the editing operation image is an image in which information in a time axis direction and an image at a certain point of time are simultaneously displayed.

For example, while the information in the time axis direction is displayed as a timeline, images at some points of time are simultaneously displayed.

In the image processing apparatus according to the present technology, it is conceivable that the editing operation image is an image in which an image at a certain point of time is simultaneously displayed with information in a time axis direction by specifying the certain point of time on an image indicating the information in a time axis direction.

For example, by designating the certain time point while displaying the information in the time axis direction as the timeline, the image at the point of time is displayed while the information on the timeline is kept presented.

In the image processing apparatus according to the present technology, it is conceivable that the editing operation image is an image in which an image at a certain point of time in a time axis direction is displayed as a stereoscopic image.

For example, the image at the point of time specified on the timeline is displayed as a stereoscopic image while the information in the time axis direction is displayed as a timeline.

An image processing method according to the present technology is an image processing method executed by an information processing apparatus including a process of generating an additional image to be added to moving image data, and a process of performing image editing processing of adding the additional image to the moving image data, using depth information of a pixel in the moving image data to which the additional image is to be added.

The program according to the present technology is a program for causing an information processing apparatus to execute processing steps corresponding to these processes.

With these methods or programs, an image processing apparatus capable of easily realizing various types of image editing is realized.

Effects of the Invention

According to the present technology, by using the depth information, the additional image as image synthesis or image effects with respect to the moving image is naturally added in the moving image, and a high-quality edited moving image can be easily generated.

Note that the effects described here are not necessarily limited, and any of effects described in the present disclosure may be exhibited.

BRIEF DESCRIPTION OF DRAWINGS

FIG. 2 is an explanatory diagram of depth information of an image to be processed according to the embodiment.

FIGS. 9A and 9B are flowcharts of the effect image setting processing according to the first embodiment.

FIGS. 10A, 10B, 10C, and 10D are explanatory diagrams of telop images according to a second embodiment.

FIGS. 15A and 15B are explanatory diagrams of an operation interface assuming a touch panel according to a fourth embodiment.

MODE FOR CARRYING OUT THE INVENTION

Hereinafter, an embodiment will be described in the following order.
<1. Configuration of Image Processing Apparatus>
<2. First Embodiment: Image Effect for Moving object>
<3. Second Embodiment: Telop Based on Sound Recognition>
<4. Third Embodiment: Addition of Information Presentation Image>
<5. Editing Interface: of Fourth Embodiment>
<6. Editing Interface: of Fifth Embodiment>
<7. Editing Interface: of Sixth Embodiment>
<8. Editing Interface: of Seventh Embodiment>
<9. Conclusion and Modification>
<1. Configuration of Image Processing Apparatus>

Figure 1:
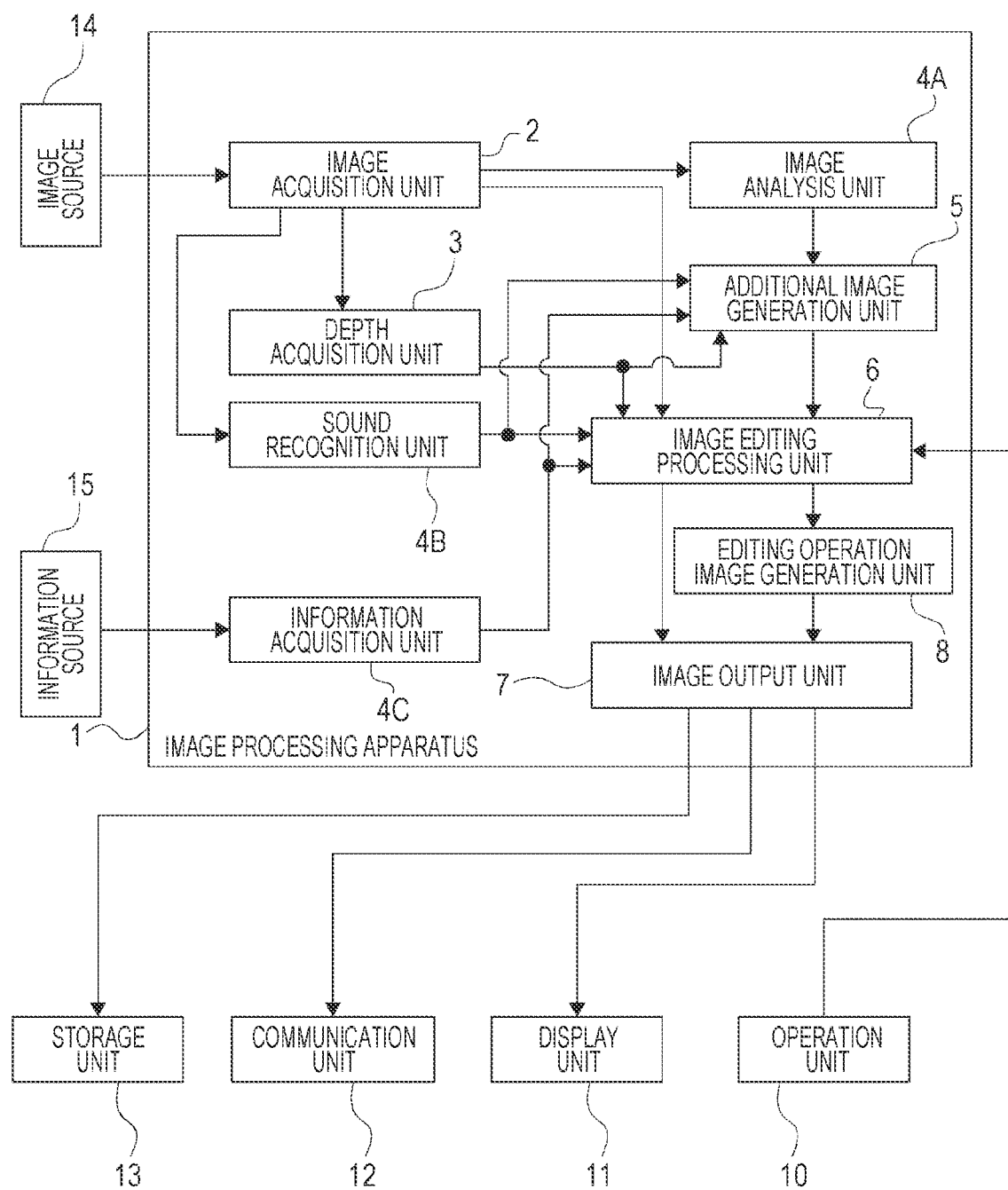
FIG. 1 is a block diagram of an image processing apparatus according to an embodiment of the present technology.

FIG. 1 illustrates a functional configuration of an image processing apparatus 1 according to the present disclosure and a peripheral configuration of the image processing apparatus 1. The image processing apparatus 1 includes an image acquisition unit 2, a depth acquisition unit 3, an image analysis unit 4A, a sound recognition unit 4B, an information acquisition unit 4C, an additional image generation unit 5, an image editing processing unit 6, an image output unit 7, and an editing operation image generation unit 8.

Furthermore, as an example of the peripheral configuration of the image processing apparatus 1, an operation unit 10, a display unit 11, a communication unit 12, a storage unit 13, an image source 14, and an information source 15 are illustrated.

The operation unit 10, the display unit 11, the communication unit 12, the storage unit 13, the image source 14, and the information source 15 may be provided in an apparatus integrated with the image processing apparatus 1 or may be provided in a separate apparatus and connected to the image processing apparatus 1 by wire or wireless communication.

First, the peripheral configuration of the image processing apparatus 1 will be described.

The operation unit 10 detects various user operations for image editing. The operation unit 10 may be configured to detect an operation of an operator such as an actual key or a switch, may be a mouse or a keyboard in a computer device, or may be configured to detect an operation of a sound input, a gesture input, a non-contact input, or the like. Furthermore, the operation unit 10 may be configured to detect a touch operation, a tap operation, or the like on, for example, a screen or a pad in an information processing apparatus such as a tablet or a smartphone.

The display unit 11 is a display unit that performs various displays to a user (a user of the image processing apparatus 1 or the like), and is, for example, a liquid crystal display (LCD) or an organic electro-luminescence (EL) display provided in a housing of an apparatus including the image processing apparatus 1. Alternatively, the display unit 11 may be a display device separate from an apparatus including the image processing apparatus 1.

The display unit 11 provides various displays for a user interface. For example, the image processing apparatus 1 displays an image generated by editing processing, a moving image before editing, an operator image such as an operation icon functioning as the above-described operation unit 10, and other necessary displays.

The communication unit 12 communicates with other devices by wired or wireless connection. For example, communication is performed according to a communication method by a wireless communication standard such as wireless fidelity (WiFi) (registered trademark) or Bluetooth (registered trademark). Alternatively, the communication unit 12 may communicate image data (a still image file or a moving image file) with external display device, recording device, reproduction device, or the like, or may perform communication as a network communication unit via various networks such as the Internet, a home network, and a local area network (LAN), and transmit and receive various data to and from servers, terminals, or the like on the network, for example.

The communication unit 12 transmits, for example, an image generated by the image processing apparatus 1 by the editing processing to an external device. Furthermore, the communication unit 12 may receive image data to be used for the editing processing from an outside.

The storage unit 13 includes, for example, a non-volatile memory, and stores original moving image data and edited image data obtained by editing the moving image data (in particular, edited image data to which an additional image has been added). Various modes are actually conceivable for the storage unit 5. For example, the storage unit 13 may be a solid-state memory such as a flash memory built in the housing of the apparatus, or may be a mode by a memory card attachable to and detachable from the apparatus (such as a portable flash memory) and a card recording and reproducing unit that performs recording or reproducing access to the memory card. Furthermore, the storage unit 13 may be realized as a hard disk drive (HDD), an optical disk, a disk drive, or the like.

The storage unit 13 stores the edited image data generated by the image processing apparatus 1. Furthermore, the image data used by the image processing apparatus 1 for the editing processing may be read from the storage unit 13.

Note that the storage unit 13 may store a program for causing a computer device to execute the processing as the image processing apparatus 1.

The image source 14 is illustrated as a supply source of the image data used by the image processing apparatus 1 for the editing processing. The image data as a moving image to be processed is supplied from the image source 14 to the image processing apparatus 1.

For example, the image source 14 may be an imaging device that captures a moving image or a reproduction device that reads and outputs a moving image from a storage medium. Alternatively, the communication unit 12 and the storage unit 13 may correspond to the image source 14.

The image data supplied by the image source 14 may be, for example, an image capturing operation as a real-time broadcast of a sport or a moving image captured or generated in the past. For example, every moving image such as a moving image produced as a movie or a drama, a moving image produced and posted by a general user, an animated moving image, a moving image generated by computer graphics, or the like is assumed. That is, any moving image can be considered as an object to be edited and processed by the image processing apparatus 1.

The information source 15 is illustrated as a supply source of some information to the image processing apparatus 1. The information is assumed to be, for example, information related to the moving image to be edited, information to be added to the moving image by editing, or other information. Examples of the information include information regarding players and teams, information regarding timeout, and information regarding skills, scores, and the like in the moving image of sports relay.

The information source 15 may be, for example, an information processing apparatus that provides information via a network as an information server or may be various sensor devices.

Next, a functional configuration of the image processing apparatus 1 will be described.

The image acquisition unit 2 in the image processing apparatus 1 acquires the image data to be edited and processed from the image source 14. For example, the image data to be processed may be a moving image to be broadcasted in real time or a moving image selected by the user from among moving images providable by the image source 14 as moving image content.

The depth acquisition unit 3 detects depth information of pixels of an image to be processed. In the present embodiment, depth information DP is added to each pixel of each frame in the image data that is the moving image to be edited and processed by the image processing apparatus 1. The depth information DP is information regarding a depth position of an object at the time of capturing the image.

For example, as illustrated in FIG. 2, the image data of one frame has a pixel array of 0 to n rows and 0 to m columns and is formed by $\{(m+1) \times (n+1)\}$ pixels PX0-0, PX0-1, . . . , and PXn-m.

Depth information items DP0-0, DP0-1, . . . , and DPn-m are added to the pixels PX0-0, PX0-1, . . . , and PXn-m. Each depth information is depth information at the time of capturing the object of the pixel. The depth acquisition unit 3 detects the depth information DP0-0, DP0-1, . . . , and DPn-m from the image to be processed.

Note that each of the pixels PX0-0 to PXn-m illustrated in FIG. 2 may be considered as one pixel by color such as an R pixel, a G pixel, or a B pixel, or the pixels PX0-0 to PXn-m may be considered as collective color pixels of an R pixel, a G pixel, and a B pixel. That is, the depth information DP (DP0-0 to DPn-m) may be added in units of individual pixels or may be added in color pixel units. Moreover, the depth information DP may be added to each pixel block in which a plurality of pixels (or a plurality of color pixels) is collected although not illustrated.

Since a technique for adding depth information of an object to a captured image is known, details thereof are omitted.

Note that the depth acquisition unit 3 may receive and acquire depth information detected by another device or sensor for image data to be processed, depth information registered in advance, or the like. Furthermore, the depth acquisition unit 3 may detect depth information arbitrarily set by the user.

The depth information of the pixels detected by the depth acquisition unit 3 is used in processing by the image editing processing unit 6 or the additional image generation unit 5.

The image analysis unit 4A in FIG. 1 performs analysis processing necessary for generation of the additional image in the additional image generation unit 5, such as analysis of the image data acquired by the image acquisition unit 2, recognition of the object, moving object, background in the image, determination of motion mode and motion type of the moving object, identification of a person, estimation of facial expression and emotion of the person, and estimation of movement of the moving object. The additional image is an image added to the moving image by image editing processing.

The sound recognition unit 4B receives sound data in the image data as the moving image to be processed acquired by the image acquisition unit 2, and recognizes and analyzes the sound. Then, the sound recognition unit 4B outputs information regarding sound content to the additional image generation unit 5 for generation of the additional information. Furthermore, the sound recognition unit 4B outputs information such as speech timing and a period (frame period) in which the additional image based on the sound recognition is displayed to the image editing processing unit 6.

As will be described in processing of a second embodiment below, the sound recognition unit 4 determines and analyzes a voice spoken by an object person in the sound recorded together with the moving image, and converts the speech content into text data, for example. Of course, it is also conceivable that the sound recognition unit 4B generates onomatopoeia data according to ambient sounds that are not human speech. For example, the sound recognition unit 4B recognizes a wind sound and generates onomatopoeic text data such as "hue".

The information acquisition unit 4C acquires information from the information source 15. The information to be acquired is information to be used for generation of the additional image by the additional image generation unit 5.

For example, the information acquisition unit 4C acquires the information regarding players and teams, the information regarding timeout, the information regarding game scores, and the like for the moving image of sports relay, and supplies the acquired information to the additional image generation unit 5 and the image editing processing unit 6.

The additional image generation unit 5 generates the additional image to be added to the moving image by image editing processing. In embodiments, an example of generating an effect image, a telop image, and an information presentation image as the additional images will be described.

For example, in a first embodiment, the additional image generation unit 5 generates an effect image according to moving object recognition by the image analysis unit 4A.

In a second embodiment, the additional image generation unit 5 generates a telop image according to a sound recognition result by the sound recognition unit 4B.

In a third embodiment, the additional image generation unit 5 generates an information presentation image indicating information acquired by the information acquisition unit 4C.

The image editing processing unit 6 performs the editing processing for the image data acquired by the image acquisition unit 2. In the present embodiment, in particular, the image editing processing unit 6 performs the image editing to add the additional image (effect image, telop image, information presentation image, or the like) generated by the additional image generation unit 8 onto an original moving image. Furthermore, in this image editing, the image editing processing unit 6 uses the depth information DP0-0 to DPn-m of the pixels of the frames from the depth acquisition unit 3.

The image output unit 7 outputs the image data as an edited image created by the image editing processing unit 6. That is, the image output unit 7 outputs the edited moving image created by the editing processing to the display unit 11 to display the edited moving image.

Furthermore, the image output unit 7 can also output the edited image data to the communication unit 12 to transmit the edited image data to an external device.

Furthermore, the image output unit 7 can also output the edited image data to the storage unit 13 to store the edited image data in a storage medium.

The editing operation image generation unit 8 generates an interface image that allows the user to manually edit the moving image.

In the present embodiment, the image editing processing unit 6 automatically edits the moving image acquired by the image acquisition unit 2 in real time according to user's selection of additional images and the like, and outputs the edited moving image from the image output unit 7.

However, synthesis of the additional image is not necessarily real time, and the user may also adjust or change synthesis and editing content of the additional image.

Therefore, an image for editing operation is prepared. The editing operation image generation unit 8 generates an image for the user operation, and is displayed on the display unit 11 via the image output unit 7, for example.

The user operation on the editing operation image is recognized by the image editing processing unit 6 as a function (for example, a touch operation on the screen) of the operation unit 10 and reflected in the editing processing. Furthermore, the editing operation image generation unit 8 switches the editing operation image according to the user operation, for example.

For example, by providing the functional configuration as illustrated in FIG. 1, the image processing apparatus 1 according to the embodiment can perform various types of image editing to be described below and generate an edited image.

Figure 3:
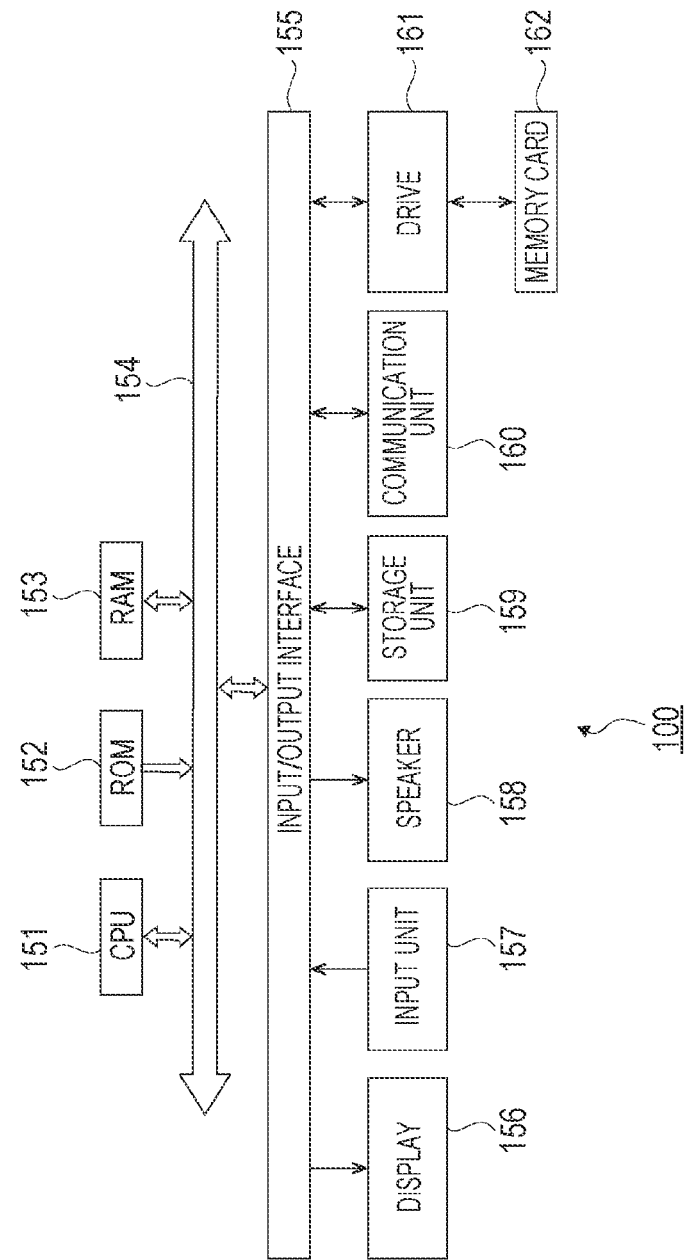
FIG. 3 is a block diagram of an information processing apparatus that realizes the image processing apparatus of the embodiment.

Such an image processing apparatus 1 is realized by, for example, an information processing apparatus 100 having a hardware configuration as illustrated in FIG. 3.

As illustrated in FIG. 3, the information processing apparatus 100 includes a central processing unit (CPU) 151, a read only memory (ROM) 152, and a random access memory (RAM) 153.

The CPU 151 executes various types of processing according to a program stored in the ROM 152 or a program loaded from a storage unit 159 to the RAM 153. Furthermore, the RAM 153 appropriately stores data and the like necessary for the CPU 151 to execute the various types of processing.

The CPU 151, the ROM 152, and the RAM 153 are mutually connected via a bus 154. An input/output interface 155 is also connected to the bus 154.

A display 156 including a liquid crystal panel or an organic EL panel, an input unit 157 including a keyboard and a mouse, a speaker 158, the storage unit 159 including an HDD, a communication unit 160, and the like can be connected to the input/output interface 155.

In a case where the display unit 11 in FIG. 1 is integrated with the information processing apparatus 100, the display 156 means the display unit 11. Of course, the display unit 11 may be a separate device from the information processing apparatus 100. In that case, the display 156 may be a separate device connected to the input/output interface 155.

The input unit 157 in FIG. 3 means an input device used by the user who uses the information processing apparatus 100, but also includes a function as the operation unit 10 in FIG. 1, for example.

The communication unit 160 performs communication processing via a network including the Internet and communication with devices in peripheral units, and also has a function as the communication unit 12 in FIG. 1, for example.

Furthermore, a drive 161 is connected to the input/output interface 155 as needed. A memory card 162 is attached to the drive 161 and a computer program read from the memory card 162 is installed in the storage unit 159 as needed, or data processed by the CPU 151 is stored in the memory card 162. Of course, the drive 161 may be a recording/reproducing drive for a removable storage medium such as a magnetic disk, an optical disk, or a magneto-optical disk.

The drive 161 and the memory card 162 also have a function as the storage unit 13 in FIG. 1.

In the hardware configuration as illustrated in FIG. 3, the processing as the image processing apparatus 1 according to the embodiment, that is, the processing as the image acquisition unit 2, the depth acquisition unit 3, the image analysis unit 4A, the sound recognition unit 4B, the information acquisition unit 4C, the additional image generation unit 5, the image editing processing unit 6, the image output unit 7, and the editing operation image generation unit 8 in FIG. 1 can be performed.

That is, these processes are realized by software activated by the CPU 151. The program constituting the software is downloaded from the network or read from the removable storage medium and installed in the information processing apparatus 100 in FIG. 3. Alternatively, the program may be stored in advance in the HDD or the like as the storage unit 159.

Then, when the program is activated in the CPU 151, the CPU 151 becomes able to perform various types of image editing processing to be described below in detail.

Note that the image processing apparatus 1 according to the embodiment is not only configured by the information processing apparatus (computer device) 100 having the hardware configuration in FIG. 3 alone but is also configured by a system of a plurality of computer devices. The plurality of computer devices may be systemized by a LAN or the like or may be remotely located by a virtual private network (VPN) or the like using the Internet or the like. The plurality of computing devices may include a computer device that can be used by a cloud computing service.

Furthermore, the information processing apparatus 100 in FIG. 3 can be realized as a stationary-type or notebook-type personal computer, or a mobile terminal such as a tablet terminal, a smartphone, or the like. Moreover, the image processing apparatus 1 according to the present embodiment can be mounted in an electronic device such as a television device, a monitor device, an image editing device, and an imaging device having a function as the information processing apparatus 100.

<2. First Embodiment: Image Effect for Moving Object>

As a first embodiment of editing processing of adding an additional image to a moving image by an image processing apparatus 1, processing of adding an effect image of a moving object will be described.

As the effect image of a moving object, for example, an image that emphasizes movement of the moving object appearing in a moving image,
an image that shows a locus of the movement of the moving object appearing in a moving image,
an image that represents a type of the movement of the moving object appearing in a moving image,
an image that represents a mode of the movement of the moving object appearing in a moving image,
an image that illustrates prediction of the movement of the moving object appearing in a moving image,
an image that represents different multiple moving objects appearing in a moving image,
a composite image of the aforementioned images, and the like are conceivable. Of course, the above images are examples, and the effect image is not limited to these examples.

Furthermore, the moving object is an object that moves in a moving image and is assumed to be a person, an animal, an article, a part of them (for example, a hand of the person), or the like.

Examples of images to which an effect image of such a moving object is added are illustrated in FIGS. 4A, 4B, 4C, 4D, 4E, 4F, 5A, and 5B.

FIGS. 4A, 4B, 4C, 4D, 4E, and 4F illustrate scenes of a moving image of figure skating.

Figure 4A:
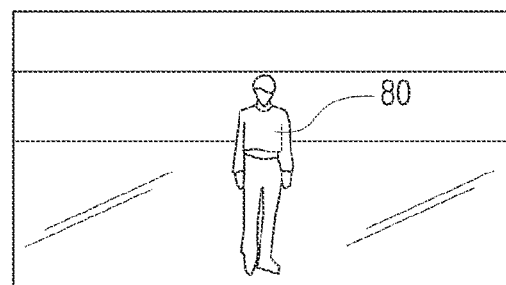
FIGS. 4A, 4B, 4C, 4D, 4E, and 4F are explanatory diagrams of effect images for a moving object according to the first embodiment.

FIG. 4A is an image before the start of performance. A skater is set as a moving object 80.

Figure 4B:
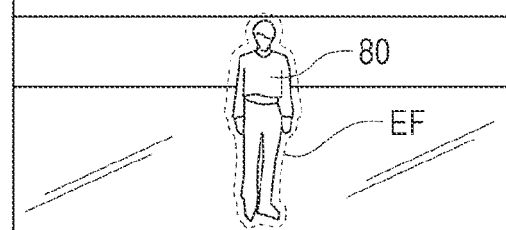

FIG. 4B is an image obtained by adding an effect image EF for predicting the start of movement of the skater before the start of performance.

Figure 4C:
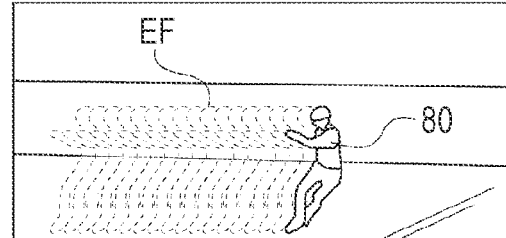

FIG. 4C is an image obtained by adding an effect image EF for illustrating a locus of the movement of the body of the skater and emphasizing the movement during the performance.

Figure 4D:
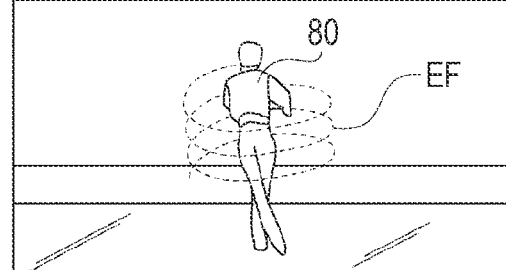

FIG. 4D is an image obtained by adding an effect image EF representing spin during the performance. A spiral line is displayed as the image representing spin. In this case, a portion behind the skater (the portion behind the skater) is hidden by the skater's body.

Figure 4E:
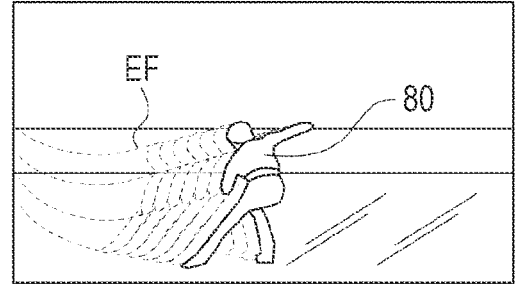

FIG. 4E is an image obtained by adding an effect image EF illustrating movement leading to a pose of the end of the performance, for example. The effect image EF is an image corresponding to the position of the body from immediately preceding timing, and has a size according to the position (depth) in a depth direction.

Figure 4F:
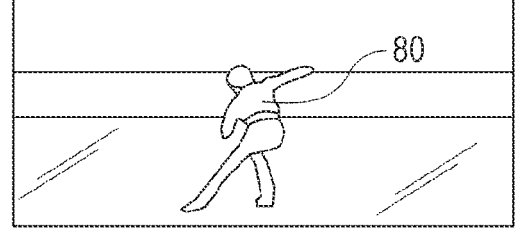

FIG. 4F is an image to which no effect image EF is added.

For example, such effect images EF are added in a moving image of a skating competition, whereby a more powerful moving image, a moving image with improved aesthetics, a moving image presenting movement of a skater in an easy-to-grasp manner, and the like can be realized.

Figure 5A:
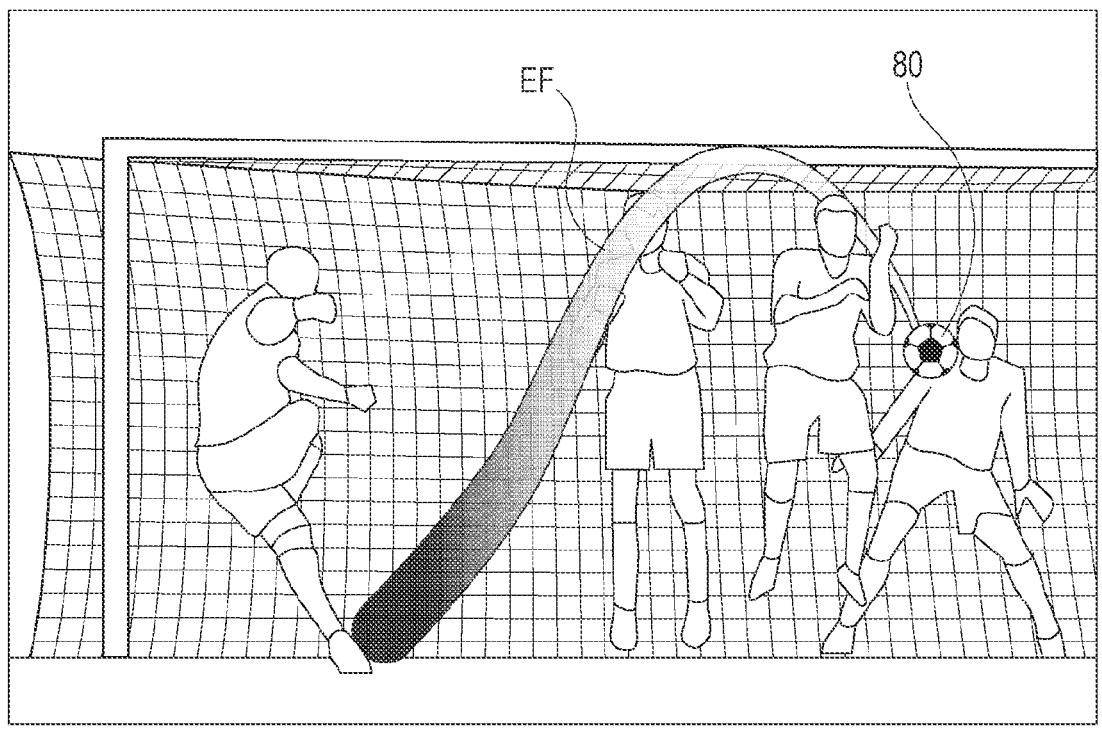
FIGS. 5A and 5B are explanatory diagrams of effect images for a moving object according to the first embodiment.

FIG. 5A illustrates a soccer free kick scene.

In this case, a ball kicked by an offense player is set as a moving object 80, and an effect image EF representing a locus of the ball is added.

This effect image EF reflects a front-rear relationship with other players or the like at each point of time. For example, in the locus of the ball, a part behind a defense player is hidden in the player's head and is not visible. By using the depth information of each object (ball or player) at each point of time (each frame), the effect image EF representing the locus of the ball can be displayed in the correct front-rear relationship between the effect image EF and the actual object.

Furthermore, the width of the effect image EF representing the locus becomes smaller according to the position of the ball. This expresses a distance (perspective) of the ball at each point of time from an imaging position on the basis of the depth information.

Furthermore, the effect image EF of the locus of the ball is made to gradually change in color, density, or the like. This illustrates a motion mode of the ball by setting the color or density according to an analysis result of a rotation speed of the ball, for example.

Figure 5B:
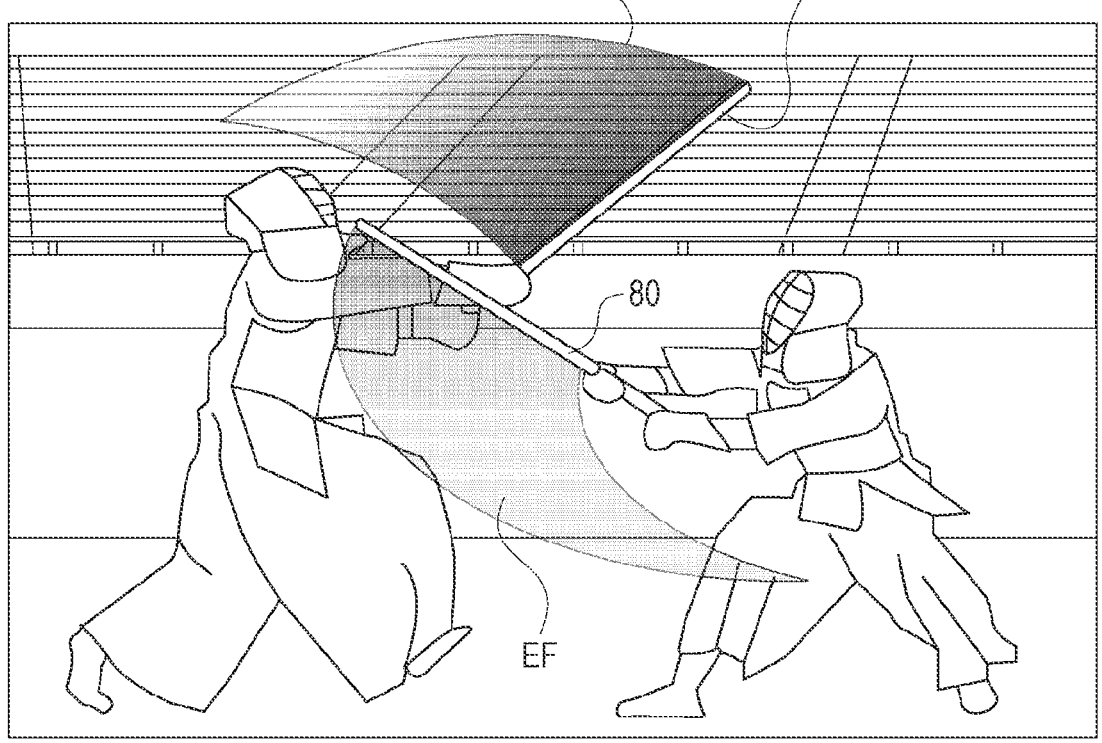

FIG. 5B illustrates a kendo game scene.

In this case, bamboo swords of both players are set as moving objects 80, and effect images EF representing and emphasizing movement of the bamboo swords are added.

In the effect images EF, the color and display mode are changed between the bamboo sword of the right player and the bamboo sword of the left player. This allows a viewer to more clearly understand the movement of the bamboo swords of both the players.

The effect images EF representing the loci of the bamboo swords are made to reflect the front-rear relationship according to the depth information of the bamboo swords and the players at each point of time (each frame). As a result, the front-rear relationship seen from a position where an imaging device is present is reflected in the effect images EF.

A processing example of the image processing apparatus 1 that adds the effect image EF as described above will be described.

Note that the processing example of each embodiment described below is executed in the image processing apparatus 1 using the functions illustrated in FIG. 1.

Figure 6:
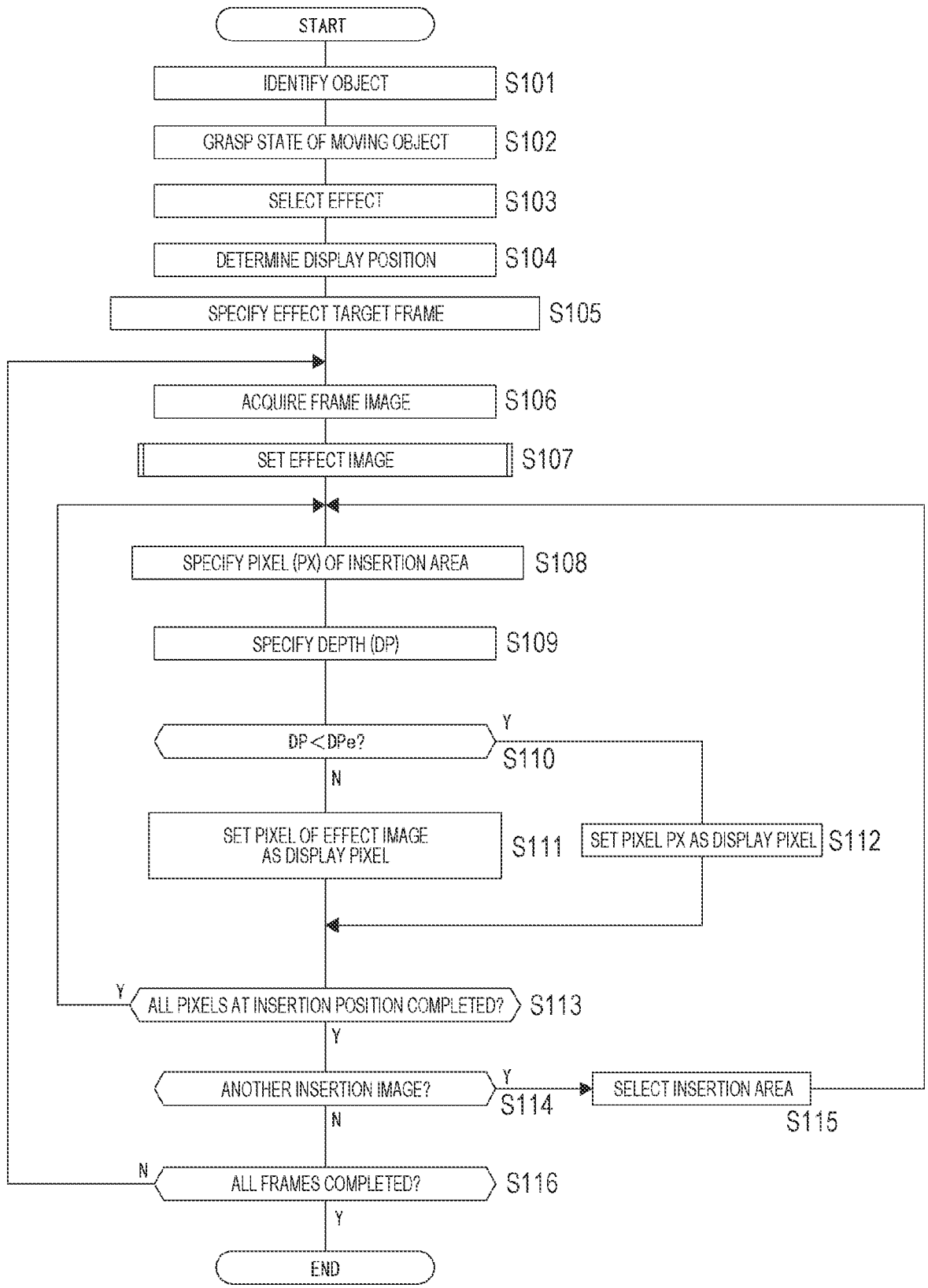
FIG. 6 is a flowchart of an example of effect processing for a moving object according to the first embodiment.

The processing example in FIG. 6 is an example of a case of acquiring moving image content recorded in an image source, for example, and editing the moving image. Note that an example of performing editing processing in real time for an input moving image, which can be applied during real-time relay or the like, will be described below with reference to FIG. 8.

In step S101 in FIG. 6, the image processing apparatus 1 identifies an object in a moving image to be processed. That is, the image processing apparatus 1 develops information in the image by a depth map, and grasps positional relationship of a person or an article as the object. The depth map mentioned here is a map of the depth information for each pixel as illustrated in FIG. 2, for example. The front-rear relationship of each object can be grasped according to the depth map. "Front" of "front-rear" referred to here is a close side to the imaging device, and "rear" of "front-rear" is a distant side (back side) from the imaging device.

Note that a pixel range in which each object is captured can be determined from analysis of luminance information, color information, edge detection, and the like, but the pixel range in which each object is captured can be more accurately determined using the depth information of pixels. This is because depth values are not greatly different in the pixel range in which one object is captured.

In step S102, the image processing apparatus 1 grasps a state of a moving object. That is, the image processing apparatus 1 identifies a moving object and a static object of the object included in the image data, and grasps content of each object such as the background and a person, for example.

In step S103, the image processing apparatus 1 selects an effect. That is, what kind of effect image EF is to be added to the moving object 80 is selected. For example, an effect image EF representing rotation, an effect image EF representing a locus, or the like is selected. Furthermore, details of the effect image EF, such as the color and shape, and an effect duration are determined.

The above-described effect selection may be automatically set by the image processing apparatus 1 or may be set according to a user input. Alternatively, some setting items may be automatically set and some others may be modified by the user.

In step S104, the image processing apparatus 1 determines a display position. This is processing of determining the display position of the effect image EF with respect to the moving object 80 (a position relative to the moving object 80) in the image. The display position of the effect image EF in each frame unit is determined in step S107 according to the relative position determined here.

In step S105, the image processing apparatus 1 specifies an effect target frame. For example, a frame for which the image effect is started in the moving image is specified. Alternatively, a frame range (a start frame and an end frame) may be specified.

It is conceivable that the user designates and inputs frames in a scene of the moving image, and the image processing apparatus 1 sets the frames as the start frame and the end frame.

Alternatively, the image processing apparatus 1 may detect the moving object 80 to which the effect image EF is to be added from the image data, automatically select a scene where the moving object 80 appears, and specify the start frame and the end frame from the scene.

Moreover, the image processing apparatus 1 may automatically specify a frame section in which the moving object 80 appears and is moving.

What kind of effect image EF is synthesized in which section of the moving image is determined by steps up to step S105. The processing up to this point for the moving image is mainly executed by the functions of the image acquisition unit 2, the depth acquisition unit 3, and the image analysis unit 4A in FIG. 1. Settings related to user designation are processing by the function of the image editing processing unit 6 in response to the input from the operation unit 10.

Hereinafter, the image processing apparatus 1 performs processing in steps S106 to S116 for each frame constituting the moving image.

In step S106, the image processing apparatus 1 acquires (specifies) frame image data to be processed. For example, initially, image data of a first frame of the effect target section specified in step S105 is set as the image data to be processed.

In step S107, the image processing apparatus 1 sets the effect image EF to serve as the additional image to the acquired frame image data by the function of the additional image generation unit 5.

Figure 7:
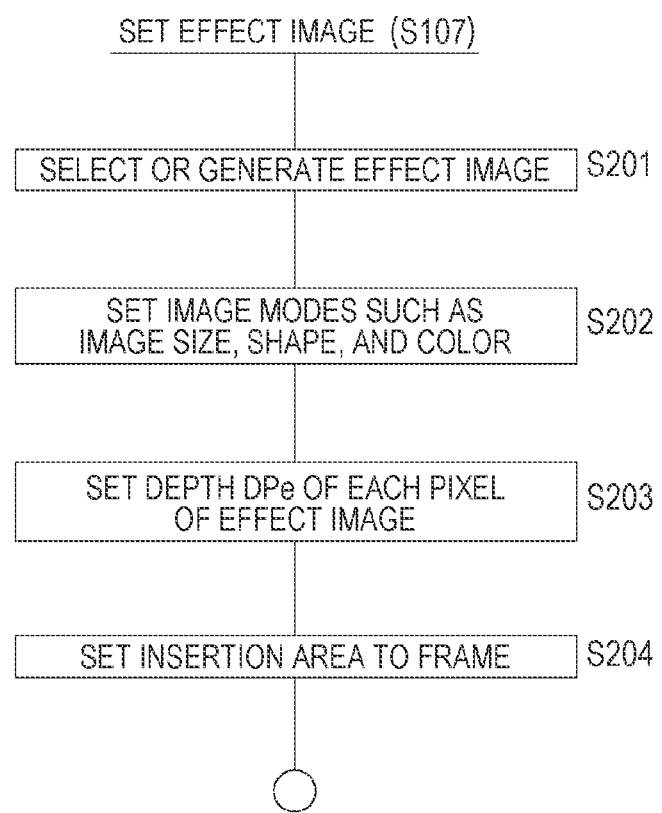
FIG. 7 is a flowchart of effect image setting processing according to the first embodiment.

Processing of setting the effect image EF is illustrated in FIG. 7.

First, in step S201, the image processing apparatus 1 selects or generates an image to be added as an effect. This is processing of preparing an image according to the effect selected in step S103 as the effect image EF to be added to the frame. The image to be prepared may be selected from images prepared in advance for each type of an effect and the like as the image to be used for the frame, or may be generated according to image content of the frame.

In step S202, the image processing apparatus 1 sets image modes such as the image size, shape, and color, for the image prepared as an effect to be added. For example, the image mode is set according to the size and motion mode of the moving object 80 in the frame in the image.

The effect image EF to be added to the frame is determined in a state where the image modes have been set.

Note that the effect image EF to be added to the image of one frame is not limited to one image in which pixels are continuous and may be a plurality of images as a matter of course.

In step S203, the image processing apparatus 1 sets depth information DPe of each pixel constituting the effect image EF itself. For example, the depth information DPe is set on the basis of the depth of the moving object 80 in the frame.

In step S204, the image processing apparatus 1 sets an insertion area in the frame for the effect image EF. That is, this is processing of determining where on a screen the effect image EF is added. This is set on the basis of, for example, the position of the moving object 80 in the frame, the position of the effect image EF in the previous frame, and the like.

Note that, in a case where there is a plurality of effect images EF, the insertion area is set for each of the effect images EF.

After setting the effect image EF as described above, the image processing apparatus 1 performs processing in step S108 and subsequent steps in FIG. 6 by the function of the image editing processing unit 6.

In step S108 and thereafter, the image processing apparatus 1 sequentially compares each pixel PX included in the set insertion area with the depth information DPe set for each pixel of the effect image EF, on the image data of the frame.

First, in step S108, the image processing apparatus 1 specifies one pixel PX in the area set as the insertion area in the frame image data, and in step S109, the image processing apparatus 1 specifies the depth information DP of that pixel PX.

Note that, here, if the number of set insertion areas is one, a pixel in the insertion area is specified as the pixel to be processed as a matter of course.

If the number of set insertion areas is plural, a pixel in the first insertion area is specified as the pixel to be processed, for example.

In step S110, the image processing apparatus 1 compares the depth information DP of the target pixel PX with the depth information DPe of a pixel in the effect image EF that is supposed to be inserted at the position of the pixel PX.

In the case of DP<DPe, the pixel PX in the frame image data is a pixel of an object on a front side of the effect image EF. Therefore, the image processing apparatus 1 proceeds to step S112 and sets the pixel PX as a pixel to be displayed as it is on the edited image data.

In the case of not DP<DPe, the pixel PX in the frame image data is a pixel of an object behind the depth of the effect image EF. Therefore, in this case, the image processing apparatus 1 proceeds to step S111 and replaces a pixel data value of the image PX with a pixel data value corresponding to a pixel position in the effect image EF (additional image) on the image data. That is, the pixel data of the effect image EF is set as the pixel to be displayed.

In step S113, the image processing apparatus 1 confirms whether or not the above processing has been completed for all the pixels in the insertion area that is currently the insertion area to be processed. When the processing has not been completed, the processing returns to step S108, and the next pixel PX to be processed is specified in the insertion area being currently processed and the processing in steps S109 to S112 is similarly performed.

When determining that the processing in steps S109 to S112 has been completed for all the pixels of one insertion area in step S113, the image processing apparatus 1 confirms in step S114 whether or not there is another set insertion area.

In the case where the number of insertion areas set in step S204 in FIG. 7 is one, the processing for the frame is completed.

In the case where a plurality of insertion areas is set and there is an unprocessed insertion area, the next insertion area is selected in step S115 and the processing in steps S108 to S113 is performed for the insertion area.

When confirming in step S114 that the processing for all the insertion areas has been completed, the image processing apparatus 1 terminates the processing for the current frame and proceeds to step S116.

When the processing for all the frames as the section for which the effect is performed has not been completed, the image processing apparatus 1 returns to step S106, acquires the frame image data of the next frame to be processed, and similarly performs the processing in steps S107 to S115.

The image processing in FIG. 6 is completed when the processing has been completed for all the frames to which the effect image EF is added.

The edited image data to which the effect image EF as described in FIGS. 4B, 4C, 4D, and 4E are added on the moving image is generated at the point of time when the processing in FIG. 6 is completed.

The edited image data thus generated is output by the image output unit 7, and is displayed on the display unit 11, transferred by the communication unit 12 to an external device, or stored in the storage medium in the storage unit 13.

In the above processing in FIG. 6, the effect image EF is synthesized with the original frame image data using the depth information DP and DPe, and the display modes such as the size are set according to the depth information DP and DPe. Therefore, a natural effect image EF can be realized with respect to the moving object 80 in the scene of the original moving image. This also enables creation of an image representation in which a graphical effect is blended into an object space.

By the way, the above processing in FIG. 6 has been described as a processing example performed for a moving image generated by imaging or the like in advance. However, there are some cases where the effect image EF is desired to be added to a captured moving image in almost real time, for example, in a broadcast. Such a processing example having real-time properties is illustrated in FIG. 8.

For example, an operator as a broadcasting staff performs an operation to give an instruction of the start of an effect from a certain point of time, and the image processing apparatus 1 adds the effect image EF in real time at and after the point of time.

Figure 8:
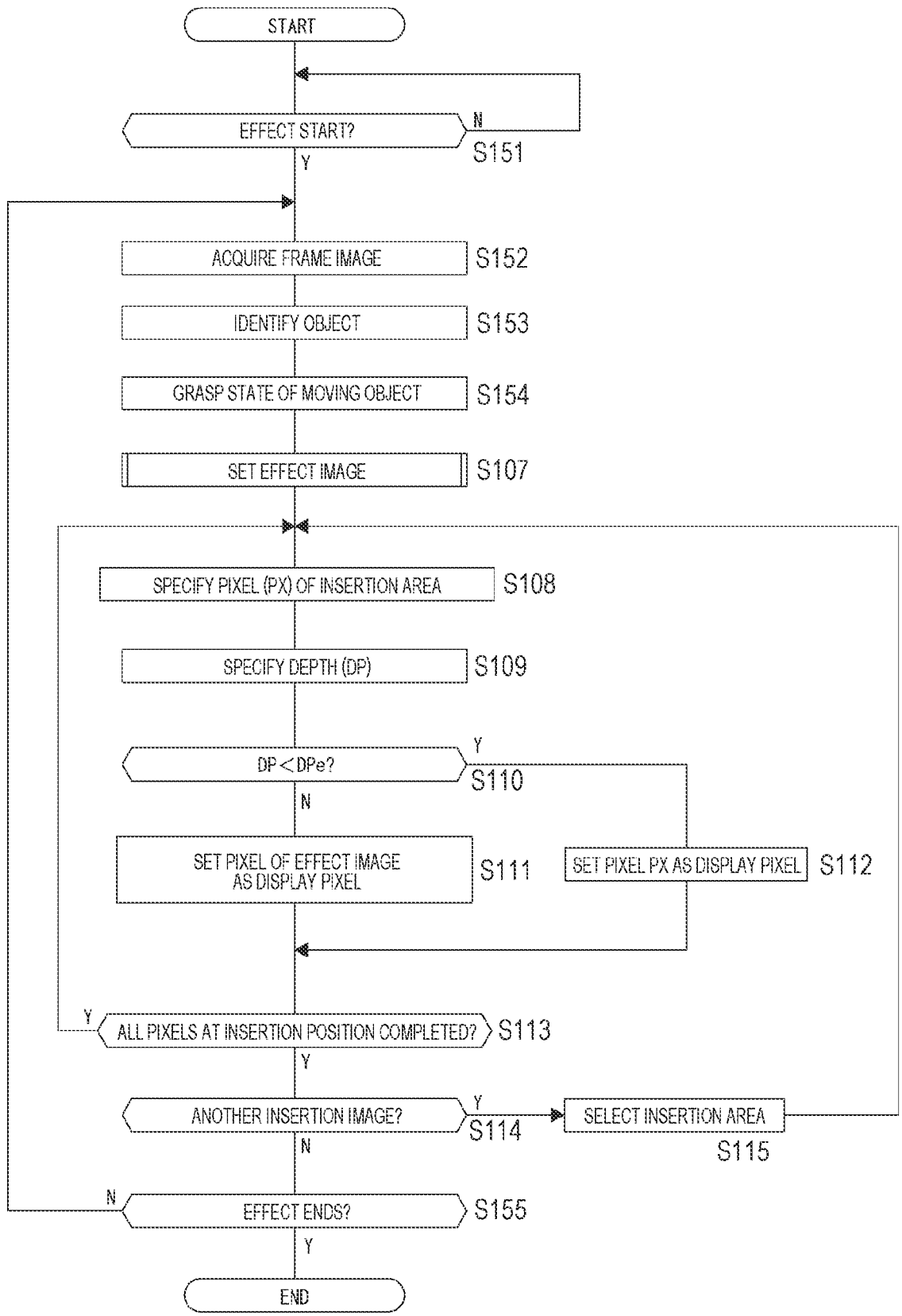
FIG. 8 is a flowchart of another example of effect processing for a moving object according to the first embodiment.

Note that, in the case of FIG. 8, it is assumed that the selection of the effect and the determination of the display position described in steps S103 and S104 in FIG. 6 are performed in advance, and an instruction of start/end timing of the effect is given by the operator (or instruction by some automatic control). For example, it is assumed that display of the effect image EF representing the locus of the moving object 80 as in FIG. 5A or 5B at a position on the moving locus of the moving object is determined.

In step S151, the image processing apparatus 1 recognizes the instruction of effect start, the image processing apparatus 1 proceeds to step S152 and subsequent steps.

After that, the image processing apparatus 1 performs the processing in steps S152 to S154 and steps S107 to S115 for each captured and supplied frame until detecting the instruction of effect end in step S155.

In step S152, the image processing apparatus 1 acquires the frame image data. That is, the image processing apparatus 1 acquires one frame input in real time from the image source 14 (for example, an imaging device).

Note that, from this, it is assumed that the processing in steps S152 to S154 and S107 to S115 is performed within one frame period.

In step S153, the image processing apparatus 1 identifies an object in the frame image data. That is, the image processing apparatus 1 develops information in the image by a depth map, and grasps positional relationship of a person or an article as the object.

In step S154, the image processing apparatus 1 grasps a state of a moving object. That is, the image processing apparatus 1 identifies a moving object and a static object of the object included in the frame image data, and grasps content of each object such as the background and a person, for example.

In step S107, the effect image EF is set.

FIG. 9A illustrates an example of setting the effect image EF representing a locus of a moving object.

In the case of the processing example in FIG. 9A, the image processing apparatus 1 acquires the effect image EF added to a previous frame in step S210. Of course, in the case of the first frame from the effect start, acquisition of the effect image EF is not necessary because there is no effect image EF added to a previous frame.

In step S211, the image processing apparatus 1 acquires the position of the moving object 80 in the current frame. The position of the moving object 80 here means a position within a screen of the current frame, that is, a pixel range in which the moving object 80 is captured.

In step S212, the image processing apparatus 1 generates a locus image that is the effect image EF of the current frame. Specifically, the locus image (effect image EF) of the current frame is generated by adding an image according to the position of the moving object 80 in the current frame to the effect image EF of the previous frame, that is, the locus image up to the point of time of the previous frame (by extending the image representing the locus). In the case of the first frame from the effect start, the locus image is generated according to the position of the moving object 80 in the current frame.

In step S203A, the image processing apparatus 1 sets the depth information DPe of each pixel constituting the locus image (effect image EF) itself, reflecting the position of the moving object 80 in each frame.

Note that the pixel position and depth are regarded as being already set by using the effect image up to the previous frame as it is for the locus portion up to the previous frame. Here, as for pixels of the extended portion as the locus this time, the depth information DPe of the effect image EF is only required to be set using the depth information DP given to the pixels of the moving object 80 of the current frame. There are some cases where the moving object is hidden by another object depending on a frame, in that case, the position and depth of the moving object in the current frame are only required to be estimated from the locus of the moving object 80 up to the previous frame.

In step S204, the image processing apparatus 1 sets an insertion area in the frame for the effect image EF. That is, this is processing of determining where on a screen the effect image EF is added. This is set on the basis of, for example, the position of the moving object 80 in the frame, the position of the effect image EF in the previous frame, and the like.

After setting the effect image EF as described above, the image processing apparatus 1 proceeds to step S108 and the subsequent steps in FIG. 8. Steps S108 to S115 are similar to steps S108 to S115 in FIG. 6. That is, the image processing apparatus 1 sequentially compares each pixel PX included in the set insertion area with the depth information DPe set for each pixel of the effect image EF on the image data of the frame, and determines which of the original image data of the frame or the effect image EF is to be set as a display pixel, reflecting the front-rear relationship.

The above processing is performed for one frame, and in the next frame, the processing in FIG. 8 is executed again from step S152.

Thereby, the effect image EF that draws the moving locus of the moving object is added to the moving image as the moving image progresses.

By the way, the setting of the effect image EF in step S107 may be performed as in FIG. 9B.

Steps S210 and S211 in FIG. 9B are similar to those in FIG. 9A. The effect image EF of the previous frame is acquired, and the position of the moving object 80 of the current frame is acquired.

In step S222, the image processing apparatus 1 acquires the information on the moving object 80 of the current frame. This is the information of the motion mode, the motion type, and the like.

Examples of the motion mode include speed, behavior, moving direction, moving posture, and moving state of the moving object 80.

For example, in the case of the ball in FIG. 5A, moving speed, rotating speed, moving direction, and the like of the ball are examples of the motion mode. A pitching type by a baseball pitcher is also assumed as the information of the motion mode.

The motion type is assumed to be a type regarding movement of a moving object, a type of the moving object itself, a type of a person who moves the moving object, or the like. For example, which of the teams a person who kicked the ball belongs to in a soccer game between team A and team B, or which of kendo players, is one of the type of a person who moves the moving object. Furthermore, for example, when a person or an animal is the moving object 80, gender, age group, animal type (for example, dog or cat, type of a flying bird, or the like) as the moving object 80 is an example of the type of the moving object 80 referred to here.

In step S223, the image processing apparatus 1 sets the image modes of the effect image EF according to the acquired information (mode and type) of the moving object 80. For example, the color, luminance, density, gradation, and the like of the effect image EF to be displayed are set according to the information.

Then, in step S212, the locus image, that is, the effect image EF to be added to the current frame is generated reflecting the settings of the image modes.

Steps S203A and S204 are similar to those in FIG. 9A.

For example, as in FIG. 9B, the locus image (effect image EF) is generated reflecting the information of mode or type of the moving object 80, whereby a moving image that allows a viewer to easily grasp a motion or an interesting moving image can be provided.

For example, an image representing the rotation speed of the ball can be obtained by changing the color or density in a gradational manner in the locus of the ball in FIG. 5A.

Furthermore, in the case in FIG. 5B, a moving image that allows a viewer to easily grasp the movement of the bamboo sword of each player can be realized by displaying the movement of the bamboo sword in a different color for each kendo player.

Although not illustrated, a moving image representing a control rate of the ball of each team can be realized by displaying the locus of the ball in a color according to the team of the player who last touched the ball in the soccer game, for example.

As the first embodiment, the processing example regarding the image effect for the moving object 80 has been described. However, various image effects according to the moving object 80 are further conceivable.

As the information of the moving object 80, in the case where the moving object 80 is a human, it is conceivable to change the mode of the effect image EF by using information of personal identification, information of a facial expression, information of an emotion estimated from the facial expression, a voice, or the like.

Furthermore, the effect image EF of the moving object 80 is not limited to the locus image, and an image representing tracking of the moving object, an image representing movement prediction of the moving object, an image representing only the motion type or the motion mode of the moving object, or the like is assumed.

<3. Second Embodiment: Telop Based on Sound Recognition>

As a second embodiment, an example of displaying a telop based on sound recognition as an additional image to a moving image will be described.

For example, a telop can be added to a moving image by real-time or non-real-time editing by using a sound recognition technology. By properly reproducing a front-rear relationship between a person who has spoken and a telop, a telop display that is not uniform and makes the speaker be easily noticeable, a telop display that does not provide a feeling of strangeness in a scene, a telop display that is more expressive, or the like can be realized.

FIG. 10A illustrates an example of displaying each speech content near each speaker 81 as a telop image TP in a scene where a large number of people appear.

Note that this is an extreme example for description. In reality, in a moving image, there are not many scenes where a large number of people speak at the same time, and it is often the case that people speak at different times. Therefore, many telops are rarely added to one frame, as in FIG. 10A.

Each telop image TP is displayed according to depth of the speaker 81, and is thus synthesized with an image in a state where a front-rear relationship with other objects is reflected.

Furthermore, the telop image TP refers to an image representing a sound generated in the moving image by characters regardless of display mode, display timing, and the like.

Figure 11:
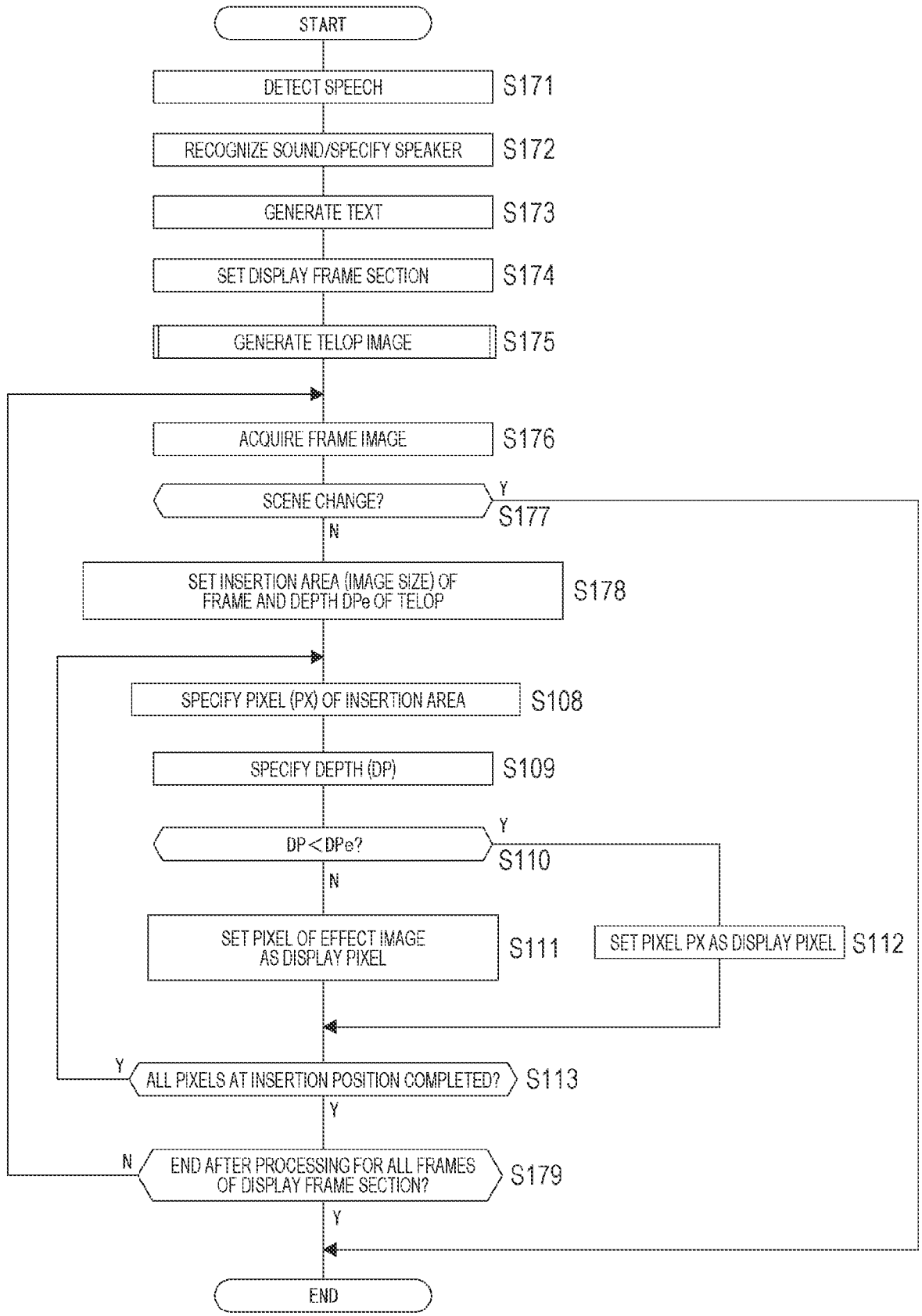
FIG. 11 is a flowchart of an editing processing example based on sound recognition according to the second embodiment.

FIG. 11 illustrates an example of processing of adding such a telop image TP.

In step S171, an image processing apparatus 1 detects a speech from sound data in a moving image.

In step S172, the image processing apparatus 1 performs sound recognition and speaker identification.

In step S173, the image processing apparatus 1 converts the speech content into text data.

In step S174, the image processing apparatus 1 sets a frame section in which the detected speech content is displayed as the telop image TP.

That is, in the image processing apparatus 1, a sound recognition unit 4B detects the speech in the moving image, analyzes the speech, specifies the speaker 81 and the speech content, and converts the speech content into the text data. The frame section for displaying the telop image TP is set as, for example, frames from a frame at speech start timing to a frame one to two seconds after speech end timing. An additional image generation unit 5 and an image editing processing unit 6 receive the aforementioned information.

Note that, to specify the speaker 81, it is conceivable to detect an object with a moving mouth by image analysis of an image analysis unit 4A, compare a section of the moving mouse with a section of the speech sound, and determine the object as the speaker 81 in a case where the sections substantially match, for example. Furthermore, it is also conceivable to estimate male/female and an age group by frequency analysis of the speech sound or the like and collate an estimation result with an image analysis result to estimate the speaker, for example.

If there is voiceprint information or the like of a person who appears in the moving image, the speaker in the moving image can be accurately identified by sound analysis.

In step S175, the image processing apparatus 1 generates the telop image TP by the function of the additional image generation unit 5.

Figures 12A, 12B, 12C:
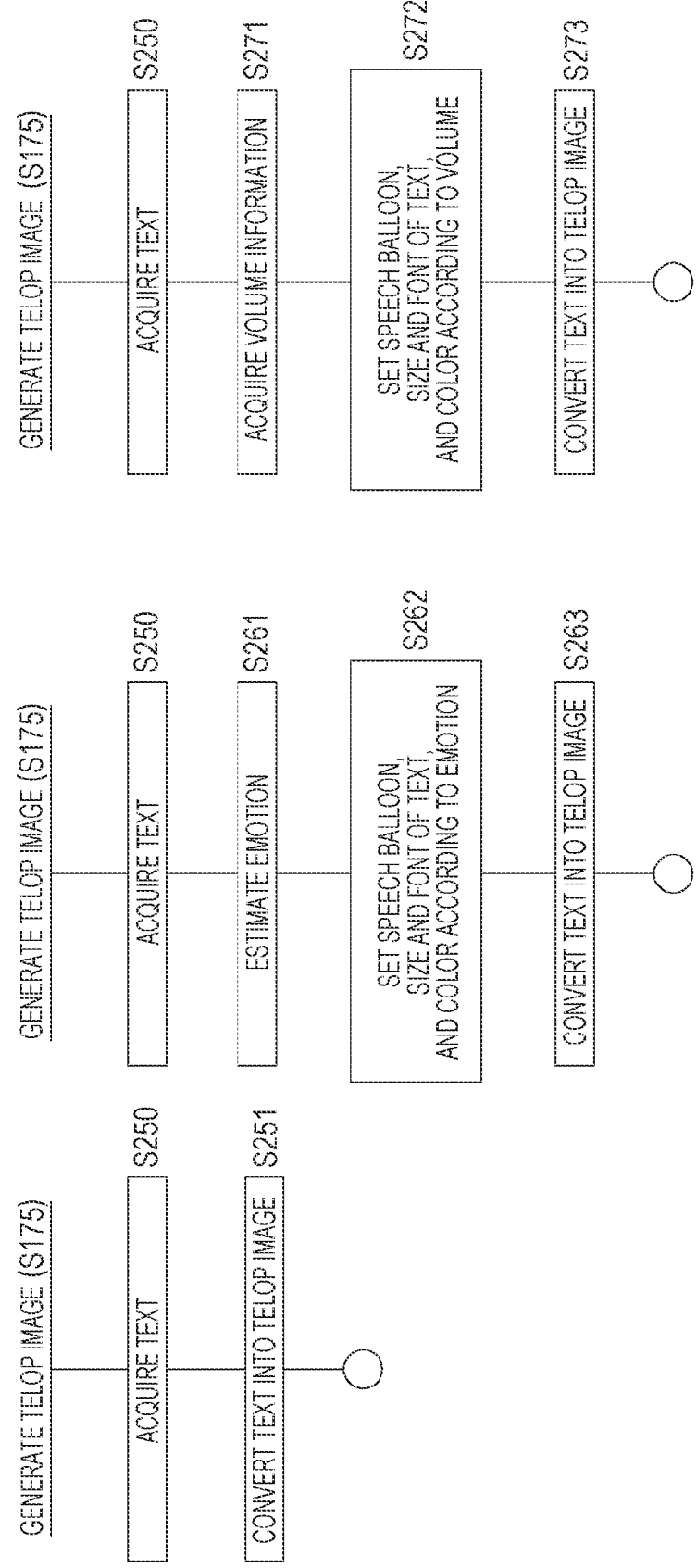
FIGS. 12A, 12B, and 12C are flowcharts of telop image generation processing according to the second embodiment.

FIG. 12A illustrates processing of generating the telop image TP.

In step S250, the image processing apparatus 1 acquires text information generated by the sound analysis as information to be processed.

In step S251, the image processing apparatus 1 converts the text information into a telop image. For example, the telop image TP is generated on the basis of settings of a predetermined speech balloon, font, color, and the like.

After the telop image is generated, processing in steps S176 to S178 and S108 to S113 is performed mainly by the function of the image editing processing unit 6, for each frame in the section in which the telop display is performed for the detected speech.

In step S176, the image processing apparatus 1 acquires image data of one frame in the frame section in which the telop display is performed, as image data to be processed.

In step S177, the image processing apparatus 1 determines whether or not the acquired frame has undergone a scene change from the previous frames. For example, the image processing apparatus 1 performs scene change determination using a difference in pixel data between the acquired frame and the previous frame, and terminates the processing in FIG. 11 in a case where scene change is determined. The image processing apparatus 1 proceeds to step S178 when scene change is not determined.

In step S178, the image processing apparatus 1 sets a telop image size of the telop image TP and an insertion area of the telop image TP in the frame. Furthermore, the image processing apparatus 1 sets depth information DPe of each pixel in the telop image TP.

For example, the depth information DPe of each pixel of the telop image TP is conceivable to be depth information DP of a pixel in which the head of the object as the speaker 81 appears, depth obtained by providing a predetermined offset amount to the depth information DP of the head, or the like.

The depth information DPe of the pixels in the telop image TP may have the same value, but in particular, the depth value may be gradually changed. This is the case where a depth position changes at the beginning and the end of the telop.

Furthermore, the size of the telop image TP is conceivable to be a size corresponding to the depth information DPe. For example, the size is made large in the case where the value of the depth information DPe is small (shallow) and the size is made small in the case where the value of the depth information DPe is large (deep), so that a large telop for a nearby speaker 81 and a small telop for a distant speaker 81 can be realized according to the law of perspective.

As for the insertion area, an area according to the set size of the telop image TP is provided near the head of the speaker 81, for example.

After the above settings are made for the current frame, the set telop image TP is synthesized with the image of the current frame in steps S108 to S113. This is similar to steps S108 to S113 in FIG. 6. That is, the image processing apparatus 1 sequentially compares each pixel PX included in the set insertion area with the depth information DPe set for each pixel of the telop image TP on the image data of the frame, and determines which of the original image data of the frame or the telop image TP is to be set as a display pixel, reflecting the front-rear relationship.

The above processing is performed for one frame, and the processing is performed again for the next frame from step S176 until completion of the processing up to the frame section for displaying the telop image TP is determined in step S179.

Thereby, a moving image as illustrated in FIG. 10A in which the telop image TP is displayed for the speaker 81 in the moving image is realized.

In particular, for the telop image TP, the presence/absence of the image in display is set in units of pixels by comparison between the depth information DPe and the depth information DP of the surrounding object, whereby the telop image TP is displayed in a state where the front-rear relationship in the image is reflected without hiding an image on a front side. As a result, the telop image TP appropriately represents a situation (position) of the speaker 81.

Furthermore, the telop image TP is displayed at a position close to the speaker 81. Therefore, the image (the speaker 81 or the like) and the characters can be easily viewed at the same time, and the content of the moving image can be more easily understood by applying the present embodiment to subtitles of movies or the like.

Note that, in a case of performing the telop addition editing in non-real time, the processing in FIG. 11 is only required to be performed for each speech detected in the moving image.

To add the telop image TP in real time, it is conceivable to output the moving image with a delay of several seconds. For example, the moving image data is buffered for several seconds so that each frame is read with a delay of several seconds. During the buffering, the sound recognition of the buffered frame for several seconds is performed.

Then, after preparing one or a plurality of telop images TP corresponding to the sound recognition, the processing from step S176 is only required to be performed for each frame read from the buffering.

Furthermore, in the processing example in FIG. 11, the telop image TP is displayed as the frame section set in step S174. The frame section is set, for example, from the speech timing to one to two seconds after the speech ends. Displaying the telop image TP for several seconds after the speech ends in this way allows a viewer to easily read the text content.

Note that, in the case where scene change is determined in step S177, the telop image TP is not synthesized. Therefore, the telop of a previous frame is not displayed in the frame. This prevents an unnatural image due to continuous display of the telop despite the occurrence of the scene change.

That is, the telop image TP is being displayed during the period from the speech to timing slightly after the speech end unless the scene change occurs, but the display of the telop image TP is terminated even during the period if there is a scene change. This realizes readability of the telop and prevents unnatural display of the telop.

By the way, it is conceivable that the telop image TP is a more expressive image rather than a uniform image.

For example, FIG. 10B illustrates a case where the speaker 81 is laughing, FIG. 10C illustrates a case where the speaker 81 is angry, and FIG. 10D illustrates a case where the speaker 81 is surprised. Here, the display mode of the telop image TP is changed according to a laughing situation, an angry situation, or a surprised situation. For example, an image according to an emotion of the speaker or the like is generated by changing the shape and color of a speech balloon, font of texts, and the like.

By doing so, the telop image TP becomes more expressive.

Therefore, for example, it is conceivable to perform processing in FIG. 12B for the processing of generating the telop image TP in step S175 in FIG. 11.

In step S250, the image processing apparatus 1 acquires text information generated by the sound analysis as information to be processed.

In step S261, the image processing apparatus 1 estimates the emotion of the speaker. For example, the volume and frequency characteristics of the speech sound are analyzed to estimate a calm state, an excited state, or the like. Furthermore, the emotion is estimated from facial expressions, motions, and the like of the speaker 81 by image analysis.

In step S262, the image processing apparatus 1 sets the shape, text size, font, color, and the like of the speech balloon as the telop image TP according to the estimated emotion of the speaker 81.

In step S263, the image processing apparatus 1 converts the text information into a telop image on the basis of the settings in step S262.

By doing so, the image mode of the telop image TP can be set according to the estimated emotion of the speaker 81 and the telop image TP can be added to the moving image.

As simpler processing than the emotion estimation, changing the image mode of the telop image TP according to the volume is conceivable. For example, processing in FIG. 12C is performed for the processing of generating the telop image TP in step S175 in FIG. 11.

In step S250, the image processing apparatus 1 acquires text information generated by the sound analysis as information to be processed.

In step S271, the image processing apparatus 1 acquires volume information of the speech sound.

In step S272, the image processing apparatus 1 sets the shape, text size, font, color, and the like of the speech balloon as the telop image TP according to the acquired volume information.

In step S273, the image processing apparatus 1 converts the text information into a telop image on the basis of the settings in step S272.

By doing so, the telop image TP representing the volume of the speech sound can be added to the moving image.

Note that, in the above example, the speech of a person in the moving image being set as the telop image TP has been described. However, the example is not limited to the speech sound of a person, and it is also conceivable to add a telop image TP representing an animal call or an ambient sound (environmental sound) using characters. Even in that case, it is appropriate to display the telop image TP according to the position or depth of a sound source in the image.

<4. Third Embodiment: Addition of Information Presentation Image>

As a third embodiment, an example of displaying an information presentation image IS as an additional image to a moving image will be described.

For example, the information presentation image IS can be added to a moving image by rea-time or non-real-time editing by using information acquired from an information source 15. At this time, a front-rear relationship between the information presentation image and another object is reproduced or depth is provided to the information presentation image itself according to an insertion area in the image, so that information presentation easily viewed by a viewer, information presentation not providing a feeling of strangeness in a scene, or the like can be realized.

Figure 13A:
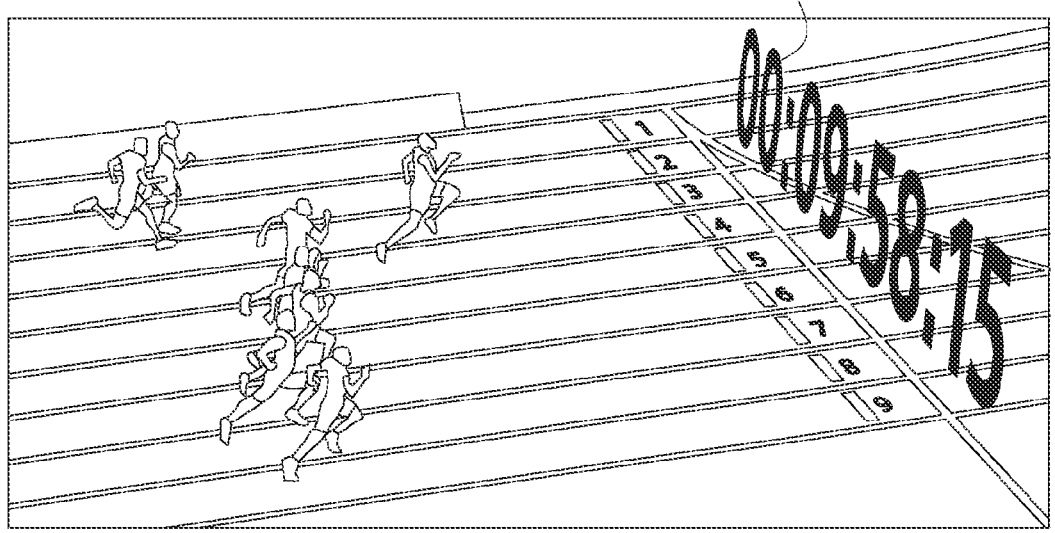
FIGS. 13A and 13B are explanatory diagrams of information presentation images according to a third embodiment.

FIG. 13A is an example of acquiring time information of a track and field competition (short-distance sprint) and displaying the time as the information presentation image IS.

For example, by displaying the time along a goal line, a moving image that is easily graspable and provides realistic and uplifting feeling can be provided to the viewer. In this case, a feeling of strangeness on a screen can be eliminated by providing depth information DPe to the information presentation image IS itself and realizing display that becomes smaller as the distance increases by the law of perspective.

Figure 13B:
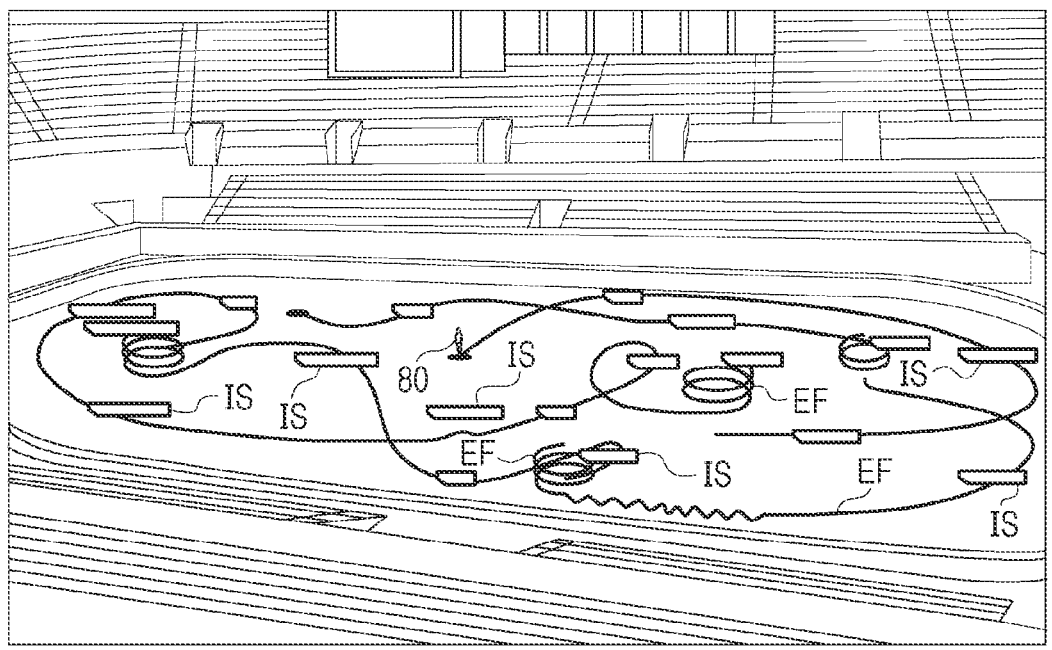

FIG. 13B is an example of displaying a locus of, for example, a skating performance as an effect image EF and displaying information of the performance (for example, a name and a score of each technique) as the information presentation image IS. By displaying such a display in real time or displaying the performance in a bird's-eye view state after the performance, the viewer can easily understand performance content. Furthermore, by setting depth in the information presentation image IS and synthesizing the information presentation image IS with another object with a depth relation, the information can be displayed in a state where the information does not come in front of a skater on the screen, for example. That is, the information presentation image IS can be displayed without interfering with the original image of the skater.

Figure 14:
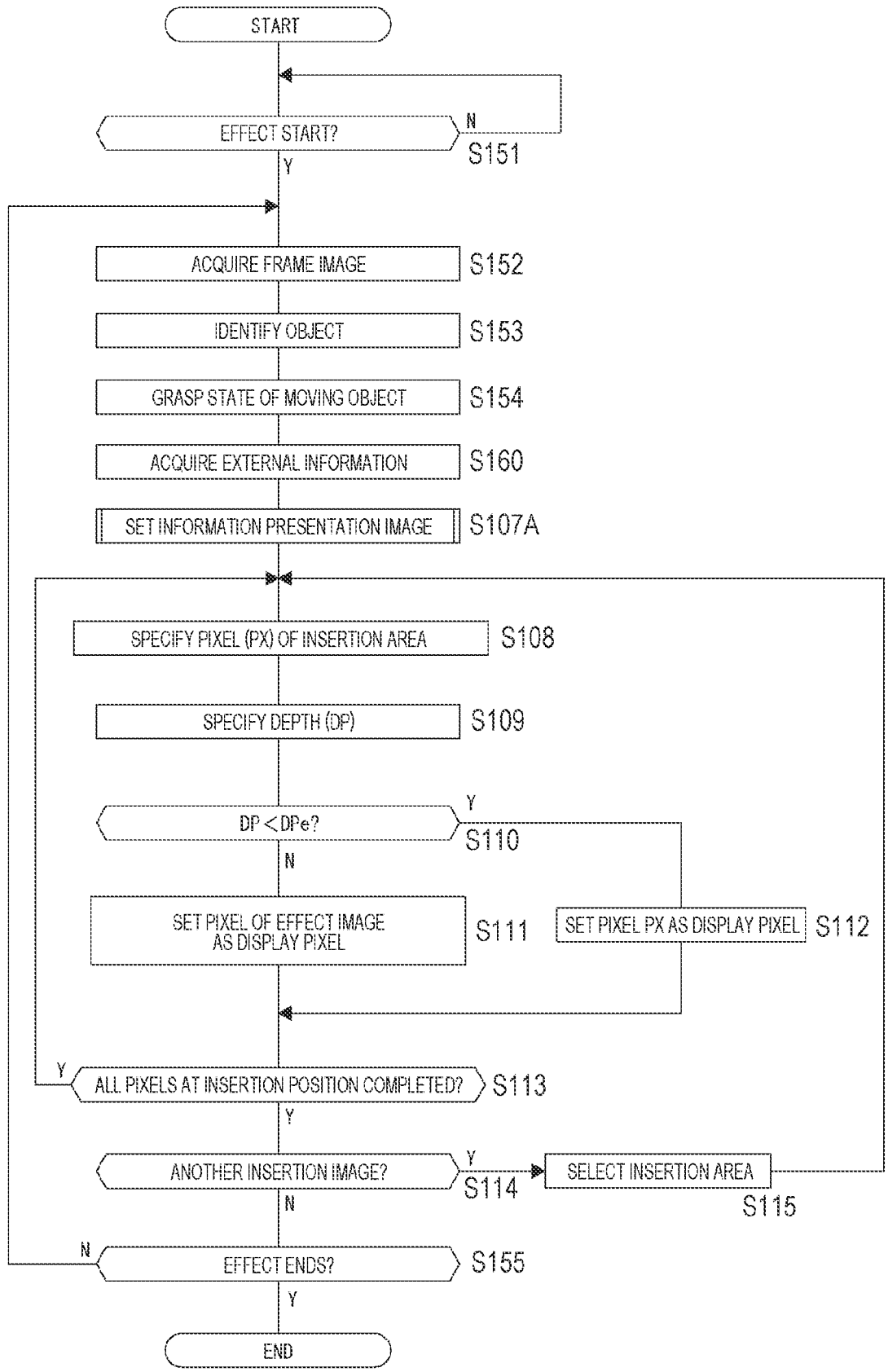
FIG. 14 is a flowchart of information presentation image generation processing according to the third embodiment.

FIG. 14 illustrates a processing example in a case of displaying the information presentation image IS as real-time processing. Note that similar steps to those in FIG. 8 are given same step numbers to avoid redundant description.

After an effect starts, an image processing apparatus 1 performs processing in steps S152 to S160 and S107A to S115 at each frame timing.

The image processing apparatus 1 performs processing of acquiring frame image data in step S152, identifying an object in step S153, and grasping a state of a moving object in step S154, as described with reference to FIG. 8, and then acquires external information in step S160. For example, the image processing apparatus 1 acquires information of time (time at frame timing) of the short-distance sprint in the case in FIG. 13A.

Then, in step S107A, the image processing apparatus 1 sets the information presentation image IS.

The setting (generation) of the information presentation image IS may be generally performed in a similar manner to FIG. 7 (the "effect image EF" in FIG. 7 is replaced with the "information presentation image IS").

First, in step S201, an image as the information presentation image IS is generated. For this, for example, an image illustrating the acquired time information is only required to be generated.

In step S202, the image processing apparatus 1 sets display modes such as the image size, shape, and color of the information presentation image IS. Here, it is conceivable to adjust the image size and shape with another object in the moving image. For example, in the case of displaying the information presentation image IS along the goal line in FIG. 13A, the shape and size are set in consideration of the perspective. In that sense, it is conceivable to simultaneously set the insertion area to the frame image data (S204) at this point of time.

In step S203, the image processing apparatus 1 sets the depth information DPe of each pixel of the information presentation image IS. For example, at this time, the depth information DPe is gradually changed according to the law of perspective of the object to be synthesized with. That is, a value that is one value before the depth information DPe of each pixel in the information presentation image IS is set as the depth information DP of each pixel in the insertion area.

After generating the information presentation image IS in this way, the image processing apparatus 1 performs processes in steps S108 to S115 as described in FIG. 8.

That is, the image processing apparatus 1 sequentially compares each pixel PX included in the set insertion area with the depth information DPe set for each pixel of the information presentation image IS on the image data of the frame, and determines which of the original image data of the frame or the information presentation image IS is to be set as a display pixel, reflecting the front-rear relationship.

The above processing is performed for one frame, and the processing in FIG. 14 is executed again from step S152 until the effect ends in step S155.

Thereby, the information presentation image IS illustrating information such as time and the like is displayed together with the moving image. Moreover, the information presentation image IS has the size and shape according to the law of perspective and the displayed position, and provides no feeling of strangeness.

Furthermore, the pixels constituting the information presentation image IS have the depth information DPe according to the depth information DP of the original pixels. For example, in the case of the moving image illustrated in FIG. 13A, the runner will then run through the time display part. Even at that time, the front-rear relationship between the position of the runner and each part of the information presentation image IS will be reflected. Image representation as if an object with a numerical value indicating the time was actually placed along the goal line, and information presentation with a high visual effect can be realized.

Needless to say, the information presentation image IS can be added even in non-real-time synthesis processing.

Furthermore, various kinds of information can be presented. For example, in the case of a sport moving image, a score of a competition, text for commentary, player information, and the like are conceivable.

Information based on detection data of a sensor provided in a camera that is capturing an image, a sensor provided in a stadium, or the like can be presented.

<5. Editing Interface: of Fourth Embodiment>

In the above embodiments, examples of automatically adding the additional image (effect image EF, telop image TP, or information presentation image IS) to the moving image have been described. Hereinafter, an interface for allowing a user to manually edit an additional image (for example, modify display of an additional image, add an additional image itself, or the like) will be described.

FIGS. 15A and 15B illustrate an example of an editing interface as a fourth embodiment. FIGS. 15A and 15B illustrate a display screen of an information processing apparatus such as a smartphone, a tablet, or a personal computer, for example.

An image monitor area 60 and an operation area 61 for editing operation are provided on the display screen.

A moving image to be edited is displayed in the image monitor area 60. The moving image can be normally displayed, paused, displayed at variable speed, and the like. FIGS. 15A and 15B illustrate an example in which persons as objects 82 and 83 and an effect image EF are displayed.

Here, the effect image EF is a virtual object in the shape of a semitransparent wall. Then, the object 82 is on a front side and the object 83 is on a depth side with respect to the effect image EF.

In the operation area 61, a trapezoidal depth map image 61c is displayed. In the depth map image 61c, a front edge represents left and right of the image, and a side represents a depth direction along a depth axis 61b. That is, the trapezoid as the depth map image 61c is an image representing the depth in the law of perspective.

Then, an operation icon image 61a is displayed in the depth map image 61c.

The operation icon image 61a is displayed in the depth map image 61c in a state corresponding to the depth position and a horizontal position of the effect image EF in the image displayed in the image monitor area 60.

Then, the user can move the position of the operation icon image 61a in the depth map image 61c by, for example, dragging the operation icon image 61a by a touch panel operation.

For example, FIG. 15B illustrates a state in which the operation icon image 61a has been moved to the front side.

By such an operation, the position (position in the depth direction and the horizontal direction) of the effect image EF in the actual moving image can be changed. In the image monitor area 60 in FIG. 15B, the effect image EF has been moved to the right front side, and the object 82 is also located on the depth side of the effect image EF.

For example, with the above configuration, the position, depth, and the like of the effect image EF on the screen can be changed by an intuitive operation using the touch panel.

Note that the display positions (positions in the depth direction and the horizontal direction) of the telop image TP and the information presentation image IS as well as the effect image EF can be adjusted by similar operations.

Note that the wall-shaped effect image EF has been described. However, an image effect of displaying only a specific object and hiding other objects by a wall can be obtained by using an opaque wall-shaped effect image EF on the entire screen. For example, an image in which only the object 82 is displayed and the other part is hidden with the effect image EF is obtained.

In that case, the operation can also move the wall back and forth to adjust the hidden area.

<6. Editing Interface: of Fifth Embodiment>

Figure 16:
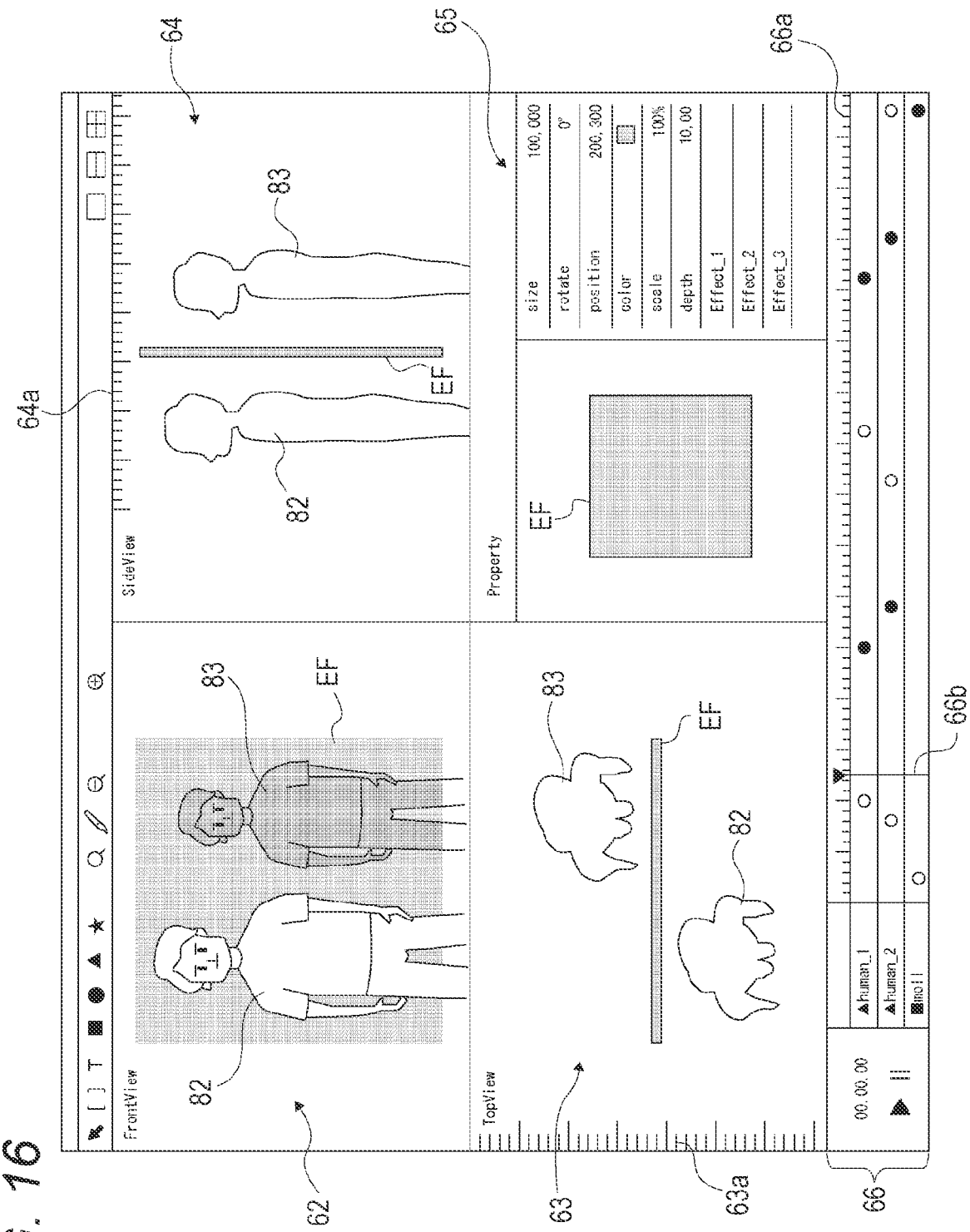
FIG. 16 is an explanatory diagram of a preview by a trihedral view according to a fifth embodiment.

FIG. 16 illustrates an example of an editing interface of a fifth embodiment. This is an example of displaying a preview by a trihedral view.

FIG. 16 illustrates an editing screen displayed on an information processing apparatus. This screen is mainly divided into five areas for display.

That is, the five areas are a front view area 62, a top view area 63, a side view area 64, a setting area 65, and a timeline area 66.

The front view area 62 is a normal moving image monitor screen, and moving image content is displayed in a reproduction state, a pause state, a variable speed reproduction state, and the like. Here, similarly to FIGS. 15A and 15B described above, an example in which objects 82 and 83 and a semitransparent wall-shaped effect image EF are displayed is illustrated.

The top view area 63 illustrates an image as a depth map as viewed from above. For example, a depth axis 63a is displayed in an up-down direction of the top view area 63 to represent depth of the image. Then, the objects 82 and 83 and the effect image EF in the image are illustrated at depth positions set therein as viewed from above.

The side view area 64 illustrates the image as a depth map as viewed from a side. For example, a depth axis 64a is displayed in a right-left direction of the side view area 64 to represent depth of the image. Then, the objects 82 and 83 and the effect image EF in the image are illustrated at depth positions set therein as viewed from the side.

The setting area 65 displays the image of the effect image EF and setting information. The setting information is information regarding settings of size, angle, position, color, depth, and the like. Each setting value in the setting area 65 can be changed by a user operation.

The timeline area 66 represents a timeline of the moving image along a time axis 66a. In particular, appearance points, end points, and current previewed positions of the objects 82 and 83 and the effect image EF are displayed on the timeline.

For example, "human1" and "human2" represent the objects 82 and 83, "moll" represents the effect image EF, and ○ represents appearance timing, and ● represents end timing (leaving the screen). Furthermore, a bar 66b represents a point of time (frame) at which the moving image displayed in the front view area 62, the top view area 63, and the side view area 64 is previewed.

With such an editing interface, the user can check the front-rear relationship by the top view area 63 and the side view area 64 while viewing the preview image of the front view area 62. Then, the user can arbitrarily change the settings of the effect image EF by the operation on the setting area 65 while viewing the screen.

The setting of the depth of the effect image EF may be made changeable by a touch operation or a drag operation of the effect image EF in the top view area 63 or the side view area 64.

Furthermore, the appearance timing and the end timing of the effect image EF can be adjusted by an operation on the timeline area 66. That is, an appearance section (effect execution frame section) of the effect image EF in the moving image may be made changeable by moving the mark (for example, "○" or "●") of the appearance timing or the end timing in the timeline area 66 by a drag operation or the like.

With the configuration, the user can easily adjust the size, color, or depth of the effect image EF and the appearance section of the effect image EF in the actual moving image.

<7. Editing Interface: of Sixth Embodiment>

An example of an editing interface as a sixth embodiment will be described with reference to FIG. 17. This is an example of displaying a timeline representing a depth axis and a time axis.

Figure 17:
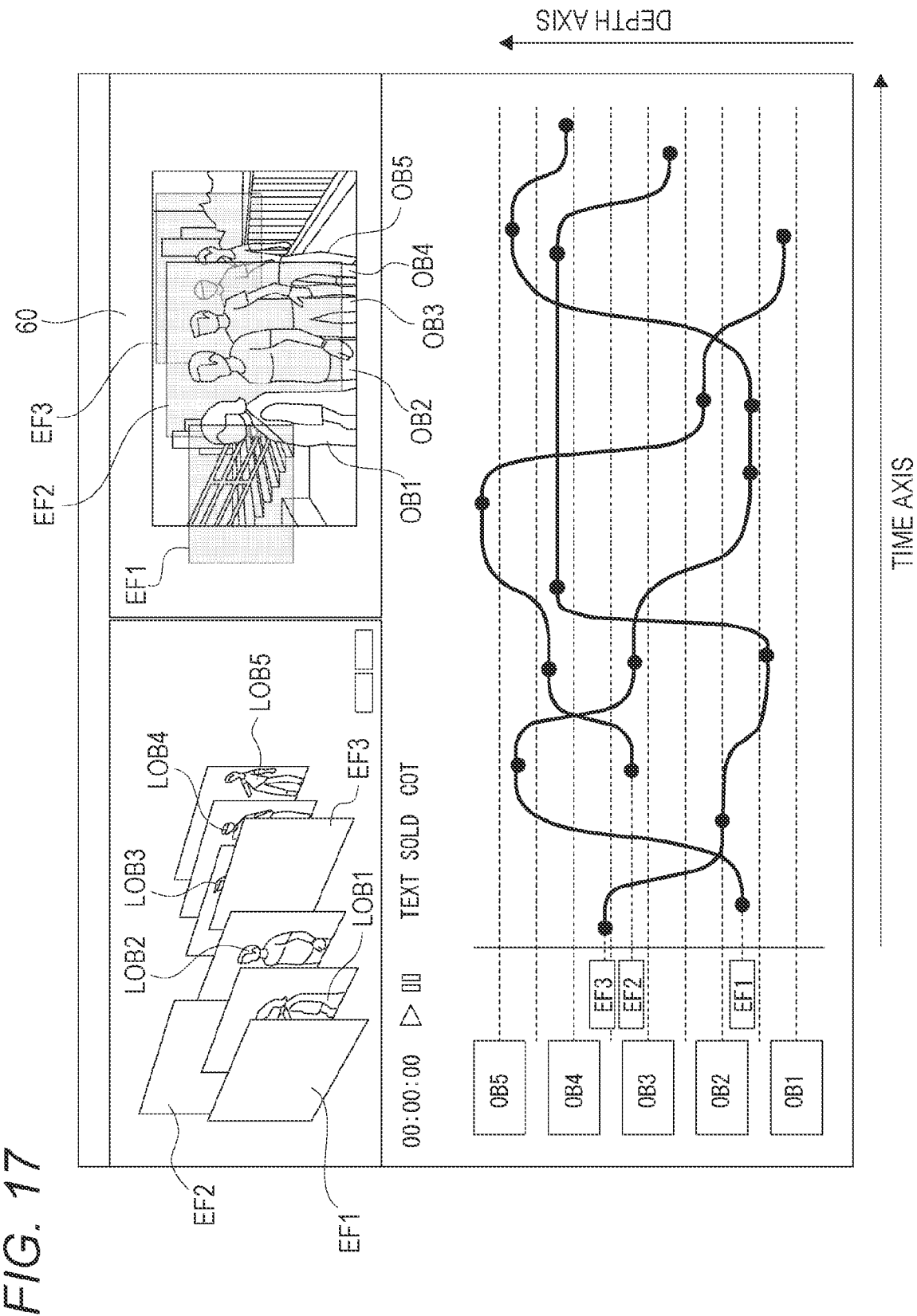
FIG. 17 is an explanatory diagram of an operation interface according to a sixth embodiment.

An image monitor area 60, a layer display area 67, and a biaxial map area 68 are provided on an editing interface screen illustrated in FIG. 17.

A preview of a moving image is displayed as the image monitor area 60. That is, content of the moving image is displayed in a reproduction state, a pause state, a variable speed reproduction state, or the like. Here, five persons as objects (object persons OB1, OB2, OB3, OB4, and OB5) and three effect images EF (EF1, EF2, and EF3) are displayed as an example.

In the layer display area 67, layers LOB1, LOB2, LOB3, LOB4, and LOB5 of the object persons OB1, OB2, OB3, OB4, and OB5 and layers of the effect images EF1, EF2, and EF3 are displayed in perspective. Thereby, the front-rear relationship among the object persons OB1 to OB5 and the effect images EF1, EF2, and EF3 is made clear.

The biaxial map area 68 is an area having a horizontal direction as the time axis and a vertical direction as the depth axis. In the biaxial map area 68, depths of the effect images EF1, EF2, and EF3 are illustrated at each time with respect to depths of the object persons OB1, OB2, OB3, OB4, and OB5.

On such an interface screen, a line representing the depth of the effect image EF on the time axis can be arbitrarily changed on the biaxial map area 68, for example. Thereby, the depth change of the effect image EF in the moving image can be easily edited.

Furthermore, the depth change of the effect images EF1, EF2, and EF3 and the depth position relationship among the object persons OB1, OB2, OB3, OB4, and OB5 are clear, and an image effect is easily recognizable.

<8. Editing Interface: of Seventh Embodiment>

An example of an editing interface as a seventh embodiment will be described with reference to FIGS. 18, 19, 20, 21, 22, 23, 24A, 24B, 24C, 24D, 24E, 24F, 25A, 25B, 25C, 25D, 25E, 25F, 26, 27, 28, 29, 30, 31, and 32. This is also an example of displaying a biaxial map having a time axis and a depth axis, but this example further realizes various previews while using the biaxial map.

FIGS. 18 to 23 illustrate various display modes as an editing operation image 70.

Figure 18:
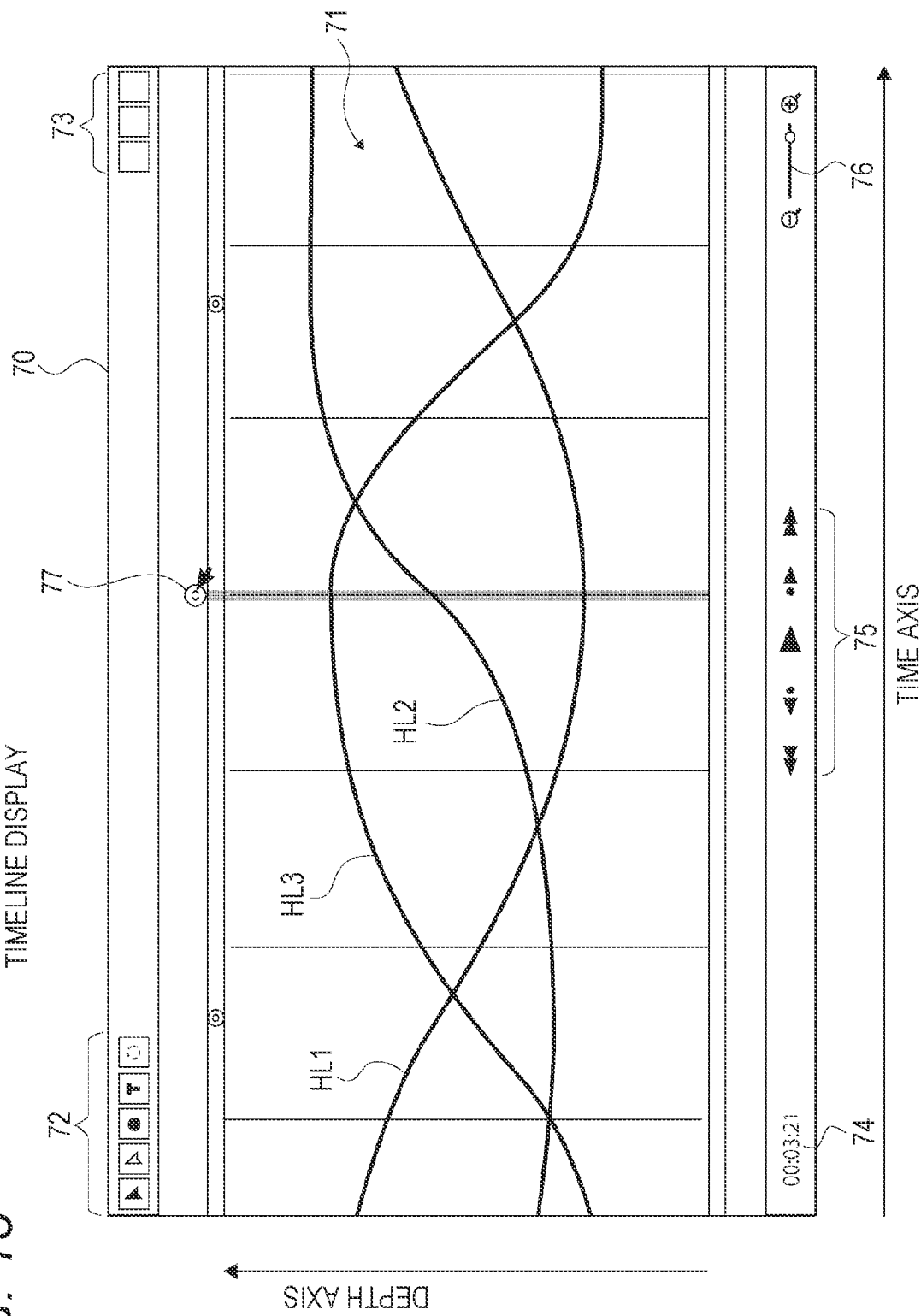
FIG. 18 is an explanatory diagram of timeline display according to a seventh embodiment.

In the present example, various image modes are switched while displaying a biaxial map area 71 in FIG. 18 as the editing operation image 70.

First, FIG. 18 illustrates a state of displaying a timeline as the biaxial map area 71.

The biaxial map area 71 has a function as a timeline with a time axis in a right-left direction. Moreover, an up-down direction is set as a depth axis, so that a biaxial map of time and depth is obtained.

Note that, in the editing operation image 70, a tool icon 72, a screen switching icon 73, a current time display 74, a moving image operation icon 75, an enlargement/reduction operator 76, a preview operator 77, and the like are also displayed.

As the tool icon 72, operators used for timeline operation, placement of an effect image EF, and the like are prepared.

As the screen switching icon 73, operators for switching a preview screen such as a bird's-eye view, a front view, and a perspective view to be described below are prepared.

As the current time display 74, a current time (time (time code) of a previewed image (frame) in the moving image) on the timeline is displayed.

As the moving image operation icon 75, operators for operations such as reproduction/stop/frame advance/fast forward on the timeline are prepared.

The enlargement/reduction operator 76 enables enlargement/reduction operations of the image.

The preview operator 77 is an operator for specifying timing in a time axis direction of the biaxial map area 71 and giving an instruction of preview display at the specified timing.

Figure 19:
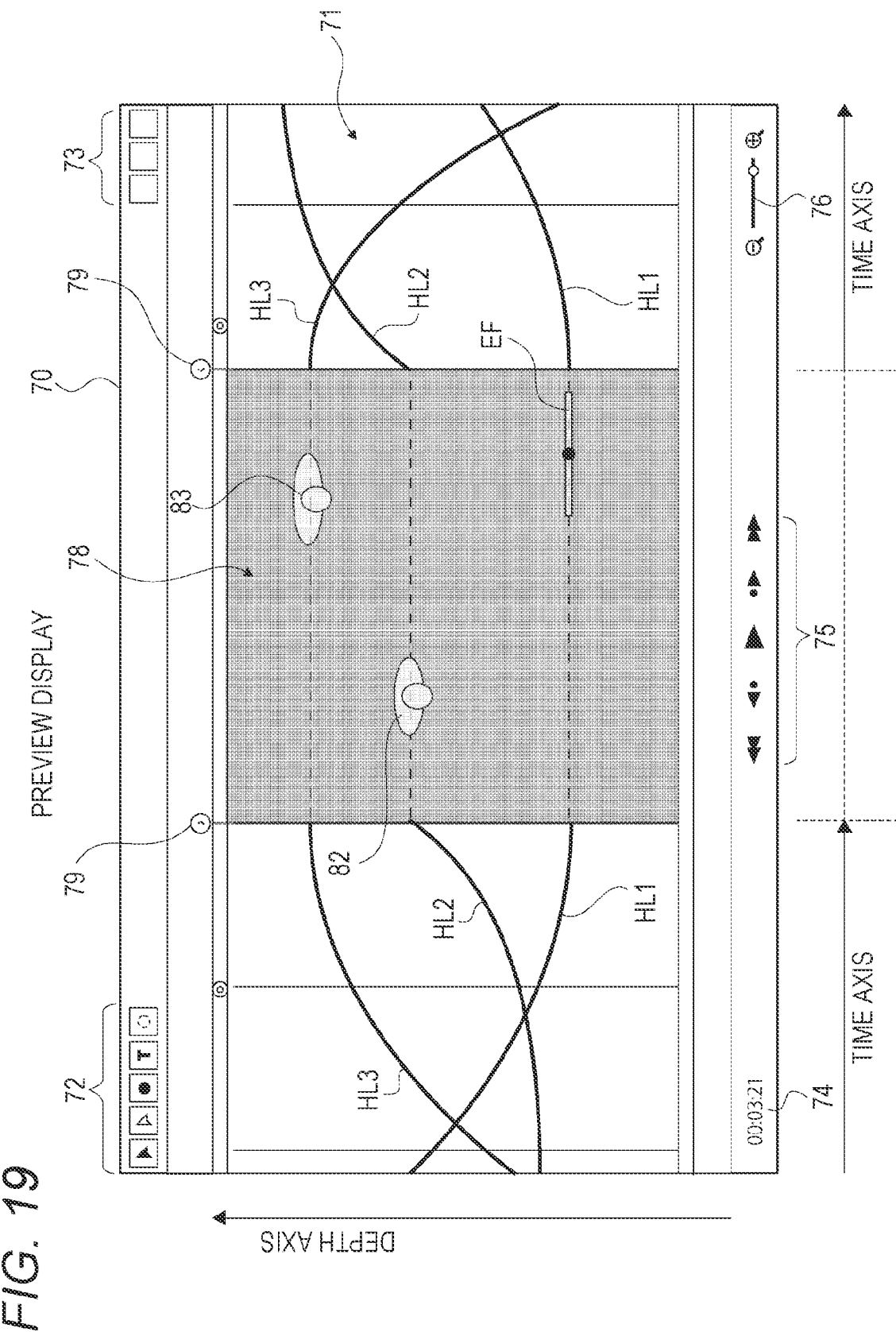
FIG. 19 is an explanatory diagram of preview display according to the seventh embodiment.

For example, reproduction timing (reproduction time position) is indicated by the preview operator 77, and when the preview operator 77 is operated, a preview image 78 at the point of time is displayed as illustrated in FIG. 19.

Furthermore, an operation to arbitrarily specify a position of the preview operator 77 in a time direction to request a preview at the specified point of time may be made available.

In the state where the preview image 78 is displayed as illustrated in FIG. 19, a closing operator 79 is displayed, and the display of the preview image 78 can be terminated by operation of the closing operator 79.

Hereinafter, screen content will be described assuming that objects 82 and 83 and an effect image EF illustrated in FIGS. 15A, 15B 16 are present in an image, for example.

As illustrated in FIG. 18, in the biaxial map area 71, transitions of depth of the effect image EF and the objects 82 and 83 in the time axis direction are illustrated as depth display lines HL1, HL2, and HL3.

For example, the depth display line HL1 represents a change in the depth of the effect image EF on the time axis. The depth display lines HL2 and HL3 represent changes in the depth of the objects 82 and 83 on the time axis.

By displaying the depth display lines HL1, HL2, and HL3 in this way, the user can clearly grasp the change in front-rear positional relationship among the objects 82 and 83 and the effect image EF with time progress in a moving image.

The preview is displayed as in FIG. 19 when the preview operator 77 is operated at certain timing in the biaxial map area 68.

In this case, display of the preview image 78 is in a state where the objects 82 and 83 and the effect image EF, which are the image content, are viewed from above. Then, the preview is performed to interrupt and widen the specified timing of the biaxial map area 68 in the right-left direction.

That is, the vertical depth axis in the biaxial map area 68 is also applied to the preview image 78, and the depth relationship among the objects 82 and 83 and the effect image EF is expressed.

Regarding the time axis, the broken line portion (the portion of the preview image 78) is in a state where the time progress is stopped. In other words, the time axis is cut and the preview image 78 is inserted.

Since the time axis is cut, there is no change in the depth of the objects 82 and 83 and the effect image EF on the right and left sides of the preview image 78. Therefore, the objects 82 and 83 and the effect image EF in the preview image 78 are located on the broken lines connecting the right and left depth display lines HL1, HL2, and HL3, respectively.

With such a preview image 78, the user can clearly grasp the depth relationship among the objects 82 and 83 and the effect image EF at any timing.

By operating the preview image 78, the depth position of the effect image EF can be changed. For example, the user adjusts the depth of the effect image EF by operating the effect image EF up and down on the screen (that is, in the depth axis direction). Thereby, the depth of the effect image EF is changed in the frame of the preview image 78. In this case, the depth display lines HL1 continuous on the right and left sides on the screen may also be changed in conjunction with the change in the depth.

Furthermore, the settings (size, position, type, and the like) of the effect image EF may be made changeable.

Figure 20:
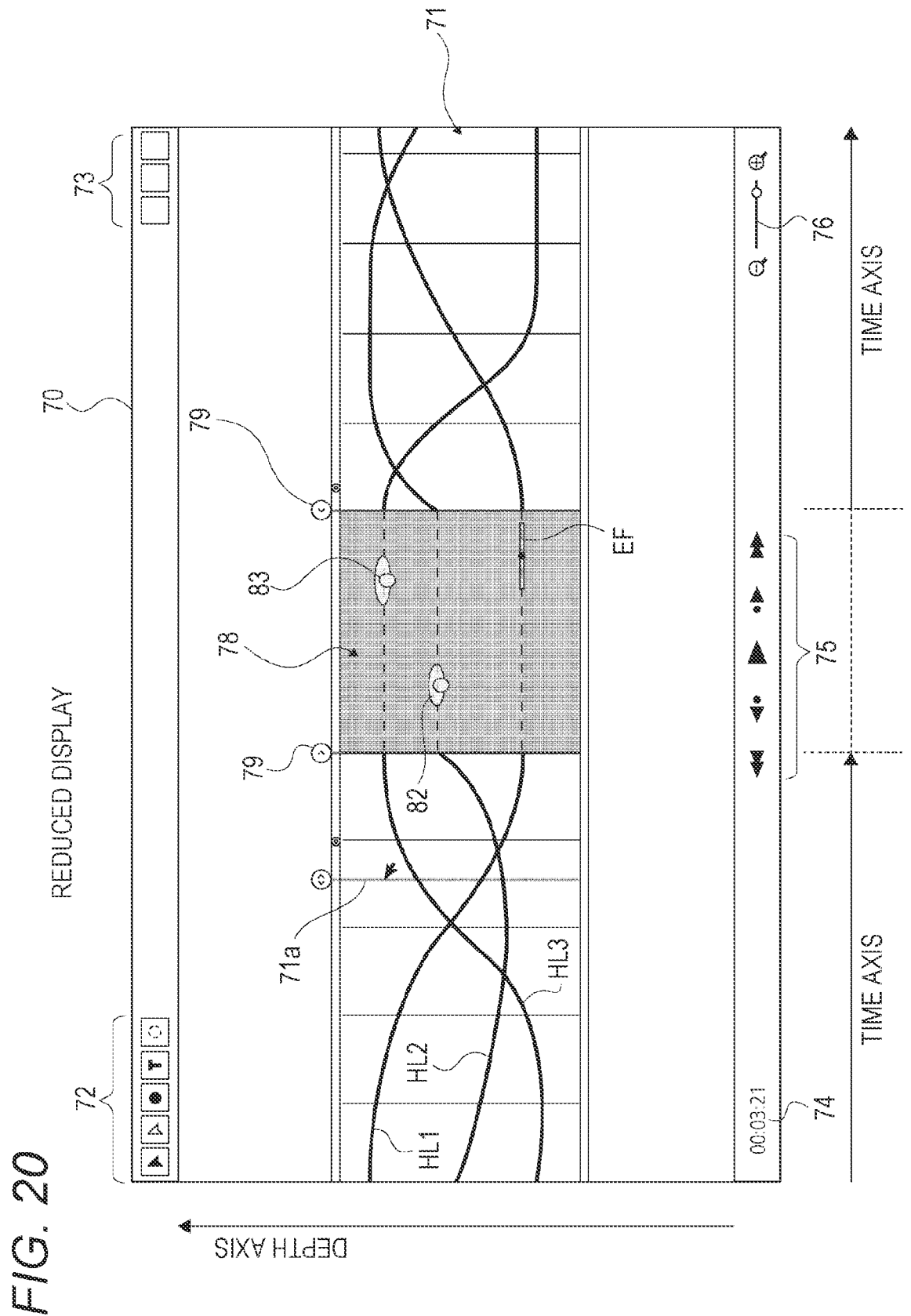
FIG. 20 is an explanatory diagram of reduced display according to the seventh embodiment.

FIG. 20 illustrates a reduced display state. The enlargement/reduction of the screen can be performed by operating the enlargement/reduction operator 76. For example, the user can view the timeline in a longer time range by reducing the screen.

Particularly, when the preview image 78 is displayed as in FIG. 19, the time range for displaying the depth display lines HL1, HL2, and HL3 as the timeline becomes short. In that case, by reducing the display as in FIG. 20, the change in the depth relationship between points of time before and after the preview image 78 can be checked in a long time range.

Note that the user can specify each timing on the timeline by moving a time bar 71a.

Figure 21:
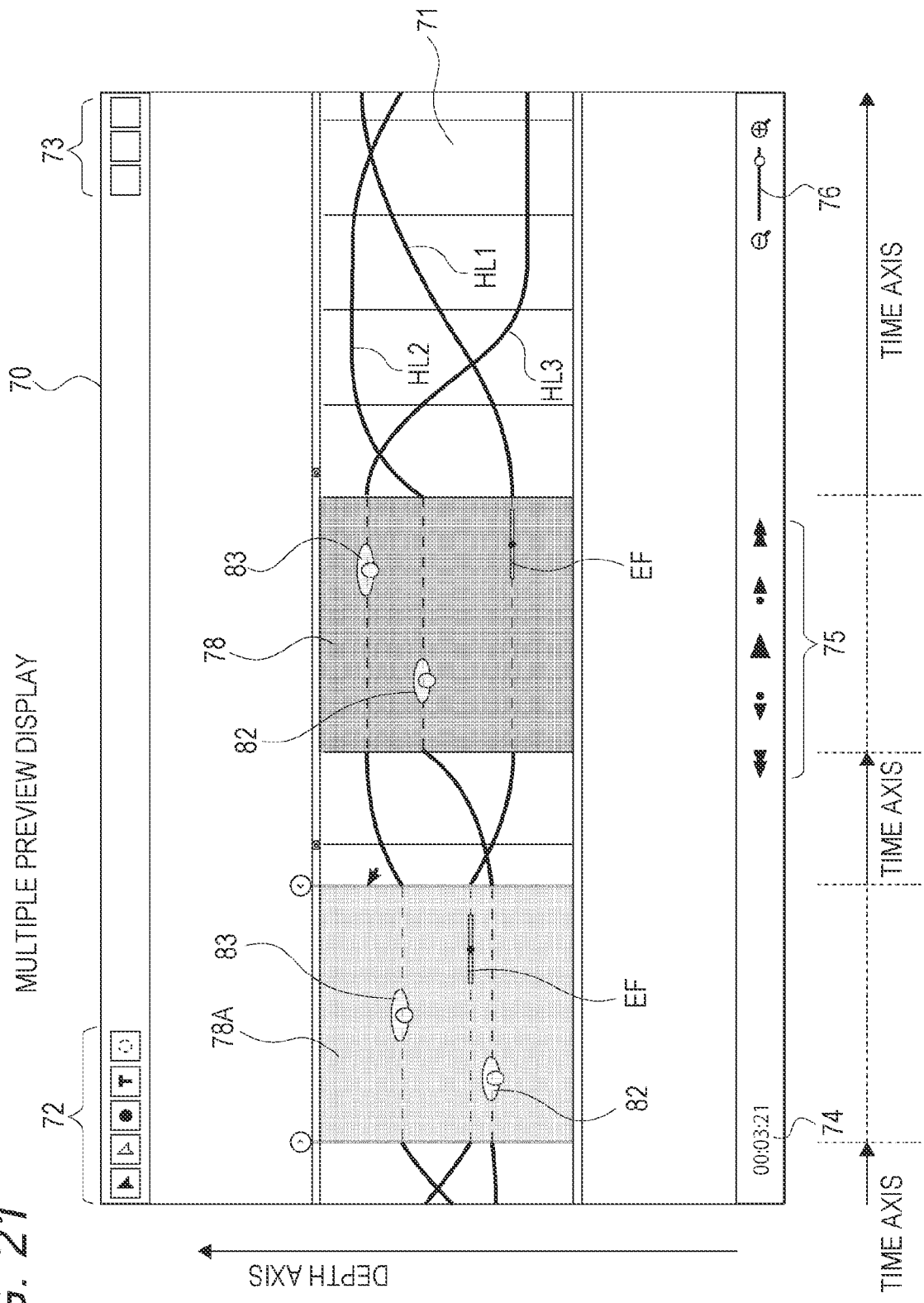
FIG. 21 is an explanatory diagram of multiple preview display according to the seventh embodiment.

FIG. 21 illustrates a state in which preview images 78 and 78A at a plurality of timings are displayed. The user can display an additional preview image 78A by, for example, specifying arbitrary timing on the time axis using the time bar 71a and performing a preview operation. That is, the user can check the preview images 78 and 78A at a plurality of timings at the same time.

Thereby, it becomes easy to check the front-rear relationship among the objects 82 and 83 and the effect image EF on the time axis and adjust the depth of the effect image EF at a plurality of time positions.

Figure 22:
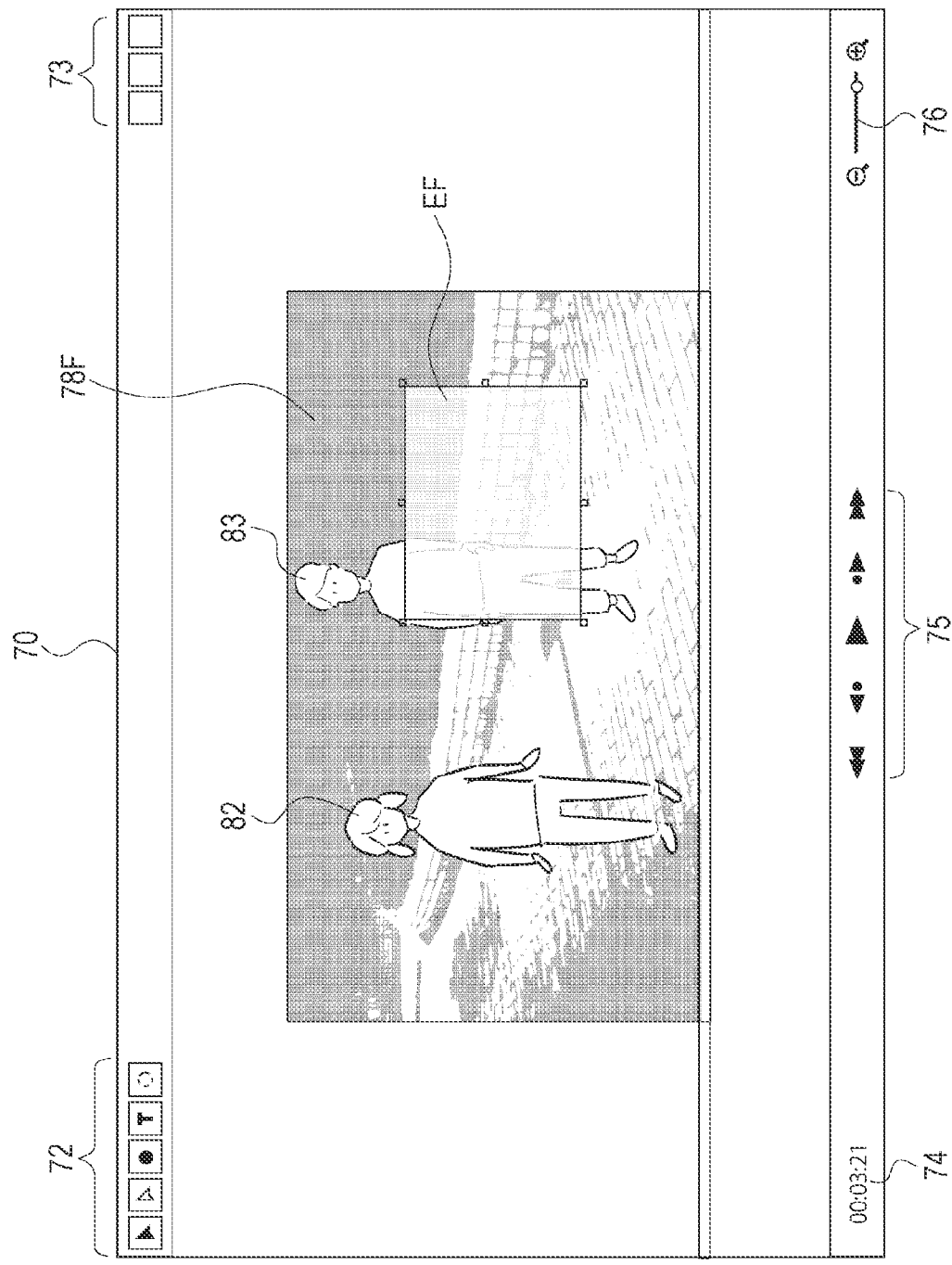
FIG. 22 is an explanatory diagram of front image display according to the seventh embodiment.

FIG. 22 illustrates a state of displaying a front image. The preview image 78 in FIG. 19 is displayed in accordance with the depth axis of the biaxial map area 68, and is thus not actual moving image content. The user can switch the mode of the preview image 78 by operating the screen switching icon 73. A front preview image 78F in FIG. 22 is display of an original frame image of a moving image. In this case, since the depth axis becomes a screen depth direction, the timeline display is temporarily erased. However, the preview image 78 may be switched to the front preview image 78F while leaving the timeline display on the right and left sides in FIG. 19.

Figure 23:
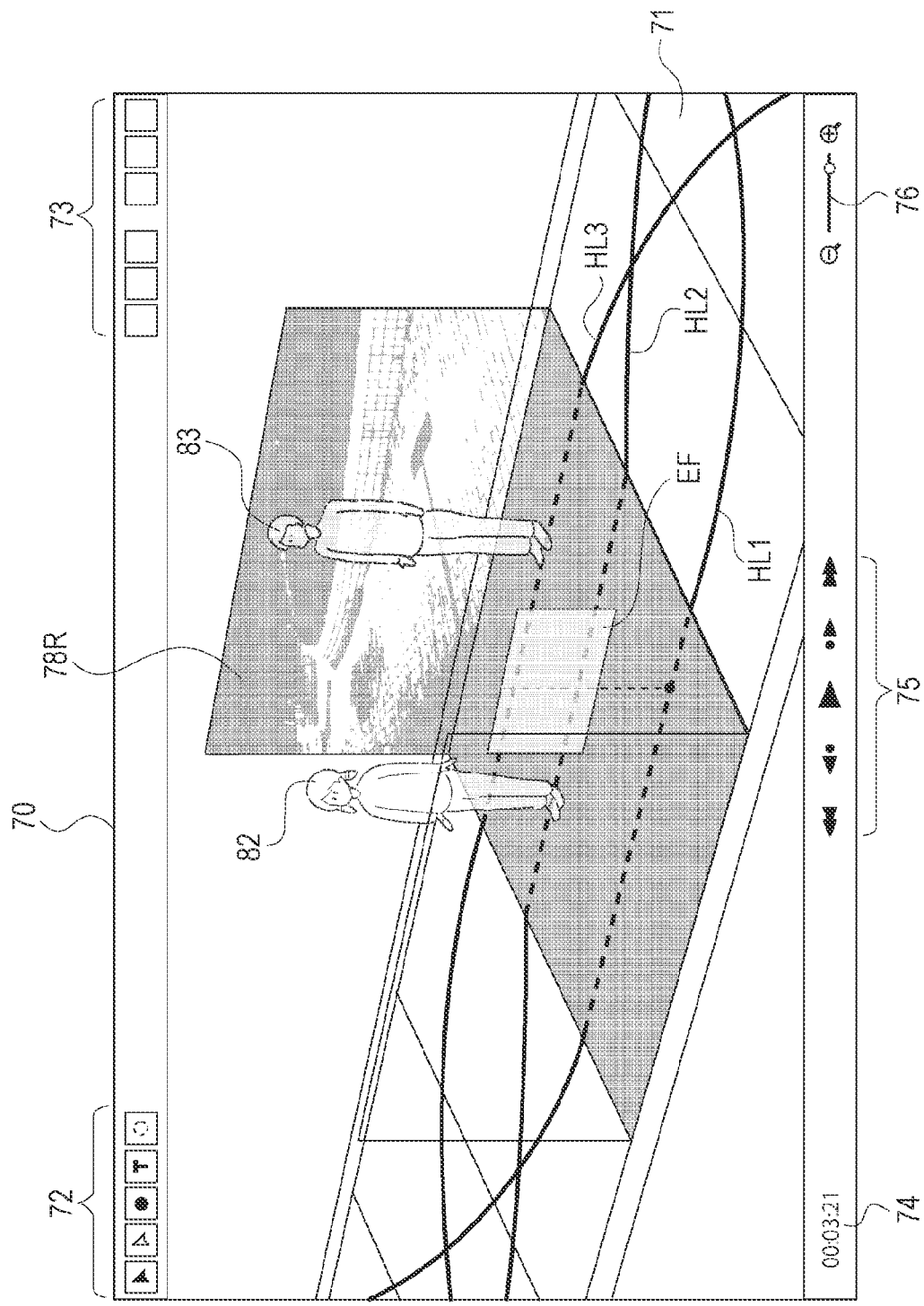
FIG. 23 is an explanatory diagram of stereoscopic image display according to the seventh embodiment.
Figure 24:
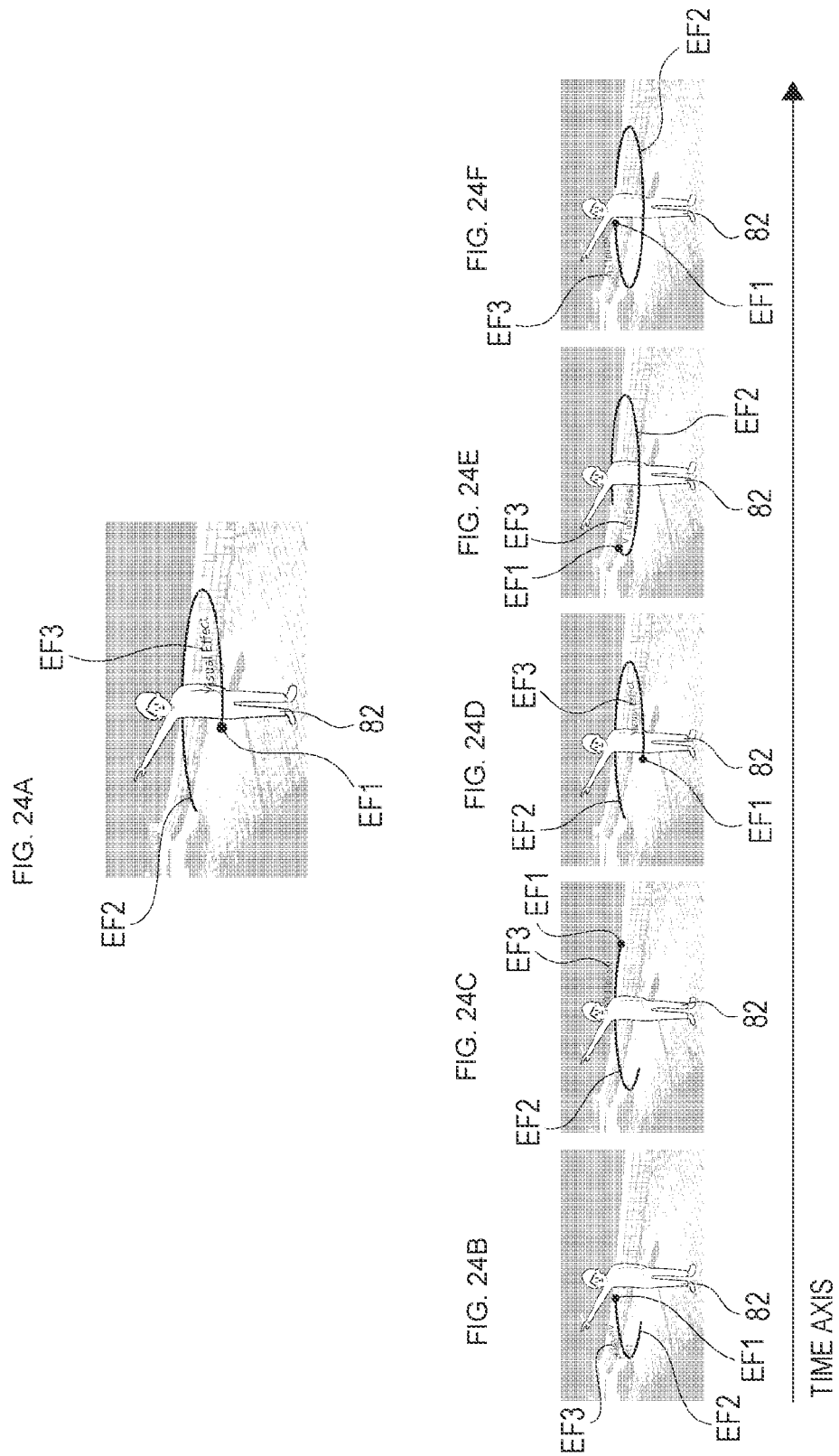
FIGS. 24A, 24B, 24C, 24D, 24E, and 24F are explanatory diagrams of examples of effect images edited by an operation interface according to the seventh embodiment.

FIG. 23 illustrates a state of displaying a stereoscopic image as a stereoscopic preview image 78R. The stereoscopic preview image 78R is an image obtained by adding an expression in a depth direction to the frame image of the moving image. The user can also switch the mode to the stereoscopic preview image 78R by operating the screen switching icon 73.

In this case, since the time axis direction and the depth direction can be expressed in perspective, the timeline display (display of the depth display lines HL1, HL2, and HL3) is also performed together with the stereoscopic preview image 78R.

This image display enables the viewer to easily grasp the front-rear relationship of the image and the transition of the depth of the objects 82 and 83 and the effect image EF in the time direction.

As described above, editing is possible while switching the screen mode. Hereinafter, an example of using the editing interface will be described with reference to FIGS. 25A, 25B, 25C, 25D, 25E, 25F, 26, 27, 28, 29, 30, and 31 using the moving image in FIGS. 24A, 24B, 24C, 24D, 24E, and 24F.

FIGS. 24A, 24B, 24C, 24D, 24E, and 24F illustrate image examples of frames constituting the moving image. The moving image is assumed to be a moving image in which a light source EF1 as an effect image EF is rotating around a person as an object 82. As the effect images EF, it is assumed that text EF3 rotating slightly behind the light source EF1 and a locus EF2 of the light source EF1 are displayed.

In such a moving image, the effect images are edited. The screen for editing can transition among various display states as described above. FIGS. 25A, 25B, 25C, 25D, 25E, and 25F illustrate the transition of the display states.

Figure 25:
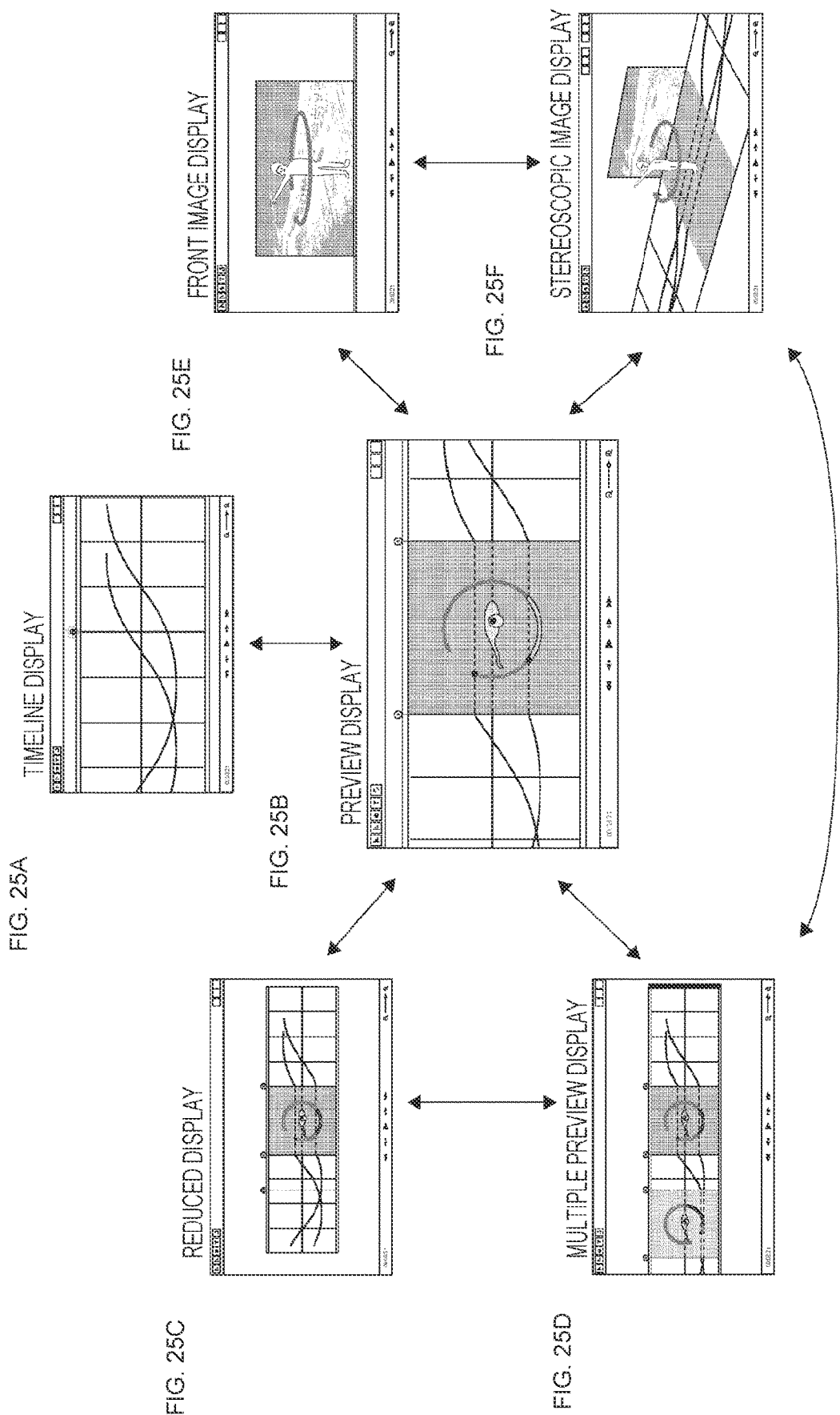
FIGS. 25A, 25B, 25C, 25D, 25E, and 25F are explanatory diagrams of screen transitions of an editing interface according to the seventh embodiment.

FIG. 25A illustrates timeline display (see FIG. 18).

The timeline display can transition to preview display in FIG. 25B (see FIG. 19).

The preview display in FIG. 25B can transition to the timeline display in FIG. 25A, reduced display in FIG. 25C (see FIG. 20), multiple preview display in FIG. 25D (see FIG. 21), front image display in FIG. 25E (see FIG. 22), and stereoscopic image display in FIG. 25F (see FIG. 23). Each display can return to the preview display.

The reduced display and the multiple preview display can transition to each other.

The stereoscopic image display and the multiple preview display can transition to each other.

The stereoscopic image display and the front image display can transition to each other.

Of course, the above is an example, and various transition paths are conceivable.

Figure 26:
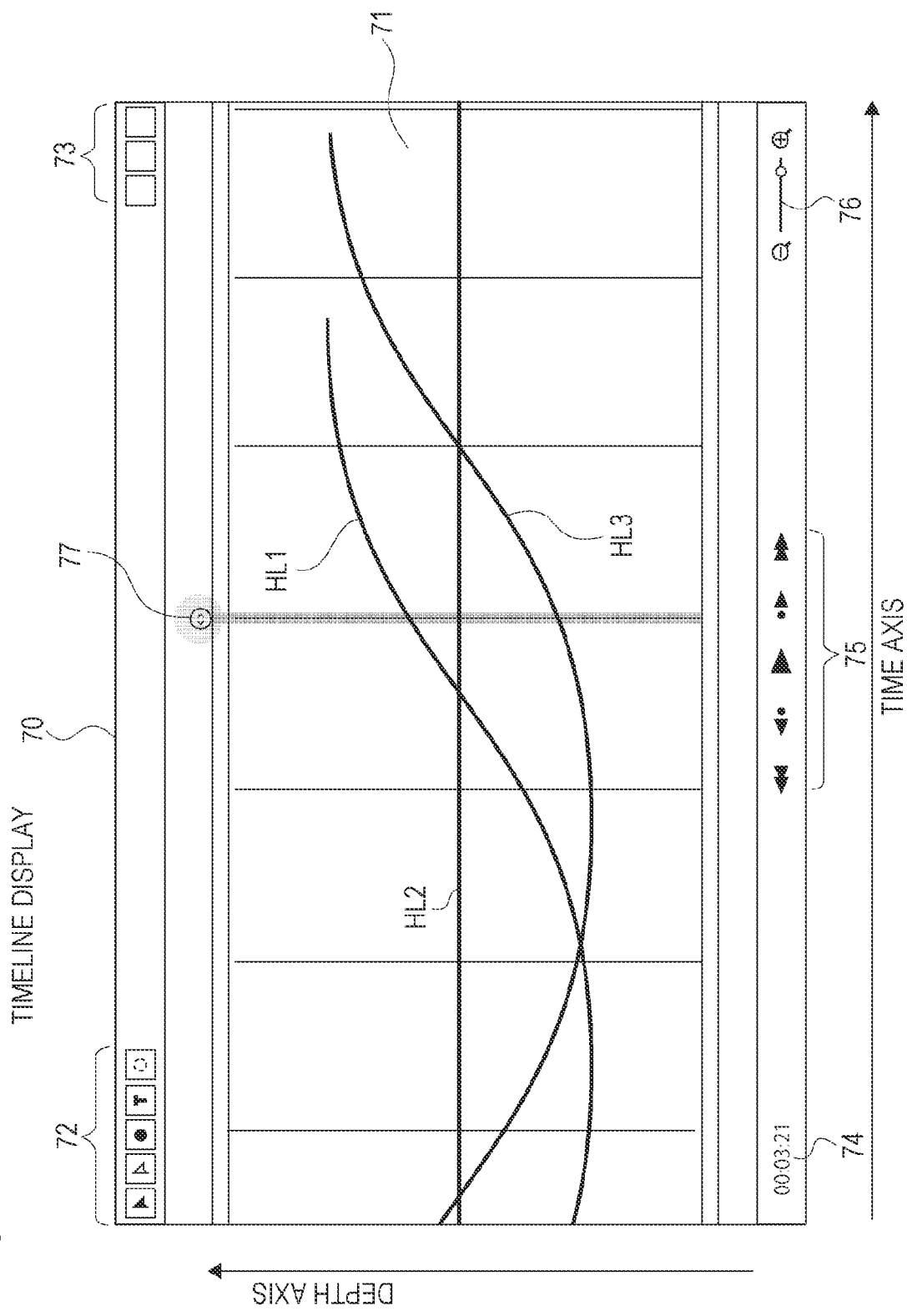
FIG. 26 is an explanatory diagram of timeline display corresponding to the image examples according to the seventh embodiment.

In the case of the moving image in FIGS. 24A, 24B, 24C, 24D, 24E, and 24F, the timeline display is as illustrated in FIG. 26. Here, the depth display lines HL1, HL2, and HL3 are displayed. The depth display line HL1 represents the depth transition of the light source EF1. Since the light source EF1 moves around the object 82, the transition becomes sinusoidal transition in the time axis direction. The depth display line HL2 represents the depth transition of the object 82. Since the object 82 stops and does not move in the moving image, the depth display line HL2 is a straight line that maintains a certain depth.

The depth display line HL3 represents the depth transition of the text EF3. Since the text EF3 moves around the object 82 following the light source EF1, the transition becomes sinusoidal transition slightly delayed from the depth display line HL1 in the time axis direction.

Figure 27:
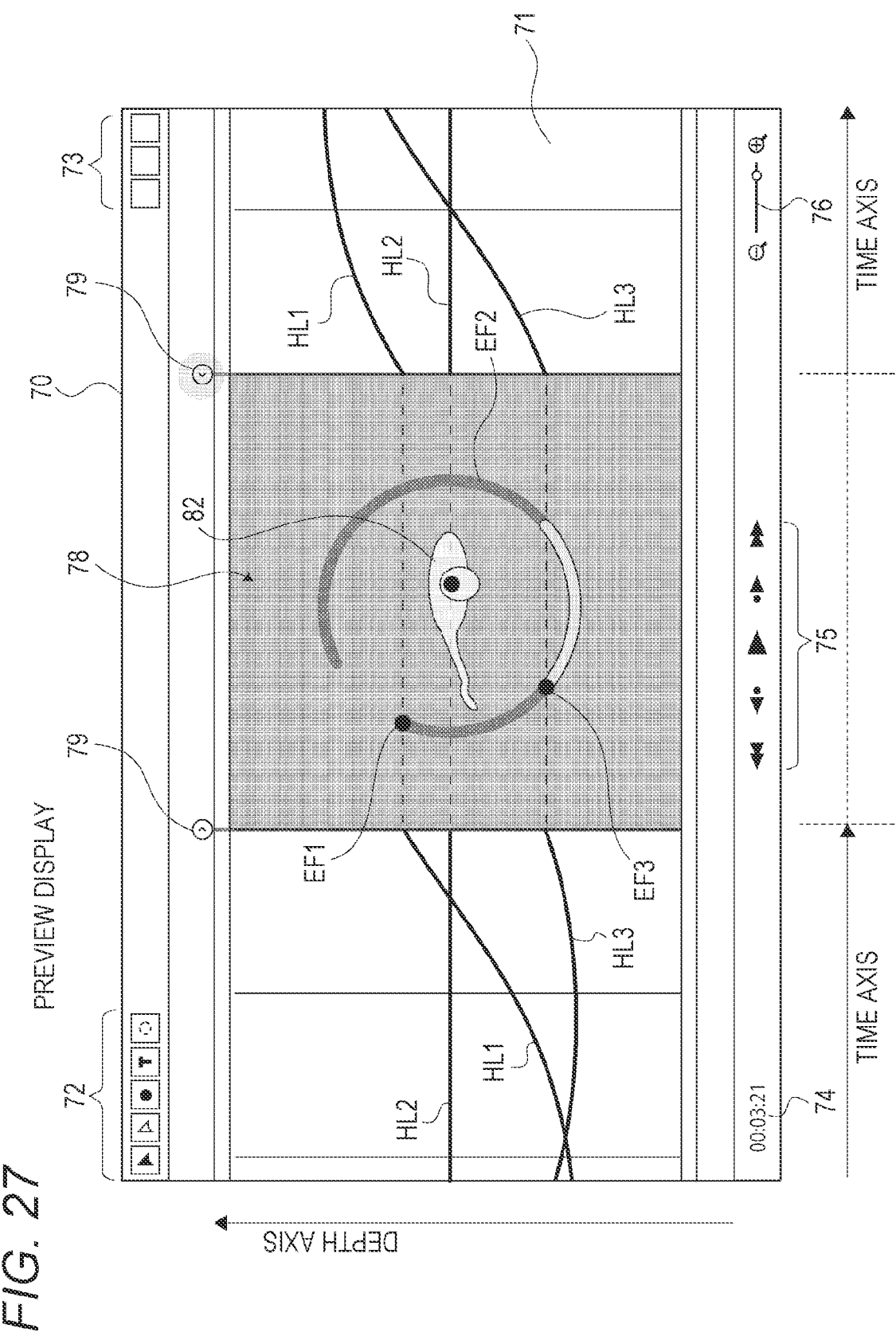
FIG. 27 is an explanatory diagram of preview display corresponding to the image examples according to the seventh embodiment.

When the preview image 78 is displayed at certain timing, the preview image 78 is displayed as in FIG. 27.

In the preview image 78, the light source EF1, the text EF3, and the locus EF2 of the light source are displayed around the object 82. The user can adjust the depth of the light source EF1 and the text EF3 on the screen. Furthermore, the settings (size, color, shape, and the like) of the light source EF1, the locus EF2, and the text EF3 may be made changeable.

Figure 28:
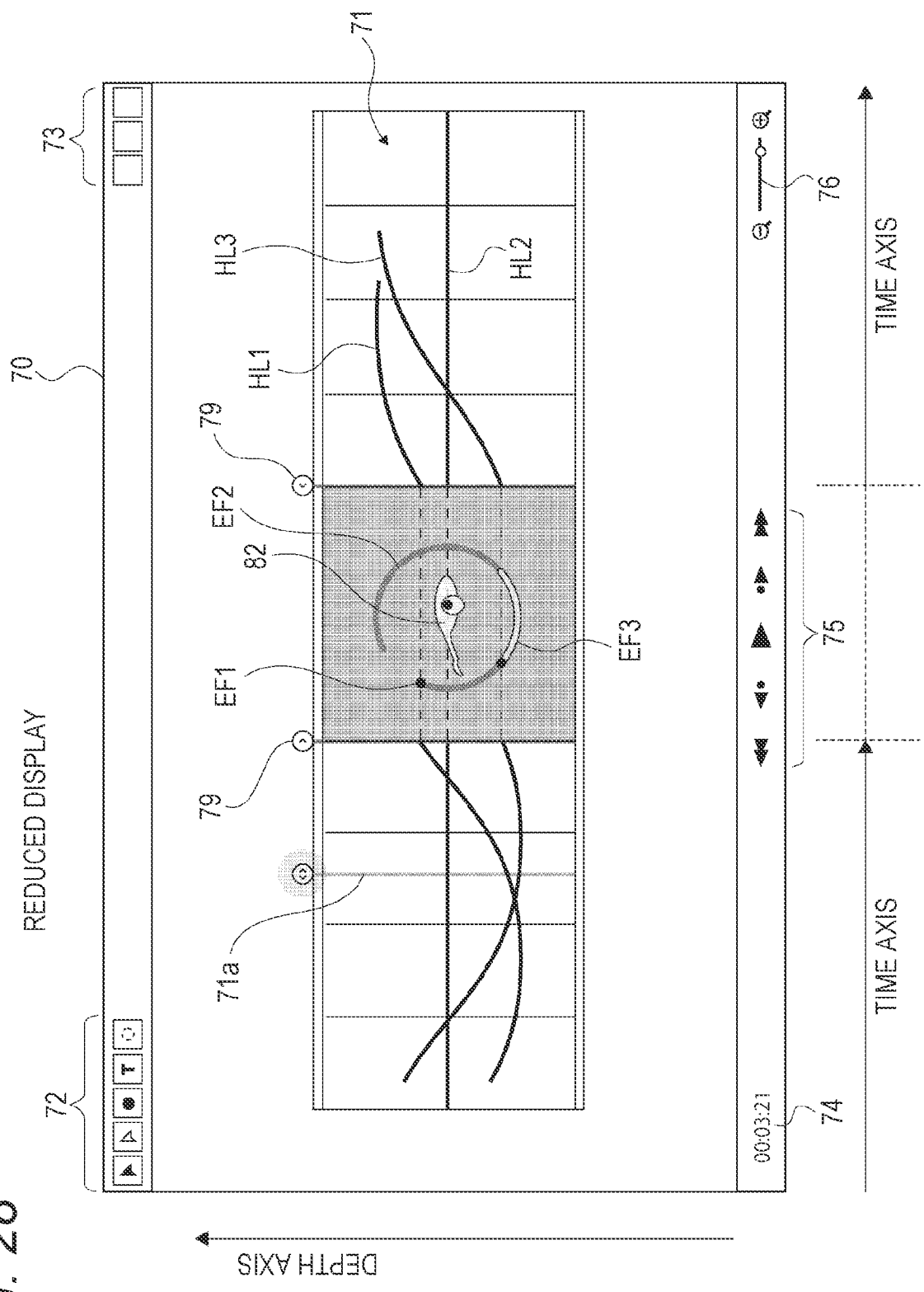
FIG. 28 is an explanatory diagram of reduced display corresponding to the image examples according to the seventh embodiment.

When the reduced display is performed, the reduced display is displayed as in FIG. 28. As a result, the depth transitions of the light source EF1, the object 82, and the text EF3 in a long time range are clearly displayed by the depth display lines HL1, HL2, and HL3 in the times before and after the preview image 78.

Figure 29:
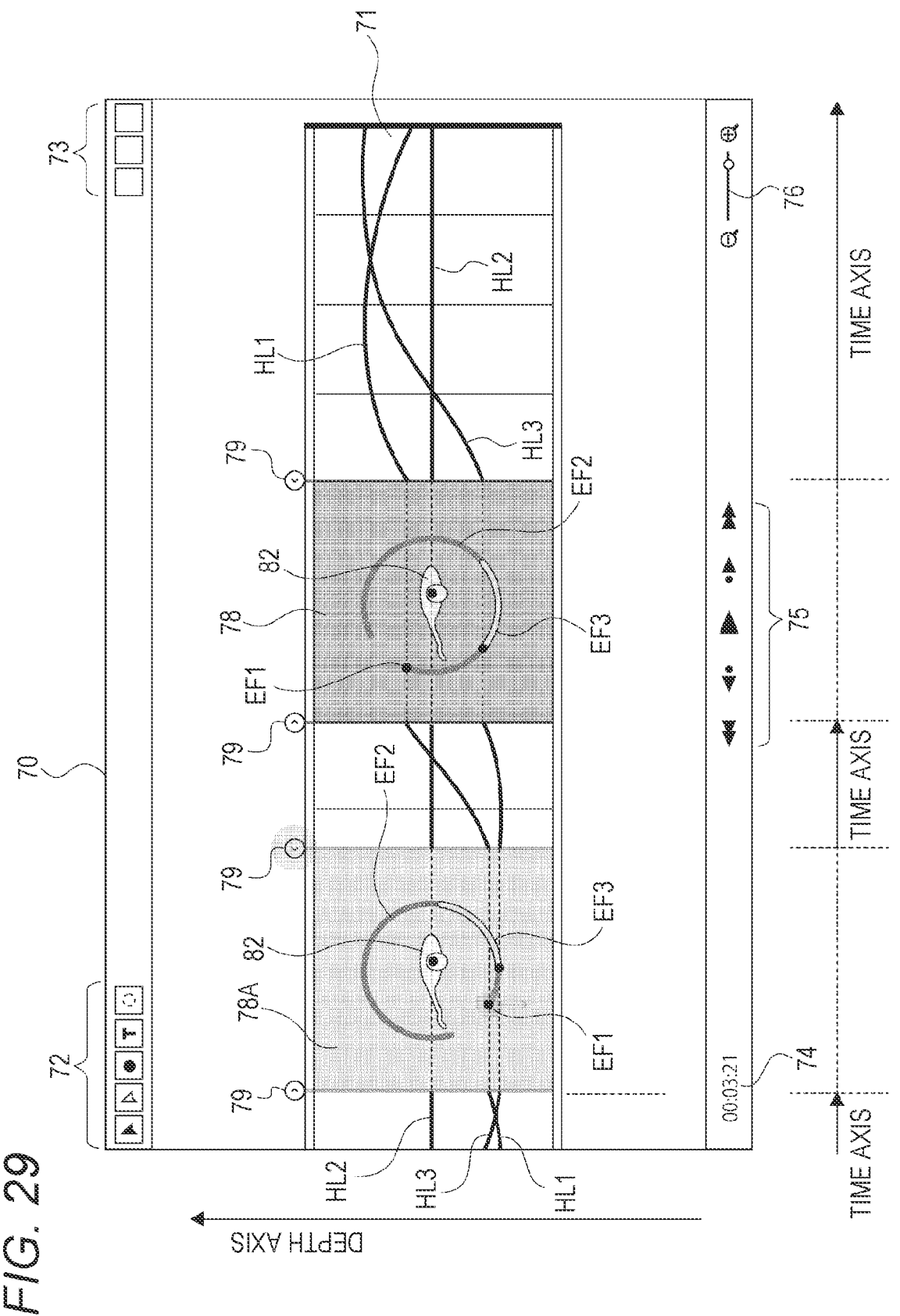
FIG. 29 is an explanatory diagram of multiple preview display corresponding to the image examples according to the seventh embodiment.

Moreover, FIG. 29 illustrates a state of displaying the preview image 78A at another certain point of time. By opening the preview images 78 and 78A at the plurality of points of time in this way, the user can change the depth of the light source EF1 and the text EF3 and the settings of the light source EF1, the locus EF2, and the text EF3 while checking the relationship on the timeline.

Figure 30:
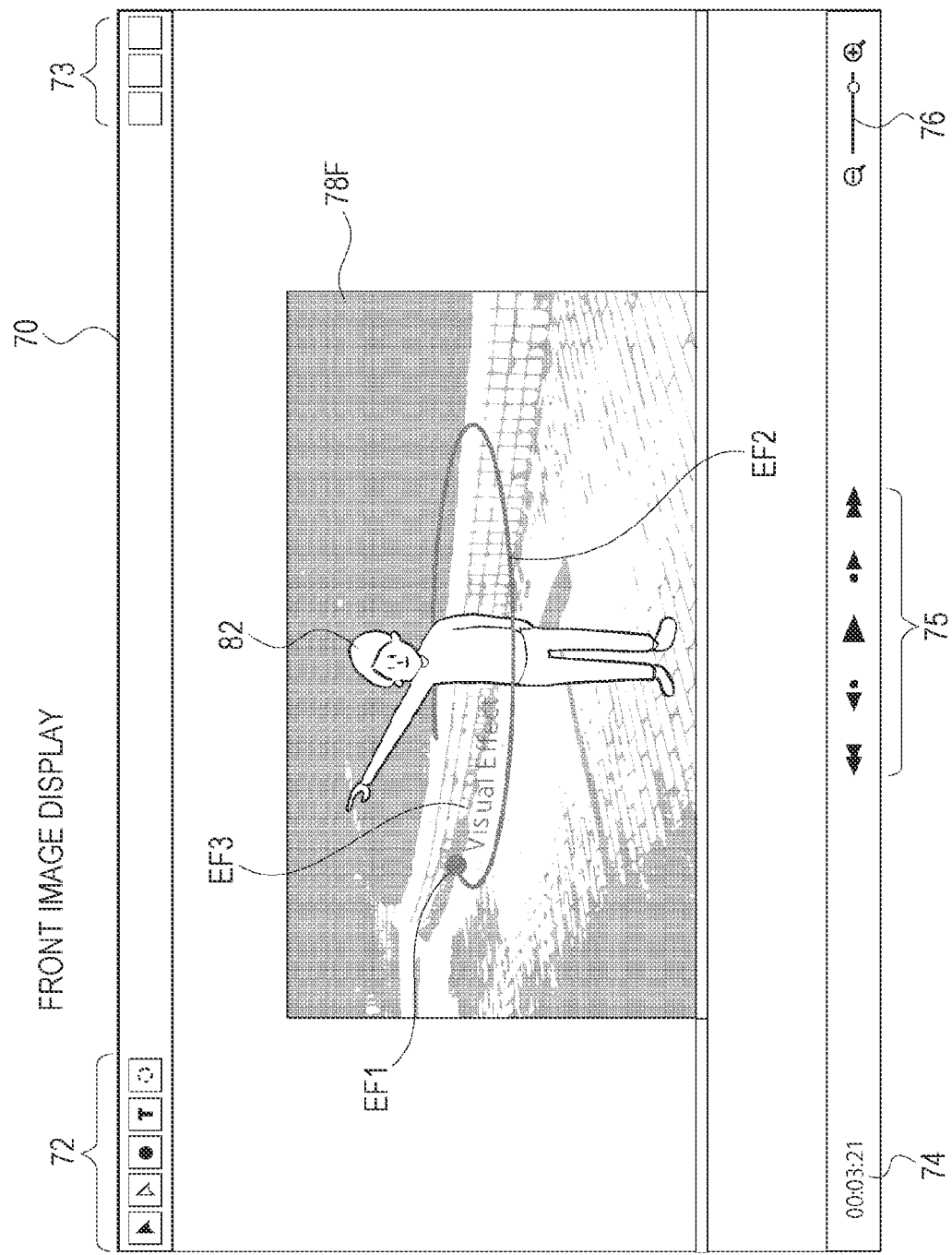
FIG. 30 is an explanatory diagram of front image display corresponding to the image examples according to the seventh embodiment.

To check an image in the moving image, the front preview image 78F is displayed as in FIG. 30. This allows the user to check a frame image of the actual moving image. In particular, the user can easily check whether or not desired adjustment has been made by checking the front preview image 78 while performing an adjustment operation of the depth or the like on the preview image 78, for example.

Figure 31:
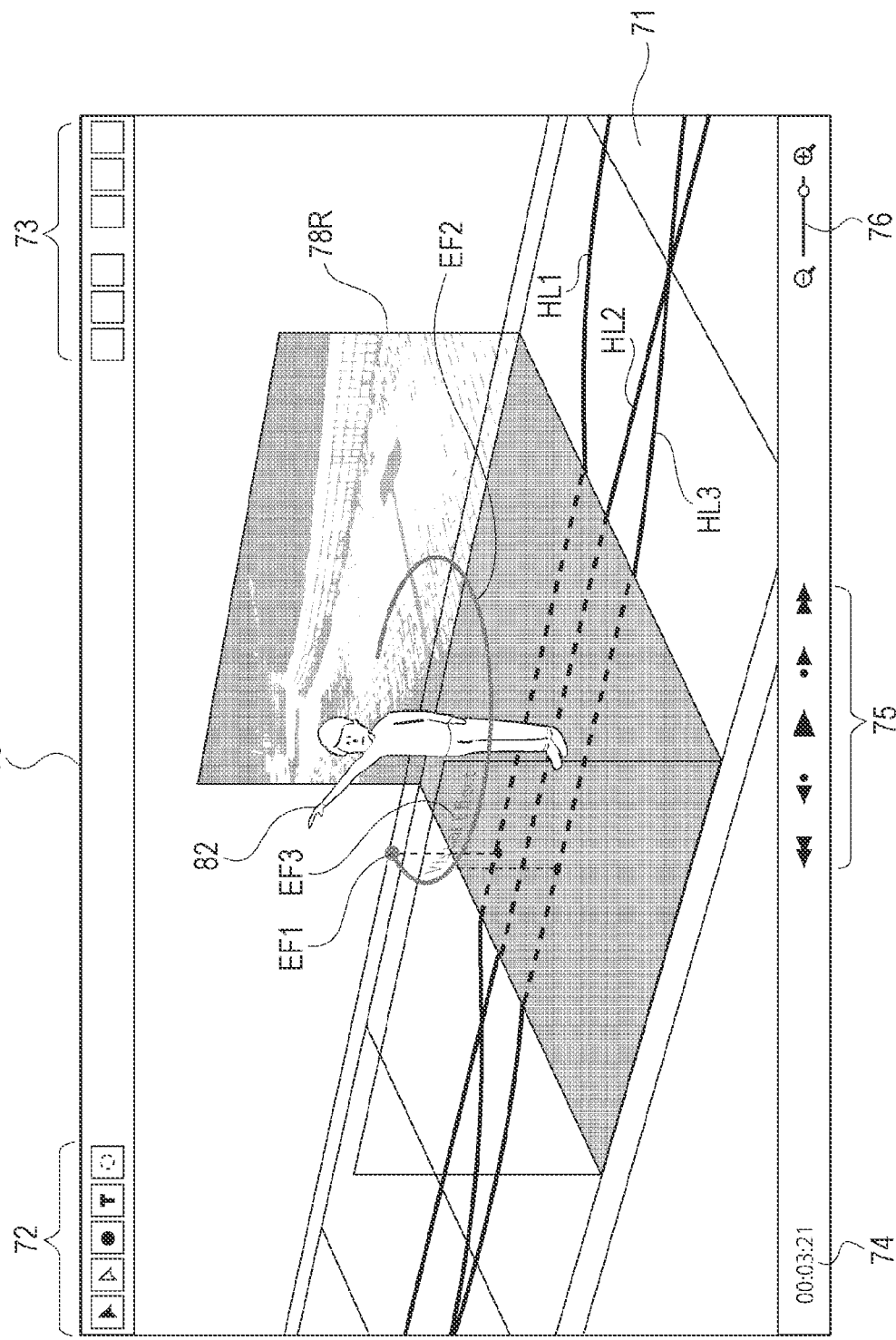
FIG. 31 is an explanatory diagram of stereoscopic image display corresponding to the image examples according to the seventh embodiment.

Moreover, by displaying the stereoscopic preview image 78R in FIG. 31, the user can check the moving image content and the depth at the same time. This allows the user to check the movement of the effect image EF in a stereoscopic space while performing various adjustment operations, and the editing work is facilitated.

The above-described editing interface provides the user with an easy editing environment while transitioning various screens as the editing operation image 70 on the basis of the biaxial map area 71.

The various types of the editing operation image 70 is generated by an image processing apparatus 1 using a function of an editing operation image generation unit 8 in FIG. 1, and is displayed on a display unit 11 or the like.

Figure 32:
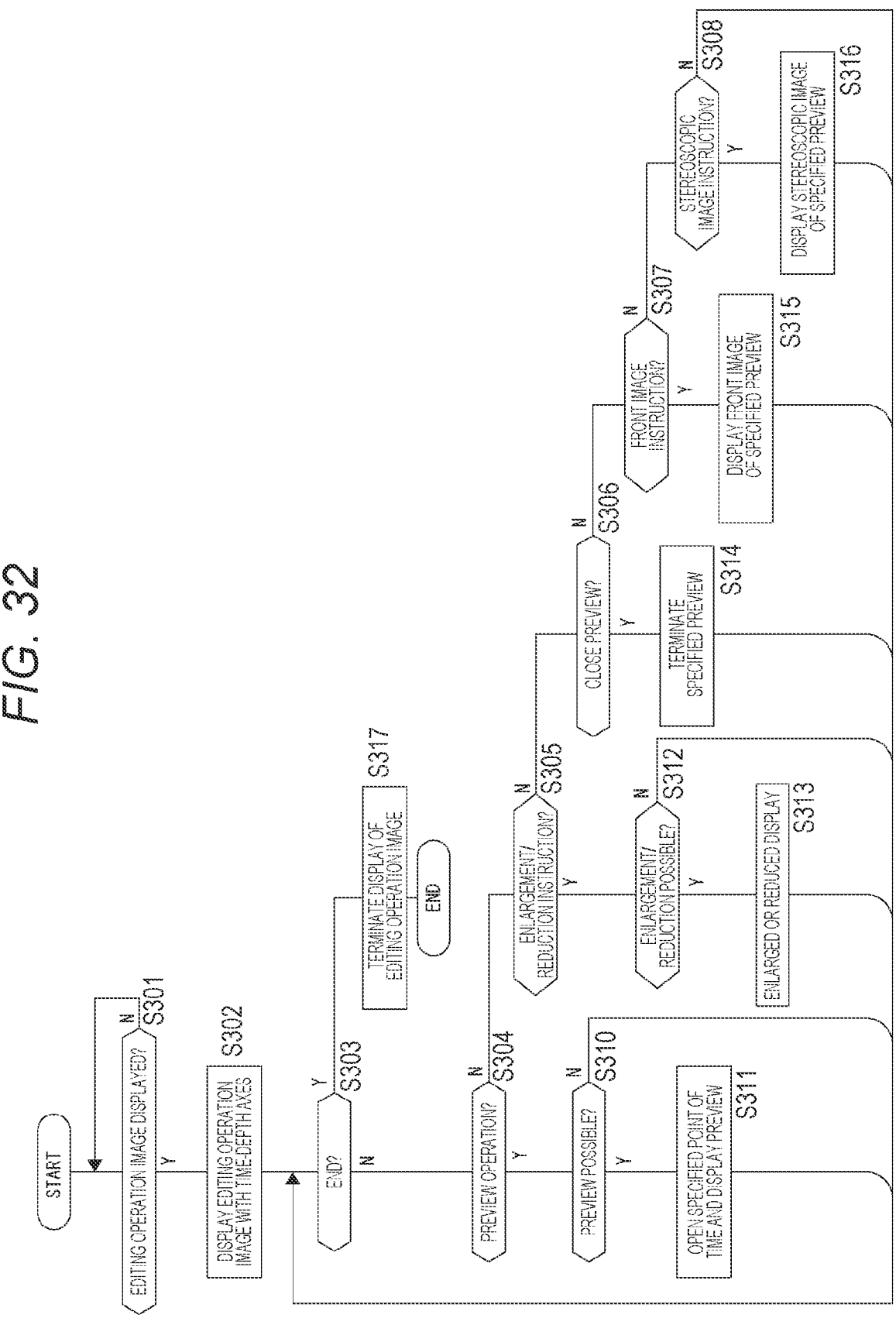
FIG. 32 is a flowchart of operation interface display processing according to the seventh embodiment.

The image processing apparatus 1 performs the processing in FIG. 32 to perform the screen transition according to the user's operation.

When an instruction of display of the editing operation image 70 is given by the user, the image processing apparatus 1 proceeds from step S301 to S302 and performs the editing operation image including the biaxial map area 71 with the time axis and the depth axis, that is, the timeline display in FIG. 18.

In that state, the image processing apparatus 1 monitors an end operation (S303), a preview operation (S304), an enlargement/reduction operation (S305), a preview closing operation (S306), a front image operation (S307), and a stereoscopic image operation (S308), as the user's operation.

When detecting the end operation, the image processing apparatus 1 terminates the display of the editing operation image 70 in step S317.

For example, when detecting the preview operation using the preview operator 77 or the like, the image processing apparatus 1 proceeds from step S304 to S310, confirms whether or not preview is possible, and displays the preview image 78 by the frame image at the specified point of time in step S311 when preview is possible.

That is, the image processing apparatus 1 confirms the depth of each pixel in the frame image at the point of time, generates an image representing the depth of each object or the effect image EF as top view, and inserts the generated image to a part of the timing of the biaxial map area 71 to generate display image data. Then, the image processing apparatus 1 supplies the display image data to the display unit 11 and displays the display image data on the display unit 11.

Note that, in the case where the preview is not possible, for example, in the case of a preview operation for the point of time when no effective image is present, the image processing apparatus 1 determines that the detected preview operation is an invalid operation and returns to the monitoring loop in steps S303 to S308.

For example, when detecting the enlargement/reduction operation using the enlargement/reduction operator 76, the image processing apparatus 1 proceeds from step S305 to S312 and confirms whether or not enlargement or reduction of which an instruction is given is possible, and performs enlarged display or reduced display in step S313 when the enlargement or reduction of which an instruction is given is possible.

That is, the image processing apparatus 1 changes the scale of the biaxial map area 71 and generates the display image data for arranging the preview image 78 in the enlarged or reduced biaxial map area 71. Then, the image processing apparatus 1 supplies the display image data to the display unit 11 and displays the display image data on the display unit 11.

Note that, for example, in the case where the enlargement or reduction is not possible, or in a case of a maximum enlargement rate or a minimum reduction rate, the image processing apparatus 1 determines that the detected enlargement/reduction operation is an invalid operation and returns to the monitoring loop in steps S303 to S308.

For example, when detecting the preview close operation using the closing operator 79, the image processing apparatus 1 proceeds from step S306 to S314, terminates the display of the specified preview image 78, and returns the part to the display of the biaxial map area 71.

For example, when detecting the front image display operation using the screen switching icon 73, the image processing apparatus 1 proceeds from step S307 to S315, and changes the specified preview image 78 to the front preview image 78F. That is, in this case, the image processing apparatus 1 displays the original frame image of the specified preview image 78. Furthermore, in this case, the image processing apparatus 1 stops the display of the biaxial map area 71.

For example, when detecting the stereoscopic image display operation using the screen switching icon 73, the image processing apparatus 1 proceeds from step S308 to S316, and changes the specified preview image 78 to the stereoscopic preview image 78R. That is, in this case, the image processing apparatus 1 generates a stereoscopic image of the original frame image of the specified preview image 78, generates display image data in a state of being inserted in the perspective biaxial map area 71, and displays the display image data on the display unit 11.

The image processing apparatus 1 provides the user with the editing interface based on the biaxial map area 71 while transitioning various screen states by the above processing.

<9. Conclusion and Modification>

According to the above-described first to seventh embodiments, the following effects can be obtained.

In each of the embodiments, the image processing apparatus 1 includes the additional image generation unit 5 configured to generate the additional image to be added to the moving image data, and the image editing processing unit 6 configured to perform the image editing processing of adding the additional image to the moving image data, using the depth information of a pixel in the moving image data to which the additional image is to be added.

Thereby, various types of image editing processing according to the depth of an object, for example, processing of superimposing the additional image such as the effect image EF on the object, synthesizing graphics, characters, and the like as the additional image, providing optical effects, and the like can be performed. In particular, in these moving image editing, an image representation naturally blended into an object image space having depth becomes possible.

In particular, by automatically synthesizing the additional image according to the depth, effective moving image editing for, for example, broadcasting a moving image can be easily executed, and broadcast content with high visual effects can be provided by, for example, real-time relay. Of course, a moving image with image effects can be easily provided in recorded broadcast.

Then, it is considered that the variety of image representation and easiness of processing by the present technology are easily accepted by a wider user group. The present technology can contribute to further development of personal content and social media as well as movies and dramas. Especially for sports or the like, expansion of the fan base is expected by an increase in the number of new ways to enjoy.

Furthermore, since the synthesis is automatically performed according to the depth, general users can easily and easily execute various and advanced types of image processing. In particular, a more natural edited moving image can be generated without requiring the user to have a high level of skill. This provides the user with a wider image representation.

Normally, the image representation is greatly restricted by the skill of the user and the function and performance of the tool, but great expansion of the range of representation by the technique of the present embodiment is expected. The user can more easily express an image close to his/her own image, and the effect of using the image effects in combination can be expected unlike general effects. Therefore, the variation of representation greatly expands.

Furthermore, the present embodiment can contribute to development of social media.

It is assumed that the technique of the embodiment is accepted by a wide user group because of the variety of representation and easiness of expression. Thereby, a variety of representation becomes possible in the social media, and a communication environment using interesting moving images can be provided.

Although the effect image EF, the information presentation image IS, and the telop image TP have been given as examples of the additional images, the additional images are not limited thereto. Even in a mode not included in these examples, an image added to a moving image for image effect or information presentation corresponds to the additional image referred to in the present disclosure.

For example, an additional image in a mode of adding an image obtained by copying an object in a moving image or adding an object of another moving image is also assumed.

Furthermore, it is naturally conceivable to combine the effect image EF, the information presentation image IS, the telop image TP, and the like into a moving image.

In the first, second, and third embodiments, an example of performing the image editing, reflecting the front-rear relationship between the object and the additional image, using the depth information of the object in the moving image data and the depth information set for the additional image, has been described.

That is, the front-rear relationship between the additional image and the object is defined according to the depth information set for the additional image and the depth information of the object (pixels of each frame of the moving image data).

The additional image can be inserted in a correct positional relationship in a stereoscopic space by synthesizing the additional image (effect image EF, information presentation image IS, telop image TP, or the like) with the original object in the moving image, reflecting the front-rear relationship. That is, when adding the additional image as the moving image editing, synthesis of the additional image without a sense of discomfort can be realized for the space of the object.

In the first, second, and third embodiments, the additional image being adjusted in size according to the depth information at the insertion position of the additional image in the moving image data and synthesized with the moving image data has been described.

For example, the additional image generation unit 5 or the image editing processing unit 6 adjusts the size of the additional image on the basis of the depth information. Thereby, the additional image itself is expressed in a size according to perspective of the insertion position (in a state according to the law of perspective).

Since the size of the additional image itself is adjusted according to the perspective, the additional image is synthesized with the original object without a sense of discomfort. Thereby, a high-quality additional image can be synthesized. For example, the effect image EF in FIG. 5A, the telop image TP in FIG. 10A, and the information presentation image IS in FIG. 13A are images reflecting perspective, and thus naturally match moving images.

In the first embodiment, an example in which the additional image is the effect image EF generated using a moving object detection result in the moving image data has been described.

That is, the effect image EF representing movement tracking, a movement locus, or the like of a moving object in the moving image is generated as the additional image and is synthesized with the moving image (see FIGS. 6, 7, 8, 9A and 9B).

Thereby, various image representations according to the movement of the moving object in the moving image can be realized. For example, a powerful moving image, a moving image that allows a viewer to easily grasp movement, and the like, as illustrated in FIGS. 4C, 4D, 4E, 5A, and 5B, can be provided.

Note that the effect image EF is not limited to the one corresponding to a moving object. For example, the effect image EF that is particularly unrelated to a moving object is conceivable, as illustrated in FIGS. 15A and 15B. Various examples of effect images EF are expected, such as an effect of hiding a part of an object in a moving image, an effect of emphasizing a part of an object, especially inserting graphics unrelated to the image content, superimposing multiple moving images, and the like.

In the first embodiment, an example of setting the depth information according to the moving object for the effect image EF, and performing the image editing reflecting the front-rear relationship between the object and the additional image, using the depth information of the object in the moving image data and the depth information set for the effect image, has been described.

For example, the depth information according to the movement of the moving object is set for the effect image EF so that the effect image becomes an image corresponding to the depth of the moving object (see FIGS. 6, 7, 8, 9A, and 9B).

Thereby, the front-rear relationship between the effect image EF corresponding to the moving object and the surrounding object is defined. An image representing an effect image according to the moving object in a correct positional relationship in a stereoscopic space can be realized by synthesizing the effect image EF with the original object in the moving image, reflecting the front-rear relationship. Therefore, an image corresponding to the locus of the moving object or the movement of the moving object can be expressed as the effect image EF without a sense of discomfort for the object space in the moving image.

In the first embodiment, an example in which the depth information according to the moving object is set for the effect image EF, and the effect image is adjusted in size according to the depth information and synthesized with the moving image data has been described.

That is, the additional image generation unit 5 or the image editing processing unit 6 adjusts the size of the effect image EF on the basis of the depth information. Thereby, the effect image EF itself is expressed in the size according to the perspective of the insertion position (that is, the position of the moving object in each frame) (in the state according to the law of perspective) (see FIGS. 6, 7, 8, 9A, and 9B).

By adjusting the size of the effect image EF according to its perspective, the locus and the like are expressed with a size according to the size of the moving object visually recognized in the original moving image. For example, the size (the width in this case) of the locus of the moving object 80 represented as the effect image EF in FIG. 5A changes according to the moving object position at each point of time (frame). By using an image reflecting perspective in this way, displacement of the moving object 80 over time can be represented in an easy-to-grasp manner while naturally matching the moving image.

In the first embodiment, an example in which the additional image is the effect image EF representing the locus of the moving object in the moving image data has been described.

That is, an effect image representing the movement locus of the moving object in the moving image is generated as the additional image and is synthesized with the moving image (see FIGS. 9A and 9B).

Thereby, the image representation presenting the locus of the movement of the moving object in the moving image in an easy-to-grasp manner can be realized (see FIGS. 4C, 4D, 4E, 5A, and 5B).

In the first embodiment, an example in which the additional image is the effect image EF representing the motion mode or the motion type of the moving object in the moving image data has been described.

That is, there are various modes and types as the motion of the moving object in the moving image. Effect images representing the various modes and types are generated as the additional images and synthesized with the moving image (see FIG. 9B).

Thereby, the image representation presenting the mode and type of the movement of the moving object in the moving image in an easy-to-grasp manner can be realized. For example, FIGS. 4C and 4E illustrate the movement in the substantially horizontal direction, and FIG. 4D represents spin. The example in FIG. 5A is the image in which the color and density change according to the rotation speed of the ball as the moving object 80. The case in FIG. 5B is the image in which the locus of the bamboo sword of one person and the locus of the bamboo sword of another person are expressed in different colors.

As a result, not only a powerful image but also an image presenting the mode and type of the movement in an easy-to-grasp manner can be provided.

In the second embodiment, an example in which the additional image is the telop image TP generated using the sound detection result in the moving image data has been described.

That is, a speech of a person in the moving image and the like are detected, the telop image thereof is generated as the additional image, and the telop image is synthesized with the moving image (see FIGS. 11, 12A, 12B, and 12C).

Thereby, the image representation including the sound telop can be realized in the moving image. For example, a moving image representing a sound can be provided, as illustrated in FIGS. 10A, 10B, 10C, and 10D. Then, this telop image TP is synthesized using the depth information, thereby presenting the image representation reflecting the depth of the sound source (speaker).

In the second embodiment, the telop image TP is the image displaying text data on the basis of the sound recognition from the moving image data.

That is, the sound spoken in the moving image is recognized and the text data is acquired. Then, the text data is displayed as a telop (see FIGS. 11, 12A, 12B, and 12C).

Thereby, the speech of the object person in the moving image is clearly presented, and the telop thereof is synthesized and displayed in the state corresponding to the depth of the object person who has spoken, for example. Therefore, the telop is synthesized according to the object person who has spoken, and the image representation presenting the speaker in an easy-to-grasp manner can be realized.

In the second embodiment, an example in which the telop image TP is the image in a different mode according to the volume of the sound recognized from the moving image data has been described.

The telop image TP has a different display mode, such as different size and font depending on the sound volume and the voice volume of the recognized sound, for example (see FIG. 12C).

Thereby, the telop image TP in a different display mode can be displayed in the state corresponding to the depth of the object person who has spoken, according to the volume of the speech of the object person in the moving image and the like, and interesting telop display or highly expressive telop display can be realized.

In the second embodiment, an example in which the telop image TP is the image in a different mode according to the emotion information of the speaker in the moving image data has been described.

For example, the emotion of the speaker is estimated from the recognized sound or image. Then, a different display mode, such as different size and font, is set according to the emotion (anger, joy, or surprise) and the like (see FIG. 12B).

For example, as illustrated in FIGS. 10B, 10C, and 10D, the telop image TP representing an emotion is obtained by changing the mode of the speech balloon, the character size, font, or the like.

Thereby, interesting or highly expressive telop display, reflecting the emotion and the like of the object person in the moving image, can be realized.

In the third embodiment, the additional image is the information presentation image generated using acquired information.

That is, information regarding the moving image is acquired from the information source, and an image presenting the information is generated as the additional image. Then, the additional image is synthesized with the moving image using the depth information (see FIG. 14).

Thereby, the information related to the moving image can be presented on the screen without a sense of discomfort in an appropriate front-rear relationship or perspective state. For example, in the case of performing the time display as in FIG. 13A, the moving image without a sense of discomfort can be provided to the viewer by expressing the perspective in the case of synthesizing the time display near the goal line.

In the fifth, sixth, and seventh embodiments, the image processing apparatus 1 includes the editing operation image generation unit 8 configured to generate the editing operation image in which the time axis and the depth axis of a moving image are expressed as the user interface image for editing the additional image added to the moving image data.

That is, in the case of editing a synthesized state of the additional image, an edited image to be used by the user for editing is generated and displayed. In this case, the edited image represents the time axis and the depth axis of the moving image.

In the example in FIG. 16, the example in FIG. 17, and the example described in FIGS. 18, 19, 20, 21, 22, 23, 24A, 24B, 24C, 24D, 24E, 24F, 25A, 25B, 25C, 25D, 25E, 25F, 26, 27, 28, 29, 30, and 31, the time axis of the moving image is present as the timeline, and the axis representing the depth of the object and the additional information is present. With the axes, the user can easily grasp the progresses of the moving image and the state of the depth. This facilitates the editing work of the additional image.

Note that, in the fourth embodiment (FIGS. 15A and 15B), the depth axis is provided on the editing interface screen, and the depth of the additional image can be intuitively adjusted. This also realizes simple editing by the user.

In the sixth and seventh embodiments, the display area having one axis as the time axis and the other axis as the depth axis is included as the editing screen.

For example, as one area, the area having the time axis in the horizontal direction and the depth axis in the vertical direction is provided to form the editing screen.

In the example in FIG. 17, and the example described in FIGS. 18, 19, 20, 21, 22, 23, 24A, 24B, 24C, 24D, 24E, 24F, 25A, 25B, 25C, 25D, 25E, 25F, 26, 27, 28, 29, 30, and 31, the biaxial map areas 68 and 71 are such areas. By providing the area having the time axis and the depth axis, the progress of the moving image, the depth relationship between the object and the additional image, and the fluctuation can be extremely easily recognized, and the efficiency and simplification of the editing work can be facilitated.

The editing operation image 70 of the seventh embodiment is the image displaying the information in the time axis direction and the image (preview image 78) at a certain point of time at the same time.

For example, while the information in the time axis direction is displayed as the timeline, the preview image 78 and the stereoscopic preview image 78R at some points of time are simultaneously displayed.

For example, by performing the display as illustrated in FIGS. 19 and 23, an image at a certain point of time on the timeline can be easily checked, and moreover, a change in the front-rear relationship of the object or the like can be easily grasped. This facilitates efficiency and simplification of editing work.

In the seventh embodiment, the editing operation image 70 is the image in which an image at a certain point of time is simultaneously displayed with information in the time axis direction by specifying the certain point of time on an image indicating the information in the time axis direction.

For example, by designating the certain time point while displaying the information in the time axis direction as the timeline, the preview image 78 at the point of time is displayed as in FIG. 19 while the information on the timeline is kept presented.

Thereby, the image at the certain point of time specified by the user can be easily checked on the timeline. Moreover, the change in the front-rear relationship of the object or the like at times before and after the certain point of time can be easily grasped. This facilitates efficiency and simplification of editing work.

In the seventh embodiment, an example in which the editing operation image 70 is the image displaying the preview image at a certain point of time in the time axis direction as a stereoscopic image has been described.

For example, the image at the point of time specified on the timeline is displayed as the stereoscopic preview image 78R as in FIG. 22 while the information in the time axis direction is displayed as the timeline.

Thereby, the depth relationship between the object and the additional image can be easily grasped, thereby facilitating efficiency and simplification of the editing work.

The program according to the embodiment is a program for causing an information processing apparatus to execute a step of generating an additional image to be added to moving image data, and a step of performing image editing processing of adding the additional image to the moving image data, using depth information of a pixel in the moving image data to which the additional image is to be added.

That is, the program causes the information processing apparatus to execute the processing in FIGS. 6, 7, 8, 9A, 9B, 11, 12A, 12B, 12C, and 14.

Such a program facilitates the realization of the image processing apparatus 1 of the present embodiment.

Then such a program can be stored in advance in a recording medium incorporated in a device such as a computer device, a ROM in a microcomputer having a CPU, or the like. Alternatively, such a program can be temporarily or permanently stored in a removable recording medium such as a semiconductor memory, a memory card, an optical disk, a magneto-optical disk, or a magnetic disk. Furthermore, such a removable recording medium can be provided as so-called package software.

Furthermore, such a program can be installed from a removable recording medium to a personal computer or the like, and can also be downloaded from a download site via a network such as a LAN or the Internet.

Note that the effects described in the present specification are merely examples and are not limited, and other effects may be exhibited.

Note that the present technology can also have the following configurations.

(1)

An image processing apparatus including:

an additional image generation unit configured to generate an additional image to be added to moving image data; and an image editing processing unit configured to perform image editing processing of adding the additional image to the moving image data, using depth information of a pixel in the moving image data to which the additional image is to be added.

(2)

The image processing apparatus according to (1), in which the image editing processing unit performs image editing, reflecting a front-rear relationship between an object and the additional image, using the depth information of the object in the moving image data and depth information set for the additional image.

(3)

The image processing apparatus according to (1) or (2), in which the additional image is adjusted in size according to the depth information at an insertion position of the additional image in the moving image data and synthesized with the moving image data.

(4)

The image processing apparatus according to any one of (1) to (3), in which the additional image is an effect image generated using a moving object detection result in the moving image data.

(5)

The image processing apparatus according to (4), in which depth information according to a moving object is set for the effect image, and the image editing processing unit performs image editing, reflecting a front-rear relationship between an object and the additional image, using the depth information of the object in the moving image data and depth information set for the effect image.

(6)

The image processing apparatus according to (4) or (5), in which depth information according to a moving object is set for the effect image, and the effect image is adjusted in size according to the depth information and synthesized with the moving image data.

(7)

The image processing apparatus according to any one of (1) to (6), in which the additional image is an effect image representing a locus of a moving object in the moving image data.

(8)

The image processing apparatus according to any one of (1) to (7), in which the additional image is an effect image representing a motion mode or a motion type of a moving object in the moving image data.

(9)

The image processing apparatus according to any one of (1) to (3), in which the additional image is a telop image generated using a sound detection result in the moving image data.

(10)

The image processing apparatus according to (9), in which the telop image is an image displaying text data on the basis of sound recognition from the moving image data.

(11)

The image processing apparatus according to (9) or (10), in which the telop image is an image in a different mode according to a volume of a sound recognized from the moving image data.

(12)

The image processing apparatus according to any one of (9) to (11), in which the telop image is an image in a different mode according to emotion information of a speaker in the moving image data.

(13)

The image processing apparatus according to any one of (1) to (3), in which the additional image is an information presentation image generated using acquired information.

(14)

The image processing apparatus according to any one of (1) to (13), further including:

an editing operation image generation unit configured to generate an editing operation image in which a time axis and a depth axis of a moving image are expressed as a user interface image for editing the additional image added to the moving image data.

(15)

The image processing apparatus according to (14), in which the editing operation image includes a display area having one axis as the time axis and the other axis as the depth axis.

(16)

The image processing apparatus according to (14) or (15), in which the editing operation image is an image in which information in a time axis direction and an image at a certain point of time are simultaneously displayed.

(17)

The image processing apparatus according to any one of (14) to (16), in which the editing operation image is an image in which an image at a certain point of time is simultaneously displayed with information in a time axis direction by specifying the certain point of time on an image indicating the information in a time axis direction.

(18)

The image processing apparatus according to any one of (14) to (17), in which the editing operation image is an image in which an image at a certain point of time in a time axis direction is displayed as a stereoscopic image.

(19)

An image processing method executed by an information processing apparatus including:

a process of generating an additional image to be added to moving image data; and a process of performing image editing processing of adding the additional image to the moving image data, using depth information of a pixel in the moving image data to which the additional image is to be added.

(20)

A program for causing an information processing apparatus to execute:

a step of generating an additional image to be added to moving image data; and a step of performing image editing processing of adding the additional image to the moving image data, using depth information of a pixel in the moving image data to which the additional image is to be added.

REFERENCE SIGNS LIST

1 Image processing apparatus
2 Image acquisition unit
3 Depth acquisition unit
4A Image analysis unit
4B Sound recognition unit
4C Information acquisition unit
5 Additional image generation unit
6 Image editing processing unit
7 Image output unit
8 Editing operation image generation unit
10 Operation unit
11 Display unit
12 Communication unit
13 Storage unit
14 Image source
15 Information source
60 Image monitor area
61 Operation area
61a Operation icon image
61b Depth axis
61c Depth map image
62 Front view area
63 Top view area
63a Depth axis
64 Side view area
64a Depth axis
65 Setting area
66 Timeline area
67 Layer display area
68 Biaxial map area
70 Editing operation image
71 Biaxial map area
72 Tool icon
73 Screen switching icon
74 Current time display
75 Moving image operation icon
76 Enlargement/reduction operator 77 Preview operator
78, 78A Preview image
78R Stereoscopic preview image
78F Front preview image
79 Closing operator
80 Moving object
81 Speaker
82, 83 Object
100 Information processing apparatus
EF Effect image
TP Telop image
IS Information presentation image
HL1, HL2, HL3 Depth display line

The invention claimed is:

1. An image processing apparatus, comprising:
a central processing unit (CPU) configured to:
generate an additional image;
perform an image editing process to add the generated additional image to moving image data, based on depth information of a pixel in the moving image data;
generate an editing operation image to edit the additional image added to the moving image data; and
control a display of the generated editing operation image on a user interface, wherein
the displayed editing operation image includes a display area, on the user interface, having a time axis of a moving image and a depth axis of the moving image,
the time axis is perpendicular to the depth axis, and
the moving image is associated with the moving image data.

2. The image processing apparatus according to claim 1, wherein the CPU is further configured to perform the image editing process based on:
a front-rear relationship between an object of the pixel in the moving image data and the additional image, and
the depth information of the pixel including the object in the moving image data and depth information of the additional image.

3. The image processing apparatus according to claim 1, wherein the CPU is further configured to:
adjust a size of the additional image based on the depth information of the pixel in the moving image data, wherein the pixel is at an insertion position of the additional image in the moving image data; and
synthesize the additional image with the moving image data based on the adjusted size of the additional image.

4. The image processing apparatus according to claim 1, wherein
the additional image is an effect image, and
the CPU is further configured to generate the effect image based on a moving object detection result in the moving image data.

5. The image processing apparatus according to claim 4, wherein the CPU is further configured to:
set depth information of the effect image based on a moving object of the moving image data; and
perform the image editing process based on:
a front-rear relationship between the moving object and the effect image, and
the depth information of the pixel including the moving object in the moving image data and the set depth information of the effect image.

6. The image processing apparatus according to claim 4, wherein the CPU is further configured to:
set depth information of the effect image based on a moving object of the moving image data;
adjust a size of the effect image based on the depth information of the pixel in the moving image data; and
synthesize the effect image with the moving image data based on the adjusted size of the effect image.

7. The image processing apparatus according to claim 1, wherein the additional image is an effect image representing a locus of a moving object in the moving image data.

8. The image processing apparatus according to claim 1, wherein the additional image is an effect image representing at least one of a motion mode or a motion type of a moving object in the moving image data.

9. The image processing apparatus according to claim 1, wherein the CPU is further configured to generate a telop image as the additional image based on a sound detection result in the moving image data.

10. The image processing apparatus according to claim 9, wherein the CPU is further configured to control a display of text data, as the telop image, based on sound recognition from the moving image data.

11. The image processing apparatus according to claim 9, wherein the CPU is further configured to generate a mode of the telop image based on a volume of a sound recognized from the moving image data.

12. The image processing apparatus according to claim 9, wherein the CPU is further configured to generate a mode of the telop image based on emotion information of a speaker in the moving image data.

13. The image processing apparatus according to claim 1, wherein
the additional image is an information presentation image, and
the CPU is further configured to:
acquire specific information based on analysis of the moving image data; and
generate the information presentation image based on the acquired specific information.

14. The image processing apparatus according to claim 1, wherein
the CPU is further configured to control simultaneous display of a specific image and specific information in a direction of the time axis, as the editing operation image, and
the specific image is an image at a specific point of time in the specific information displayed in the direction of the time axis.

15. The image processing apparatus according to claim 1, wherein the CPU is further configured to control simultaneous display of a specific image and specific information in a direction of the time axis, as the editing operation image, based on specification of a specific point of time on an image indicating the specific information in the direction of the time axis.

16. The image processing apparatus according to claim 1, wherein the CPU is further configured to control the display of the editing operation image, at a specific point of time in a direction of the time axis, as a stereoscopic image.

17. An image processing method, comprising:
generating an additional image;
performing an image editing process to add the generated additional image to moving image data, based on depth information of a pixel in the moving image data;
generating an editing operation image to edit the additional image added to the moving image data; and
controlling a display of the generated editing operation image on a user interface, wherein the displayed editing operation image includes a display area, on the user interface, having a time axis of a moving image and a depth axis of the moving image, the time axis is perpendicular to the depth axis, and the moving image is associated with the moving image data.

18. A non-transitory computer-readable medium having stored thereon computer-executable instructions, which when executed by a computer, cause the computer to execute operations, the operations comprising:

generating an additional image;

performing an image editing process to add the generated additional image to moving image data, based on depth information of a pixel in the moving image data;

generating an editing operation image to edit the additional image added to the moving image data; and controlling a display of the generated editing operation image on a user interface, wherein the displayed editing operation image includes a display area, on the user interface, having a time axis of a moving image and a depth axis of the moving image, the time axis is perpendicular to the depth axis, and the moving image is associated with the moving image data.

* * * * *